United States Patent
Wheelwright et al.

(10) Patent No.: US 10,371,952 B2
(45) Date of Patent: *Aug. 6, 2019

(54) FRESNEL LENS WITH DYNAMIC PITCH

(71) Applicant: Facebook Technologies, LLC, Menlo Park, CA (US)

(72) Inventors: Brian Wheelwright, Sammamish, WA (US); Ning Yueng Chan, Palo Alto, CA (US); Jacques Gollier, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/594,485

(22) Filed: May 12, 2017

(65) Prior Publication Data
US 2018/0074325 A1    Mar. 15, 2018

Related U.S. Application Data

(63) Continuation-in-part of application No. 15/264,515, filed on Sep. 13, 2016, now Pat. No. 10,025,101.

(51) Int. Cl.
*G02B 27/14* (2006.01)
*G02B 27/01* (2006.01)
(Continued)

(52) U.S. Cl.
CPC .......... *G02B 27/0172* (2013.01); *G02B 3/08* (2013.01); *G02B 27/0176* (2013.01);
(Continued)

(58) Field of Classification Search
CPC .. G02B 3/08; G02B 6/29311; G02B 27/0955; G02B 3/0037; G02B 27/0172;
(Continued)

(56) References Cited

U.S. PATENT DOCUMENTS

| | | |
|---|---|---|
| 5,589,956 A | 12/1996 | Morishima et al. |
| 5,676,453 A | 10/1997 | Parkyn, Jr. et al. |

(Continued)

FOREIGN PATENT DOCUMENTS

CN      104898283 A      9/2015

OTHER PUBLICATIONS

Wheelwright, Office Action, U.S. Appl. No. 15/264,515, dated Jul. 13, 2017, 14 pgs.

(Continued)

*Primary Examiner* — Alicia M Harrington
(74) *Attorney, Agent, or Firm* — Morgan, Lewis & Bockius LLP

(57) ABSTRACT

A lens includes an optically transparent substrate having a first lens surface and a second lens surface opposite to the first lens surface. The first lens surface includes a plurality of Fresnel structures. A respective Fresnel structure of the plurality of Fresnel structures includes a slope facet and a draft facet. The respective Fresnel structure of the plurality of Fresnel structures is characterized by a representative pitch. The representative pitch of the respective Fresnel structure is based on a distance of the respective Fresnel structure from a reference axis of the lens. A display device that includes the lens and an electronic display coupled with the lens for outputting light through the lens and a method for transmitting light from an electronic display toward the lens are also described.

18 Claims, 38 Drawing Sheets

(51) Int. Cl.
*G02B 3/08* (2006.01)
*G02B 27/00* (2006.01)
*G02B 5/18* (2006.01)

(52) U.S. Cl.
CPC ........ *G02B 5/1876* (2013.01); *G02B 27/0093* (2013.01); *G02B 2027/011* (2013.01); *G02B 2027/0152* (2013.01)

(58) Field of Classification Search
CPC .......... G02B 27/0176; G02B 2027/011; G02B 2027/0152
See application file for complete search history.

(56) References Cited

U.S. PATENT DOCUMENTS

| | | | |
|---|---|---|---|
| 5,798,739 | A | 8/1998 | Teitel |
| 5,801,889 | A | 9/1998 | Meyers et al. |
| 6,452,731 | B1 | 9/2002 | Schorning |
| 7,914,174 | B2 | 3/2011 | Ho et al. |
| 9,681,804 | B2* | 6/2017 | Spitzer ............... G02B 27/0093 |
| 10,025,101 | B2 | 7/2018 | Wheelwright et al. |
| 2012/0255540 | A1* | 10/2012 | Hutchin .................... G02B 5/04 126/600 |
| 2013/0050851 | A1 | 2/2013 | Machida |
| 2013/0107540 | A1 | 5/2013 | Wu et al. |
| 2013/0222757 | A1 | 8/2013 | Klein et al. |
| 2015/0226887 | A1* | 8/2015 | Gombert .................. G02B 3/08 359/742 |
| 2016/0011341 | A1* | 1/2016 | Smith ...................... G02B 3/08 359/743 |
| 2016/0070104 | A1 | 3/2016 | Yang |
| 2016/0198949 | A1 | 7/2016 | Spitzer |

OTHER PUBLICATIONS

Wheelwright, Final Office Action, U.S. Appl. No. 15/264,515, dated Jan. 12, 2018, 7 pgs.
Wheelwright, Office Action, U.S. Appl. No. 15/594,426, dated Jul. 27, 2017, 16 pgs.
Wheelwright, Office Action, U.S. Appl. No. 15/594,467, dated Jul. 28, 2017, 14 pgs.
Wheelwright, Office Action, U.S. Appl. No. 15/594,426, dated Sep. 18, 2018, 16 pgs.
Wheelwright, Final Office Action, U.S. Appl. No. 15/594,426, dated Apr. 12, 2019, 7 pgs.
Wheelwright, Final Office Action, U.S. Appl. No. 15/594,467, dated Feb. 1, 2018, 16 pgs.
Wheelwright, Office Action, U.S. Appl. No. 15/594,467, dated Sep. 18, 2018, 18 pgs.
Wheelwright, Final Office Action, U.S. Appl. No. 15/594,467, dated Apr. 15, 2019, 7 pgs.
Wheelwright, Office Action, U.S. Appl. No. 15/264,502, dated Oct. 26, 2018, 14 pgs.
Wheelwright, Notice of Allowance, U.S. Appl. No. 15/264,502, dated Apr. 9, 2019, 10 pgs.
Wheelwright, Notice of Allowance U.S. Appl. No. 15/264,515, dated Mar. 21, 2018, 8 pgs.
Wheelwright, Final Office Action, U.S. Appl. No. 15/594,426, dated Feb. 2, 2018, 14 pgs.
Wheelwright, Office Action, U.S. Appl. No. 15/264,496, dated Sep. 21, 2017, 9 pgs.
Wheelwright, Office Action, U.S. Appl. No. 15/264,496, dated Feb. 23, 2018, 9 pgs.
Oculus VR, LLC, International Search Report and Written Opinion, PCT/US2017/032724, dated Oct. 24, 2017, 43 pgs.
Facebook Technologies, LLC, International Preliminary Report on Patentability, PCT/US2017/032724, dated Mar. 19, 2019, 40 pgs.
Wheelwright, Notice of Allowance, U.S. Appl. No. 15/594,426, Jun. 5, 2019, 11 pgs.
Wheelwright, Notice of Allowance, U.S. Appl. No.15/594,467, May 15, 2019, 9 pgs.

* cited by examiner

-Prior Artlocal chief ray

-Prior Artslope-continuous substrate, Fresnel Slope = 0 slope-discontinuous substrate, Fresnel Slope = 0 slope-discontinuous substrate, Fresnel Slope ≠ 0 slope-continuous substrate, Fresnel Slope ≠ 0

FRESNEL LENS WITH DYNAMIC PITCH

RELATED APPLICATIONS

This application is a continuation-in-part of U.S. patent application Ser. No. 15/264,515, filed Sep. 13, 2016. This application is related to U.S. patent application Ser. No. 15/594,426, entitled "Fresnel Lens with Dynamic Draft for Reduced Optical Artifacts" filed May 12, 2017 and U.S. patent application Ser. No. 15/594,467, entitled "Fresnel Lens with Dynamic Draft for Variable Gaze" filed May 12, 2017. All of these applications are incorporated by reference herein in their entireties.

TECHNICAL FIELD

This relates generally to optical lenses, and more specifically to optical lenses used in head-mounted display devices.

BACKGROUND

Head-mounted display devices (also called herein head-mounted displays) are gaining popularity as means for providing visual information to user. However, the size and weight of conventional head-mounted displays have limited applications of head-mounted displays.

SUMMARY

Accordingly, there is a need for head-mounted displays that are compact and light, thereby enhancing the user's virtual-reality and/or augmented reality experience.

Fresnel lenses provide apertures and focal lengths comparable to conventional lenses. Because Fresnel lenses are typically thinner and lighter than conventional lenses of similar performance features (e.g., aperture and/or focal length), replacing conventional lenses in head-mounted displays with Fresnel lenses can reduce the size and weight of the head-mounted displays. However, Fresnel lenses suffer from diffractions and other optical artifacts associated with Fresnel structures, and thus, their use in imaging applications is limited.

Thus, there is a need for lenses that are compact and light while reducing optical artifacts associated with such lenses.

The above deficiencies and other problems associated with conventional lenses are reduced or eliminated by the disclosed lens. In some embodiments, the lens is included in a display device. In some embodiments, the device is a head-mounted display device. In some embodiments, the device is portable.

In accordance with some embodiments, a lens includes an optically transparent substrate having a first lens surface and a second lens surface opposite to the first lens surface. The first lens surface includes a plurality of Fresnel structures. A respective Fresnel structure of the plurality of Fresnel structures includes a slope facet and a draft facet. The draft facet is characterized by a draft angle. The draft angle of the respective Fresnel structure is based on a distance of the respective Fresnel structure from a center of the lens.

In accordance with some embodiments, a display device includes a lens described herein and an array of light emitting devices coupled with the lens for outputting light through the lens.

In accordance with some embodiments, a lens configured for transmitting light in a first medium includes an optically transparent substrate having a first lens surface and a second lens surface opposite to the first lens surface. The first lens surface includes a plurality of Fresnel structures. A respective Fresnel structure of the plurality of Fresnel structures includes a slope facet and a draft facet, and the draft facet is characterized by a draft angle. The draft angle of the respective Fresnel structure is based on a distance of the respective Fresnel structure from a reference axis of the lens. The lens is associated with a respective optical axis. The draft angle of the respective Fresnel structure is between a first angle and a second angle, the first angle corresponding to a direction of a ray, in the first medium, transmitted from a reference off-axis position through the respective Fresnel structure toward a reference pupil and the second angle corresponding to a direction of the ray, in the optically transparent substrate, transmitted from the reference off-axis position through the respective Fresnel structure toward the reference pupil. The reference off-axis position is located away from the respective optical axis of the lens.

In accordance with some embodiments, a display device includes a lens as described herein, and an electronic display coupled with the lens for outputting light through the lens.

In accordance with some embodiments, a method for reducing optical artifacts includes transmitting light from a display device through a first medium toward a lens that includes an optically transparent substrate having a first lens surface and a second lens surface opposite to the first lens surface. The first lens surface includes a plurality of Fresnel structures. A respective Fresnel structure of the plurality of Fresnel structures includes a slope facet and a draft facet, wherein the draft facet is characterized by a draft angle. The draft angle of the respective Fresnel structure is based on a distance of the respective Fresnel structure from a reference axis of the lens. The lens is associated with a respective optical axis. The draft angle of the respective Fresnel structure is between a first angle and a second angle, the first angle corresponding to a direction of a ray, in the first medium, transmitted from a reference off-axis position through the respective Fresnel structure toward a reference pupil and the second angle corresponding to a direction of the ray, in the optically transparent substrate, transmitted from the reference off-axis position through the respective Fresnel structure toward the reference pupil. The reference off-axis position is located away from the respective optical axis of the lens. The method also includes transmitting the light through the lens toward the reference pupil.

In accordance with some embodiments, a lens is configured for transmitting light in a first medium to a first reference pupil. The lens includes an optically transparent substrate having a first lens surface and a second lens surface opposite to the first lens surface. The first lens surface includes a plurality of Fresnel structures. A respective Fresnel structure of the plurality of Fresnel structures includes a slope facet and a draft facet, the draft facet being characterized by a draft angle. The draft angle of the respective Fresnel structure is based on a distance of the respective Fresnel structure from a reference axis of the lens. The lens is associated with a respective optical axis. The reference off-axis position is located away from the respective optical axis of the lens. The draft angle of the respective Fresnel structure is between a first angle and a second angle, the first angle corresponding to a direction of a ray, in the first medium, transmitted from a reference off-axis position through the respective Fresnel structure toward a second reference pupil and the second angle corresponding to a direction of the ray, in the optically transparent substrate, transmitted from the reference off-axis position through the respective Fresnel structure toward the second reference pupil. The first reference pupil is located at a first distance from the optically transparent substrate. The second reference pupil is located at a second distance from the optically transparent substrate. The second distance is greater than the first distance.

In accordance with some embodiments, a method of making a lens for directing light from a display device toward a first reference pupil through a first medium includes configuring a lens that comprises an optically transparent substrate having a first lens surface and a second lens surface opposite to the first lens surface. The first lens surface includes a plurality of Fresnel structures. A respective Fresnel structure of the plurality of Fresnel structures includes a slope facet and a draft facet. The draft facet is characterized by a draft angle. The lens is associated with a respective optical axis. The reference off-axis position is located away from the respective optical axis of the lens. Configuring the lens includes determining the draft angle for the respective Fresnel structure based on the distance of the respective Fresnel structure from a reference axis of the lens so that the draft angle of the respective Fresnel structure is between a first angle and a second angle, the first angle corresponding to a direction of a ray, in the first medium, transmitted from a reference off-axis position through the respective Fresnel structure toward a second reference pupil and the second angle corresponding to a direction of the ray, in the optically transparent substrate, transmitted from the reference off-axis position through the respective Fresnel structure toward the second reference pupil. The first reference pupil is located at a first distance from the optically transparent substrate. The second reference pupil is located at a second distance from the optically transparent substrate. The second distance is greater than the first distance.

In accordance with some embodiments, a lens includes an optically transparent substrate having a first lens surface and a second lens surface opposite to the first lens surface. The first lens surface includes a plurality of Fresnel structures. A respective Fresnel structure of the plurality of Fresnel structures includes a slope facet and a draft facet. The respective Fresnel structure of the plurality of Fresnel structures is characterized by a representative pitch. The representative pitch of the respective Fresnel structure is based on a distance of the respective Fresnel structure from a reference axis of the lens.

In accordance with some embodiments, a method for reducing visibility of Fresnel structures includes transmitting light from a display device toward a lens comprising an optically transparent substrate having a first lens surface and a second lens surface opposite to the first lens surface. The first lens surface includes a plurality of Fresnel structures. A respective Fresnel structure of the plurality of Fresnel structures includes a slope facet and a draft facet. The respective Fresnel structure of the plurality of Fresnel structures is characterized by a representative pitch. The representative pitch of the respective Fresnel structure is based on a distance of the respective Fresnel structure from a reference axis of the lens.

Thus, the disclosed embodiments provide compact and light weight display devices with increased efficiency, effectiveness, and user satisfaction with such devices.

Embodiments according to the invention are in particular disclosed in the attached claims directed to a lens, a display device and corresponding methods, wherein any feature mentioned in one claim category, e.g. device, can be claimed in another claim category, e.g. in a method or use claim, as well. The dependencies or references back in the attached claims are chosen for formal reasons only. However any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Figure 1A:
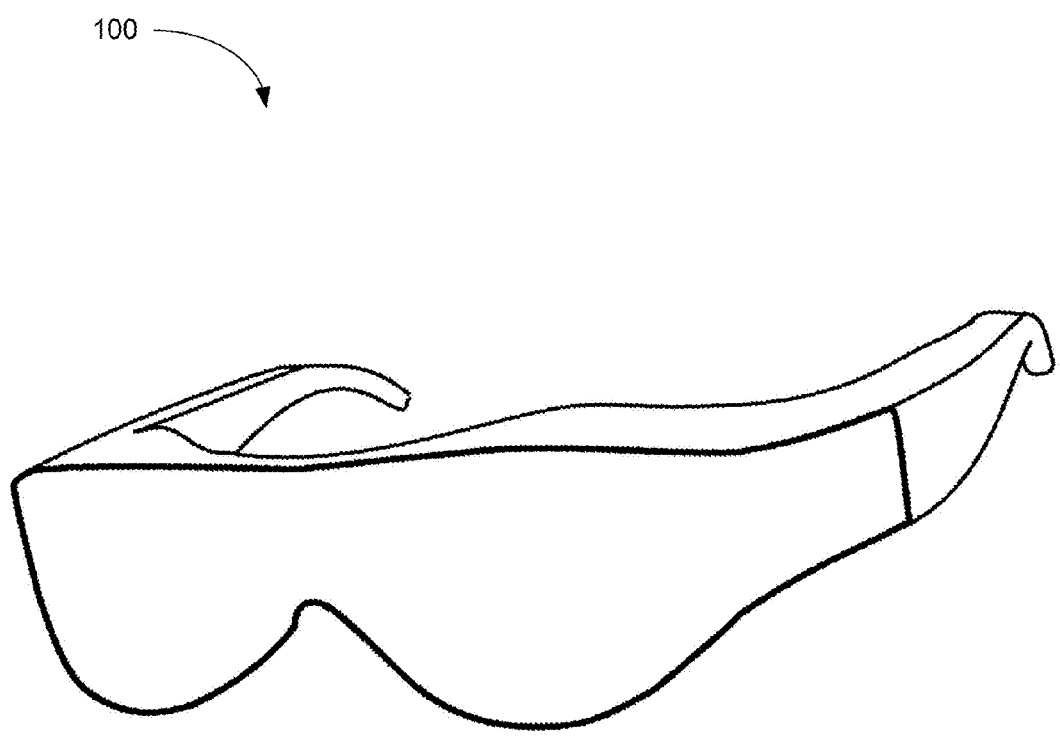
FIG. 1A is a perspective view of a display device in accordance with some embodiments.

These figures are not drawn to scale unless indicated otherwise.

DETAILED DESCRIPTION

Conventional head-mounted displays are larger and heavier than typical eyeglasses, because conventional head-mounted displays often include a complex set of optics that can be bulky and heavy. It is not easy for users to get used to wearing such large and heavy head-mounted displays.

Fresnel lenses, typically having multiple concentric annular sections that are offset from one another (e.g., for a circular lens), provide apertures and focal lengths comparable to conventional lenses. Because Fresnel lenses are typically thinner and lighter than conventional lenses of similar performance features (e.g., aperture and/or focal length), replacing conventional lenses in head-mounted displays with Fresnel lenses can reduce the size and weight of the head-mounted displays. However, Fresnel lenses suffer from diffractions and other optical artifacts associated with Fresnel structures, and thus, their use in imaging applications is limited.

The disclosed embodiments provide Fresnel lenses, with dynamic draft, that are compact and light, and reduce optical artifacts.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first surface could be termed a second surface, and, similarly, a second surface could be termed a first surface, without departing from the scope of the various described embodiments. The first surface and the second surface are both surfaces, but they are not the same surfaces.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1A illustrates display device 100 in accordance with some embodiments. In some embodiments, display device 100 is configured to be worn on a head of a user (e.g., by having the form of spectacles or eyeglasses, as shown in FIG. 1A) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user).

In some embodiments, display device 100 includes one or more components described below with respect to FIG. 1B. In some embodiments, display device 100 includes additional components not shown in FIG. 1B.

Figure 1B:
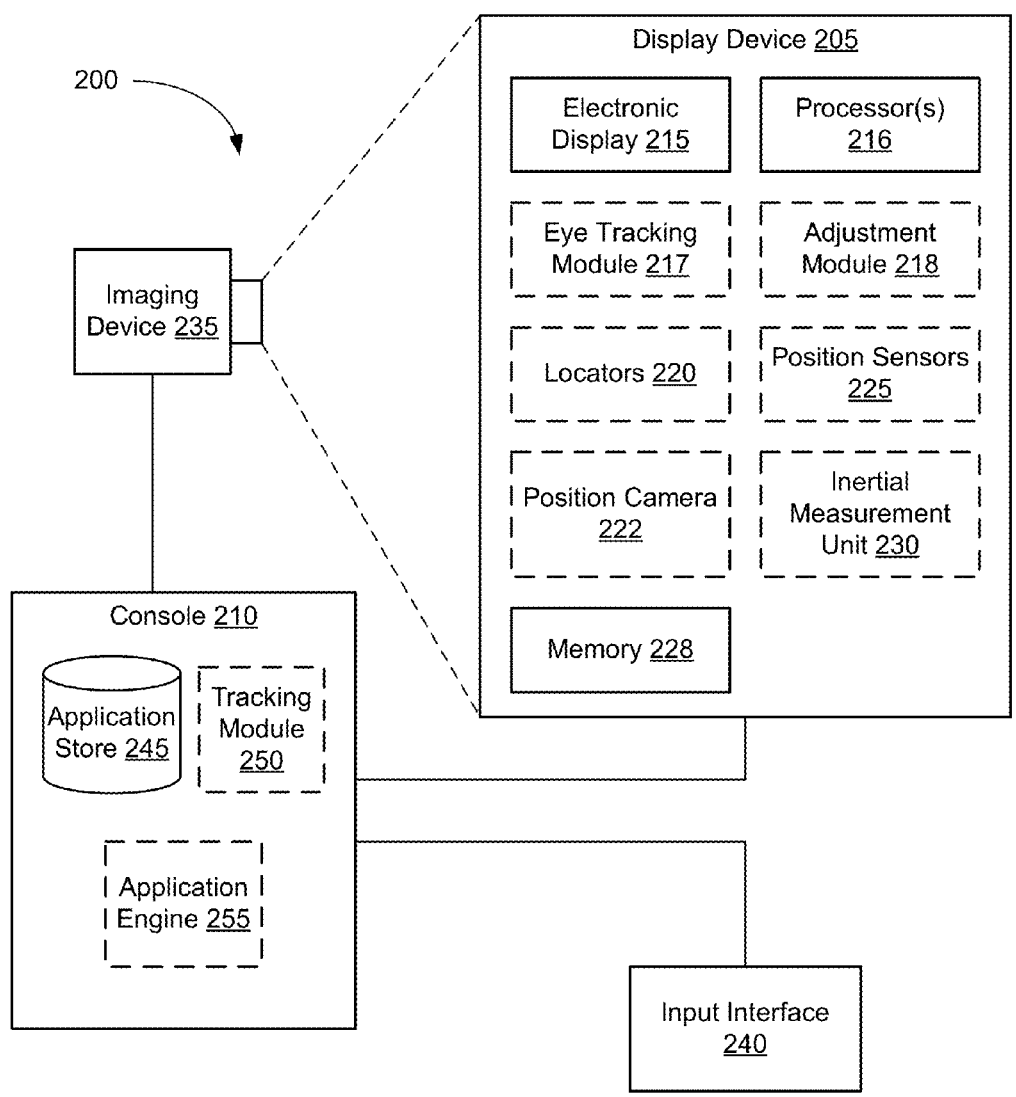
FIG. 1B is a block diagram of a system including a display device in accordance with some embodiments.

FIG. 1B is a block diagram of system 200 in accordance with some embodiments. The system 200 shown in FIG. 1B includes display device 205 (which corresponds to display device 100 shown in FIG. 1A), imaging device 235, and input interface 240 that are each coupled to console 210. While FIG. 1B shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver virtual reality, mixed reality, and augmented reality.

In some embodiments, as shown in FIG. 1A, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an AR device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable electronic display element or multiple adjustable electronic displays elements (e.g., a display for each eye of a user).

In some embodiments, the display element includes one or more light emission devices and a corresponding array of emission intensity array. An emission intensity array is an array of electro-optic pixels, opto-electronic pixels, some other array of devices that dynamically adjust the amount of light transmitted by each device, or some combination thereof. These pixels are placed behind one or more lenses. In some embodiments, the emission intensity array is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The emission intensity array is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described above.

Adjustment module 218 generates an image frame based on the determined locations of the pupils. In some embodiments, this sends a discrete image to the display that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 1B, console 210 includes application store 245, tracking module 250, and application engine 255. Some embodiments of console 210 have different modules than those described in conjunction with FIG. 1B. Similarly, the functions further described below may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 2A:
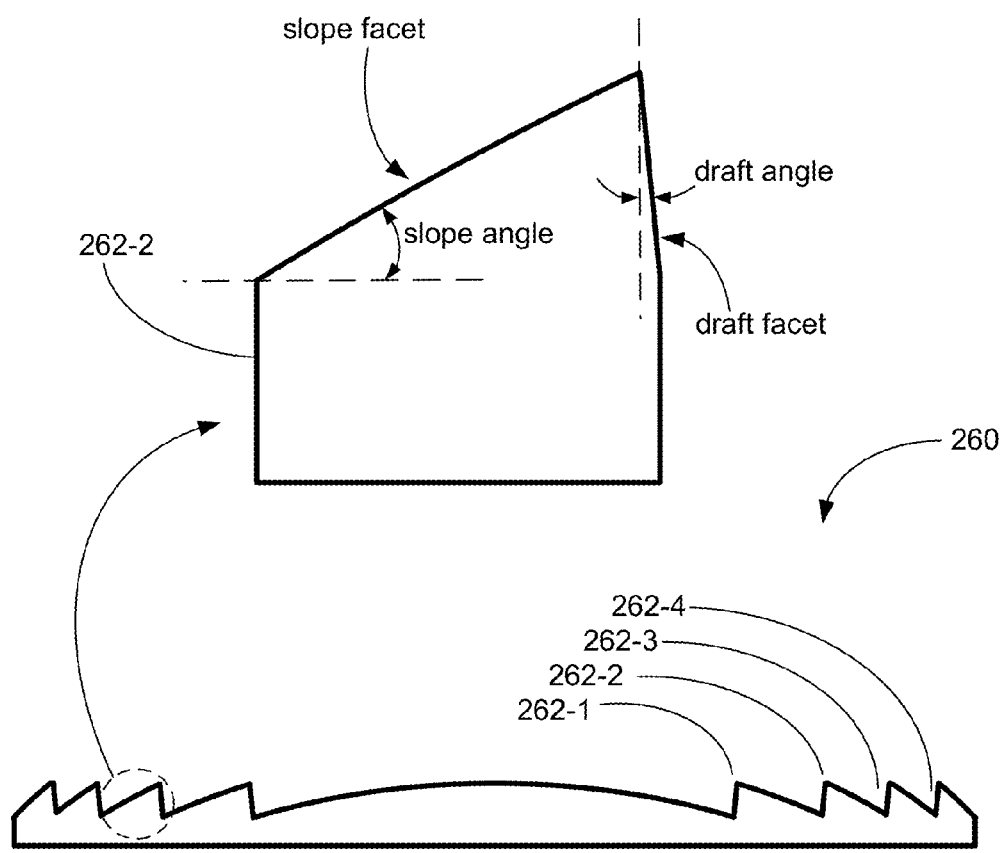
FIG. 2A illustrates a cross-section of a conventional Fresnel lens.

FIG. 2A illustrates a cross-section of conventional Fresnel lens 260. In some embodiments, a Fresnel lens, such as conventional Fresnel lens 260, includes a plurality of Fresnel structures 262 (e.g., a plurality of annular rings 262-1, 262-2, 262-3, and 262-4). As shown in FIG. 2A, each Fresnel structure 262 (e.g., Fresnel structure 262-2) has a slope facet and a draft facet. The draft facet is characterized by a representative draft angle (e.g., the draft facet is tilted by the representative draft angle from a reference axis). In some embodiments, the draft facet is a flat surface. In some embodiments, the draft facet is a curved surface, and the representative draft angle is an average draft angle for the draft facet. In some embodiments, the slope facet is characterized by a representative slope angle (e.g., the slope facet is tilted by the representative slope angle from the reference axis). In some embodiments, the slope facet is a flat surface. In some embodiments, the slope facet is a curved surface, and the representative slope angle is an average slope angle for the slope facet. In conventional Fresnel lens 260, Fresnel structures 262 (e.g., 262-1, 262-2, 262-3, and 262-4) have a same draft angle.

Figure 2B:
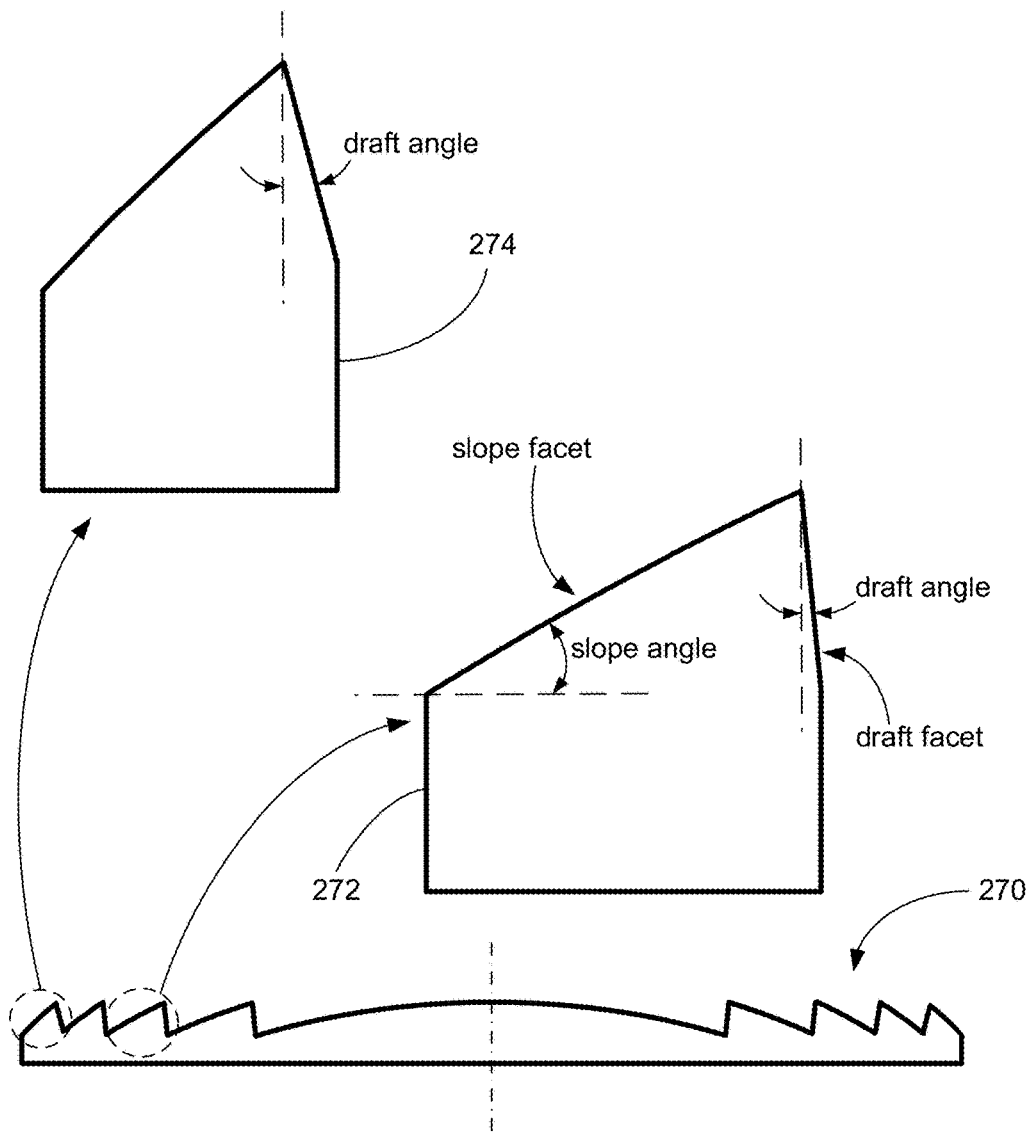
FIG. 2B illustrates a cross-section of a Fresnel lens with dynamic draft in accordance with some embodiments.
Figure 2C:
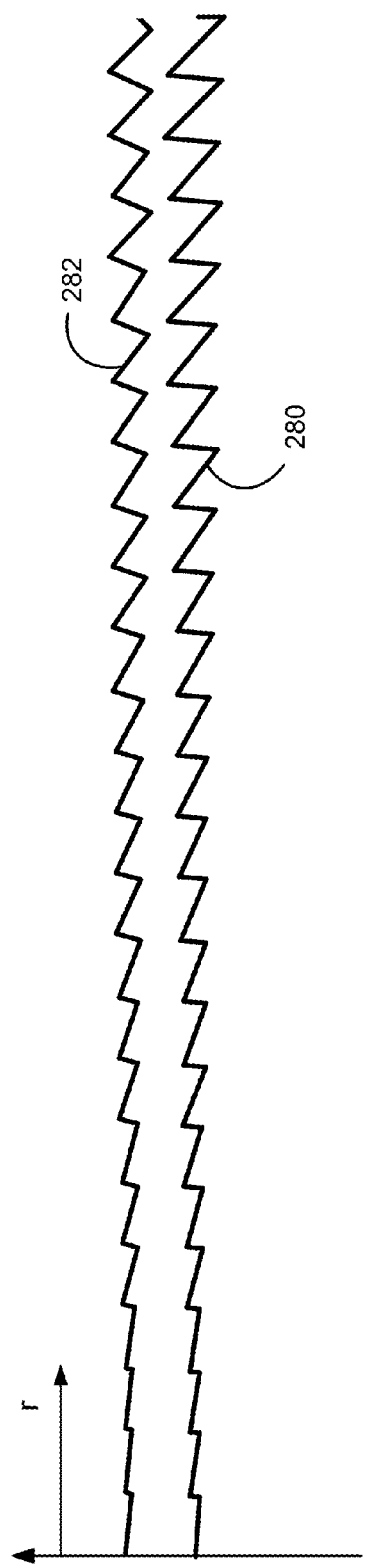
FIG. 2C illustrates surface profiles of a conventional Fresnel lens and a Fresnel lens with dynamic draft in accordance with some embodiments.

FIG. 2B illustrates a cross-section of Fresnel lens 270 with dynamic draft in accordance with some embodiments. In Fresnel lens 270, the draft angle of each Fresnel structure is based on a distance of the Fresnel structure from a center of the lens. For example, as shown in FIG. 2C, a Fresnel structure located close to the center of the lens has a draft facet that is steeper than a draft facet of a Fresnel structure located away from the center of the lens (e.g., a Fresnel structure located closer to the center of the lens has a smaller draft angle than a draft angle of a Fresnel structure located away from the center of the lens). In FIG. 2B, Fresnel structure 272 has a particular draft angle, and Fresnel structure 274 has a draft angle that is distinct from the draft angle of Fresnel structure 272 (e.g., Fresnel structure 272 has a draft angle that is less than the draft angle of Fresnel structure 274).

FIG. 2C illustrates surface profiles of conventional Fresnel lens 280 and Fresnel lens with dynamic draft 282 in accordance with some embodiments. In FIG. 2C, the surface profiles are shown as functions of a distance r from a center of a lens. As explained above, a conventional Fresnel lens has a constant draft angle, independent of a position of each Fresnel structure (e.g., a distance from a center of the lens to the Fresnel structure). A Fresnel lens with dynamic draft has Fresnel structures with different draft angles, where the draft angle for each Fresnel structure is based on a distance from a center of the lens to the Fresnel structure. In FIG. 2C, the draft angle increases (e.g., the draft facet becomes less steep) when the distance from the center of the lens increases.

Figure 2D:
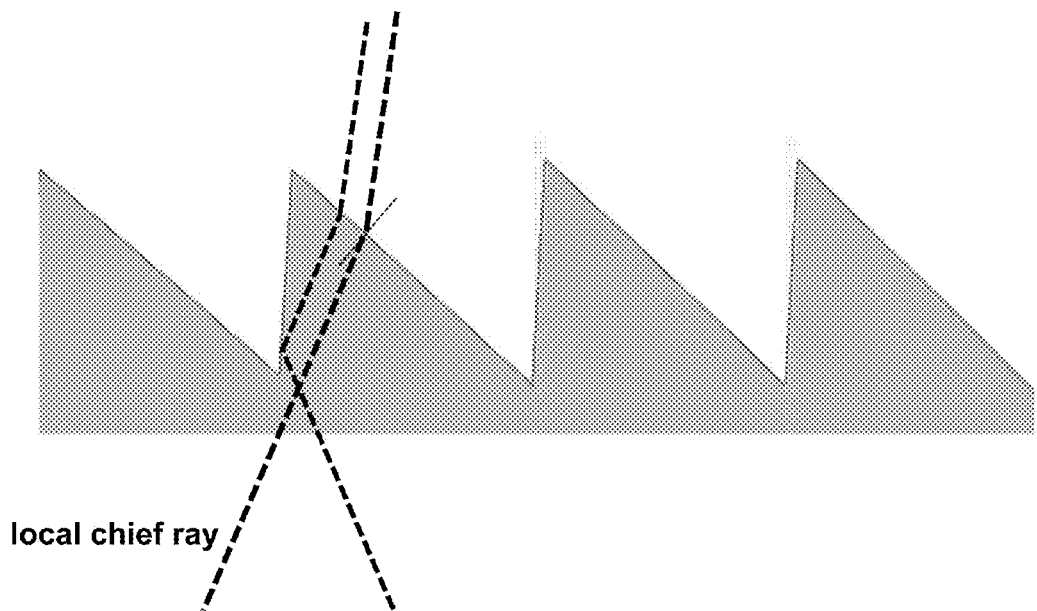
FIGS. 2D and 2E illustrate interaction between incoming light and a draft facet in accordance with some embodiments.
Figure 2E:
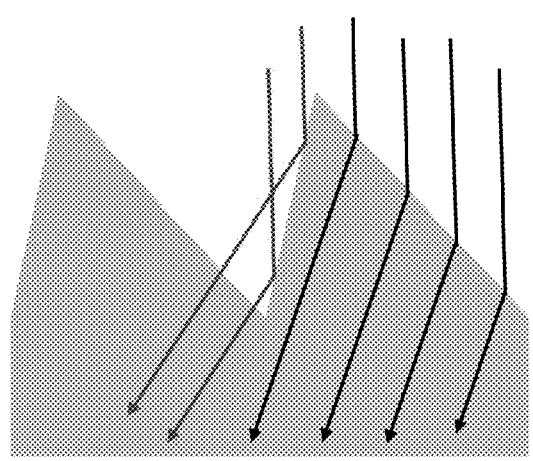

FIGS. 2D and 2E illustrate interaction between incoming light and a draft facet in accordance with some embodiments.

FIG. 2D illustrates that incoming light is refracted on a slope facet of a Fresnel structure. A portion of the light refracted on the slope facet impinges on the draft facet of the Fresnel structure, and a portion of the light impinging on the draft facet is reflected by the draft facet (e.g., by total internal reflection), which increases stray light. Reflection by the draft facet is called herein an "inner mode."

FIG. 2E illustrates that incoming light is refracted on the slope facet of a Fresnel structure. A portion of the incoming light impinges on the draft facet of the Fresnel structure, and is reflected. A portion of the reflected light enters through the slope facet of an adjacent Fresnel structure, which also increases stray light.

As shown in FIGS. 2D and 2E, interaction between incoming light and a draft facet increases stray light, thereby increasing optical artifacts. Such optical artifacts are reduced by using a Fresnel structure with dynamic draft, as shown in FIG. 2F.

Figure 2F:
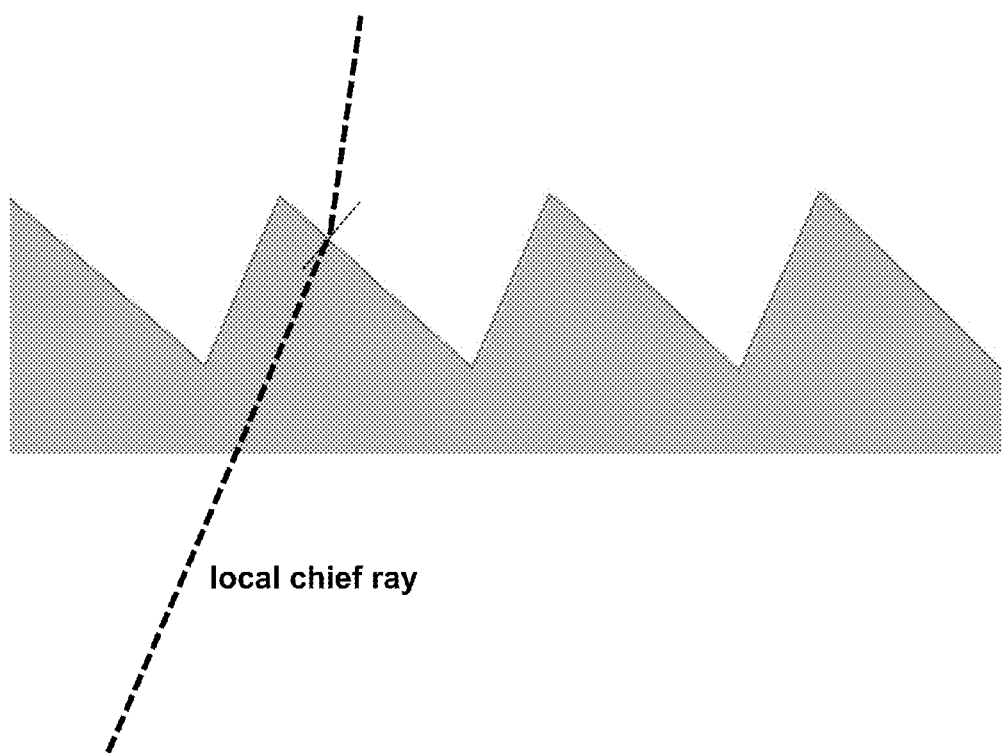
FIG. 2F illustrates reduction in interaction between incoming light and a draft facet in accordance with some embodiments.

FIG. 2F illustrates reduction in interaction between incoming light and a draft facet in accordance with some embodiments. In FIG. 2F, the draft angle is selected so that the draft facet is parallel to the light refracted on the slope facet. Thus, the light refracted on the slope facet does not interact with the draft facet, which reduces stray light, thereby reducing optical artifacts.

Figure 2G:
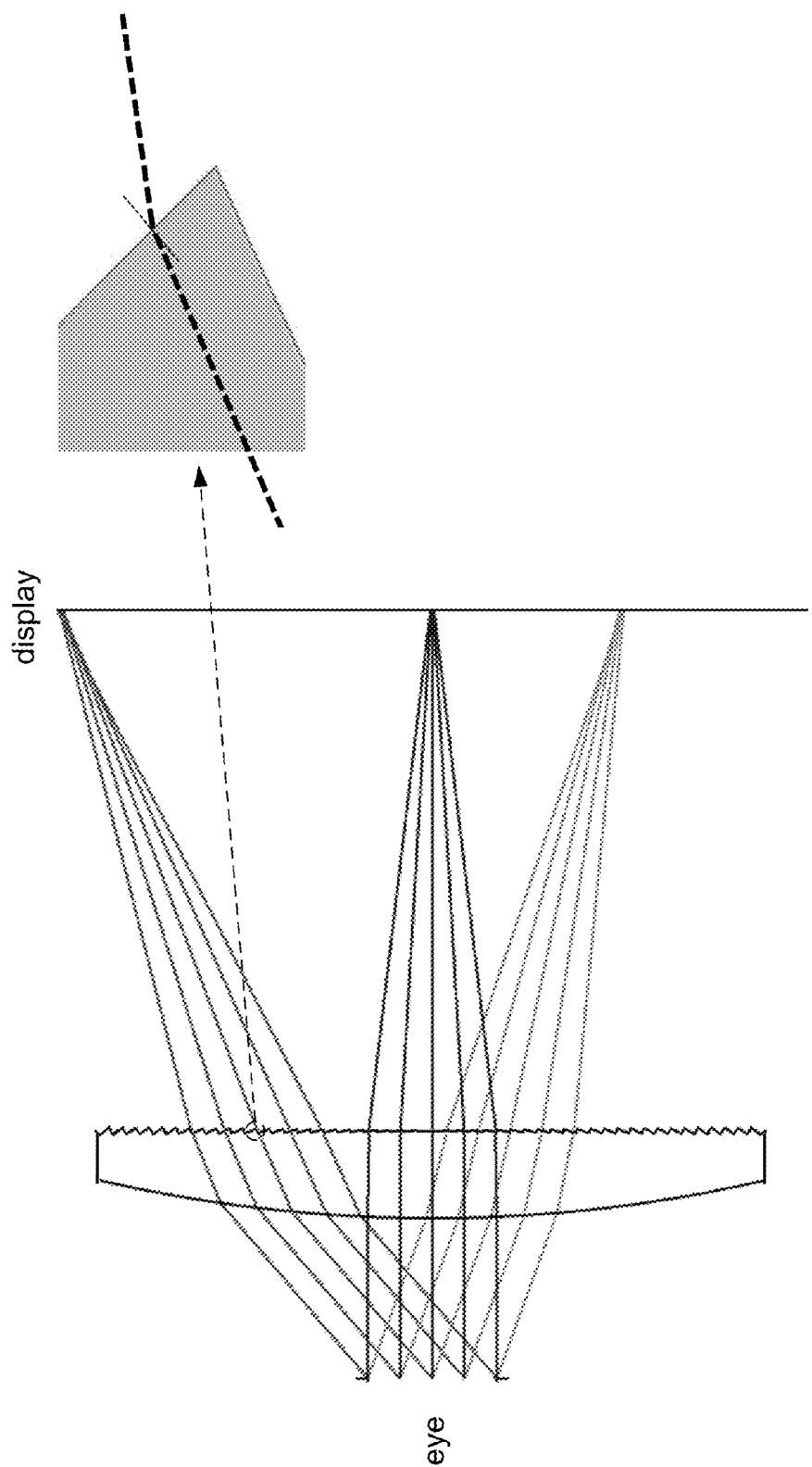
FIG. 2G shows a cross-sectional view of a Fresnel lens with dynamic draft in accordance with some embodiments.

FIG. 2G shows a cross-sectional view of a Fresnel lens with dynamic draft in accordance with some embodiments. Light from a display device is focused by a Fresnel lens with dynamic draft. In some embodiments, the focused light is sent toward an eye of a user. As explained above with respect to FIG. 2F, the draft facets are angled so that interaction between the incoming light (after refraction on the slope facet) and the draft facets is reduced or eliminated.

FIG. 2G also shows that a peripheral region of the lens (e.g., a region that is further away from the center of the lens) is used for focusing light from a peripheral region of the display device, and a central region of the lens is used for focusing light from a central region of the display device. As explained above with respect to FIG. 2C, the draft angle is selected based on a position of each Fresnel structure. For example, a Fresnel structure located closer to a center of the lens has a small draft angle (which leads to a steep draft facet) and a Fresnel structure located away from the center of the lens has a large draft angle (which leads to a less steep draft facet). Thus, the large draft angle in the peripheral region of the lens facilitates reduction of optical artifacts when transmitting light from the peripheral region of the display device, and the small draft angle in the central region of the lens facilitates reduction of optical artifacts when transmitting light from the central region of the display device. Thus, the Fresnel lens with dynamic draft, shown in FIG. 2G, is especially effective in reducing optical artifacts when imaging light from the display device.

Figure 2H:
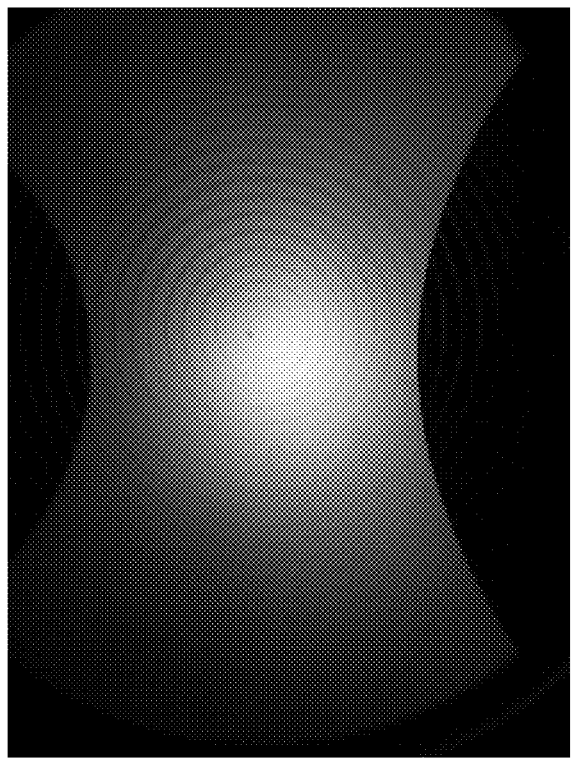
FIG. 2H shows optical artifacts caused by a conventional Fresnel lens and a Fresnel lens with dynamic draft in accordance with some embodiments.
Figure 2H:
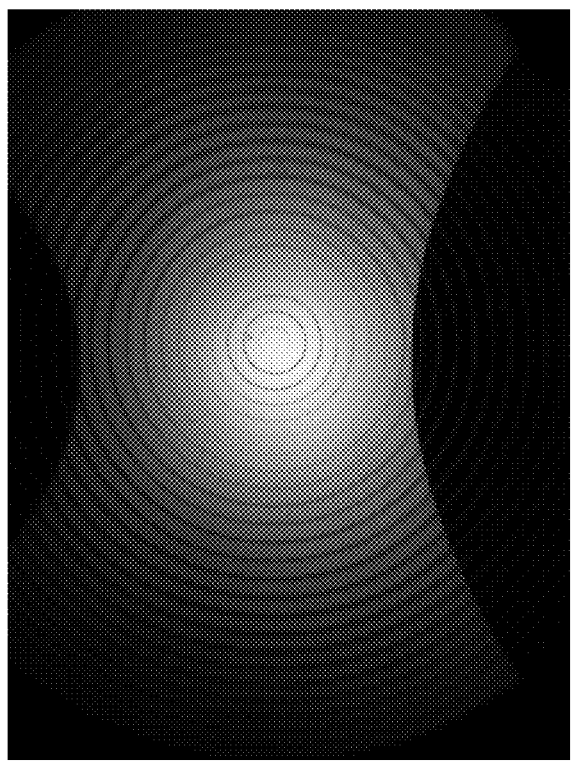
Figure 2I:
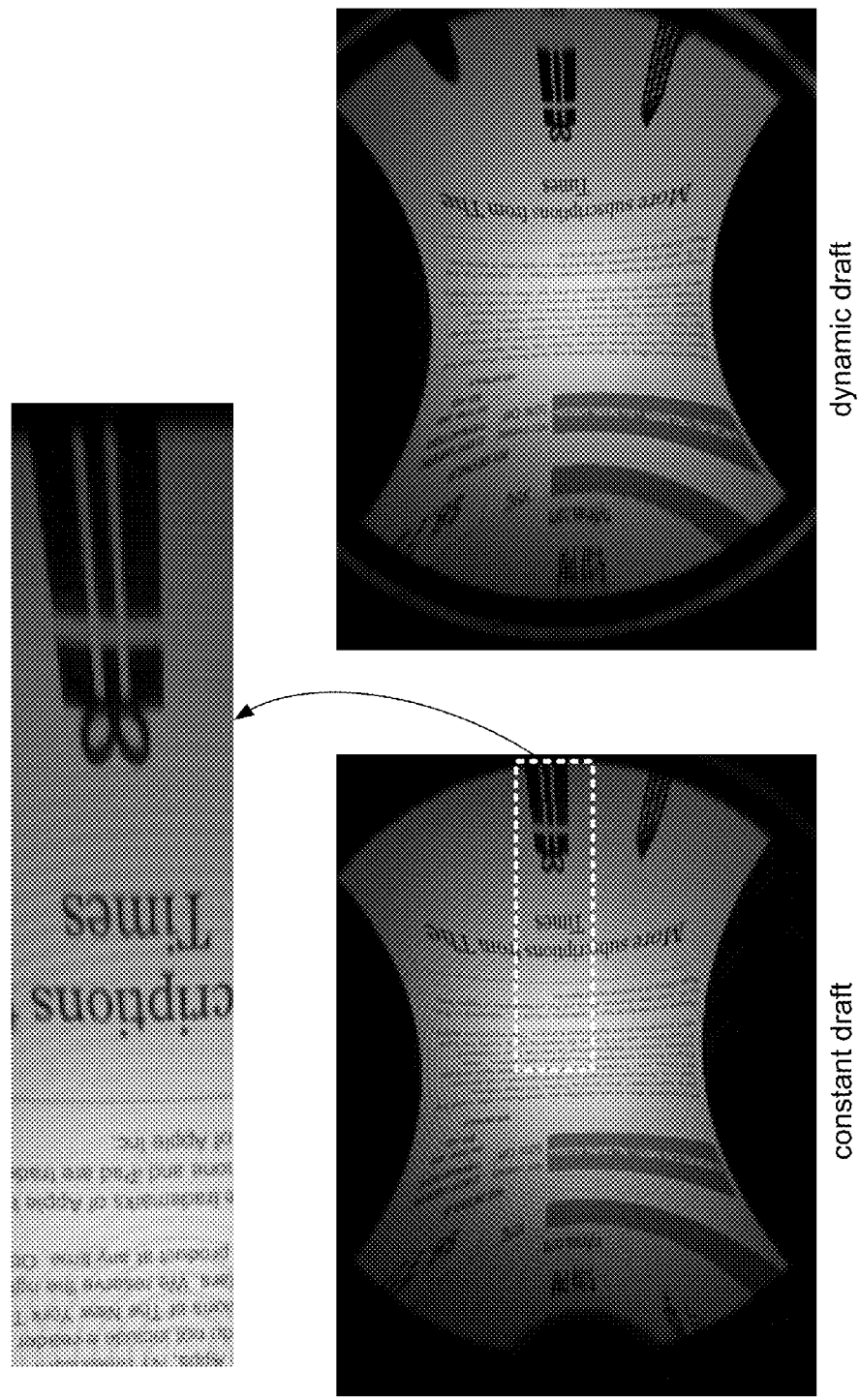
FIG. 2I shows optical artifacts caused by a conventional Fresnel lens and a Fresnel lens with dynamic draft in accordance with some embodiments.

FIGS. 2H and 2I show optical artifacts caused by a conventional Fresnel lens and a Fresnel lens with dynamic draft in accordance with some embodiments.

FIG. 2H shows images of a white surface collected with a conventional Fresnel lens with constant draft and a Fresnel lens with dynamic draft. The image of a white surface collected with a conventional Fresnel lens (shown on the left side of FIG. 2H) shows periodic rings, which are caused by the draft facets of the conventional Fresnel lens. In comparison, in the image of a white surface collected with a Fresnel lens with dynamic draft (shown on the right side of FIG. 2H), periodic rings are less visible.

FIG. 2I shows images of a display collected with a conventional Fresnel lens with constant draft and a Fresnel lens with dynamic draft. The image of a display collected with a conventional Fresnel lens (shown on the left side of FIG. 2I) shows periodic rings, similar to the image collected with a conventional Fresnel lens with constant draft, as shown in FIG. 2H. FIG. 2I also includes an enlarged view of a portion of the image collected with the conventional Fresnel lens with constant draft, which better shows the periodic structures in the image collected with the conventional Fresnel lens. In the image of a display collected with a Fresnel lens with dynamic draft (shown on the right side of FIG. 2I), the visibility of the periodic rings are reduced, similar to the image collected with a Fresnel lens with dynamic draft, as shown in FIG. 2H.

Figure 3A:
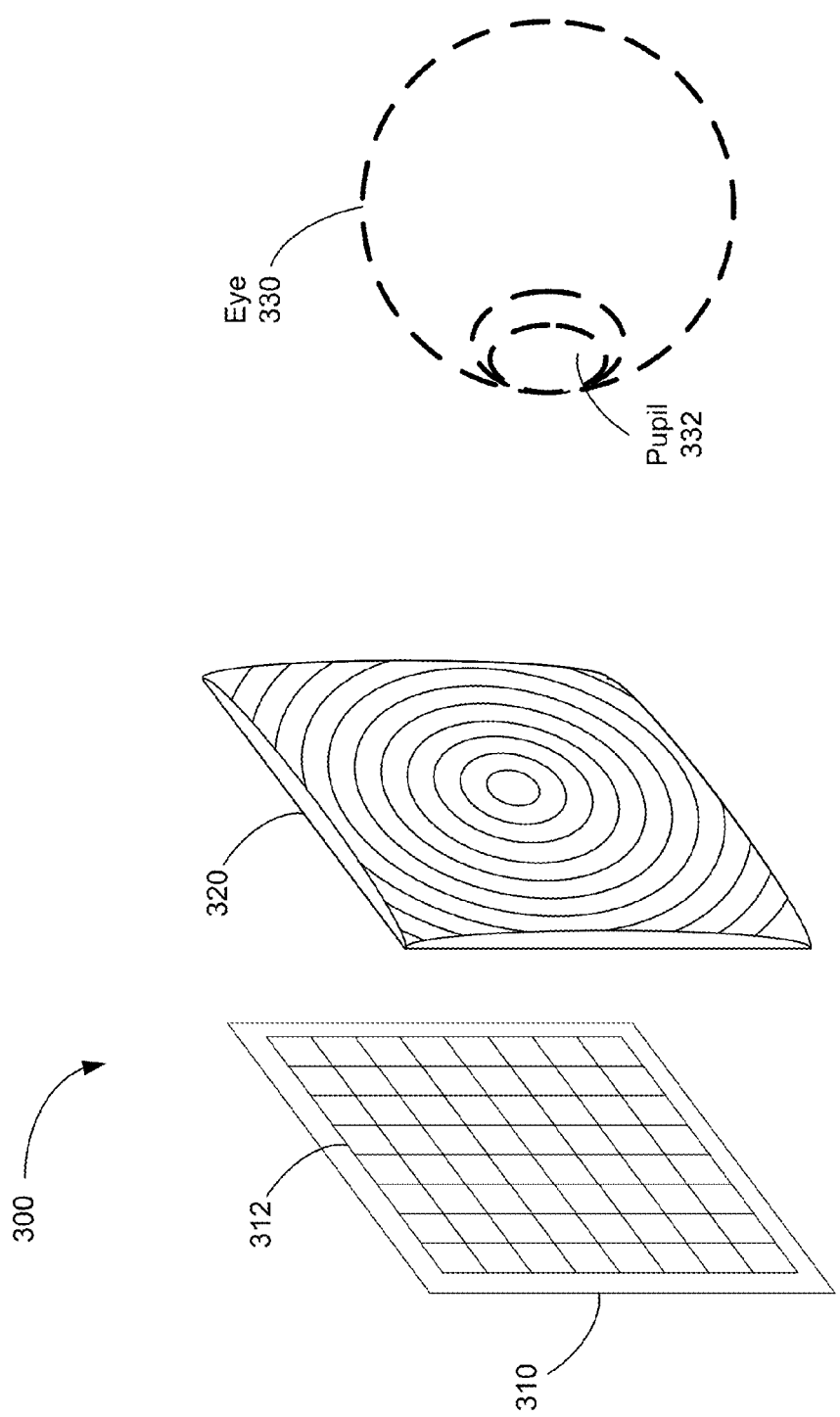
FIG. 3A is an isometric view of a display device in accordance with some embodiments.

FIG. 3A is an isometric view of display device 300 in accordance with some embodiments. In some other embodiments, display device 300 is part of some other electronic display (e.g., digital microscope, etc.). In some embodiments, display device 300 includes light emission device array 310 and one or more lenses (e.g., lens 320). In some embodiments, display device 300 also includes an emission intensity array and an IR detector array.

Light emission device array 310 emits image light and optional IR light toward the viewing user. Light emission device array 310 may be, e.g., an array of LEDs, an array of microLEDs, an array of OLEDs, or some combination thereof. Light emission device array 310 includes light emission devices 312 that emit visible light (and optionally includes devices that emit IR light).

The emission intensity array is configured to selectively attenuate light emitted from light emission array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner the emission intensity array is able to control what portion of the image light emitted from light emission device array 310 is passed to the one or more lenses (e.g., lens 320). In some embodiments, display device 300 uses the emission intensity array to facilitate providing image light to a location of pupil 332 of eye 330 of a user, and minimize the amount of image light provided to other areas in the eyebox.

Similar to FIG. 2G, which illustrates that a lens is used to transmit light from a display to an eye, in FIG. 3A, one or more lenses (e.g., lens 320) receive the modified image light (e.g., attenuated light) from the emission intensity array (or directly from emission device array 310), and directs the modified image light to a location of pupil 332. Lens 320 includes one or more diffractive optics. In some embodiments, the one or more lenses include one or more active lenses. An active lens is a lens whose lens curvature and/or refractive ability may be dynamically controlled (e.g., via a change in applied voltage). An active lens may be a liquid crystal lens, a liquid lens (e.g., using electro-wetting), or some other lens whose curvature and/or refractive ability may be dynamically controlled, or some combination thereof. Accordingly, in some embodiments, system 200 may dynamically adjust the curvature and/or refractive ability of active lenslets to direct light received from the emission device array 310 to pupil 332.

In some embodiments, lens 320 includes a Fresnel lens, described below with respect to FIGS. 3B-3J and 4A-4C. In some embodiments, one or more of the lenses illustrated in FIGS. 3B-3J and 4A-4D include dynamic draft.

An optional IR detector array detects IR light that has been retro-reflected from the retina of eye 330, a cornea of eye 330, a crystalline lens of eye 330, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device array 310 and the emission intensity array make up a display element. Alternatively, the display element includes light emission device array 310 (e.g., when light emission device array 310 includes individually adjustable pixels) without the emission intensity array. In some embodiments, the display element additionally includes the IR array. In some embodiments, in response to a determined location of pupil 332, the display element adjusts the emitted image light such that the light output by the display element is refracted by one or more lenses (e.g., lens 320) toward the determined location of pupil 332, and not toward other locations in the eyebox.

Figure 3B:
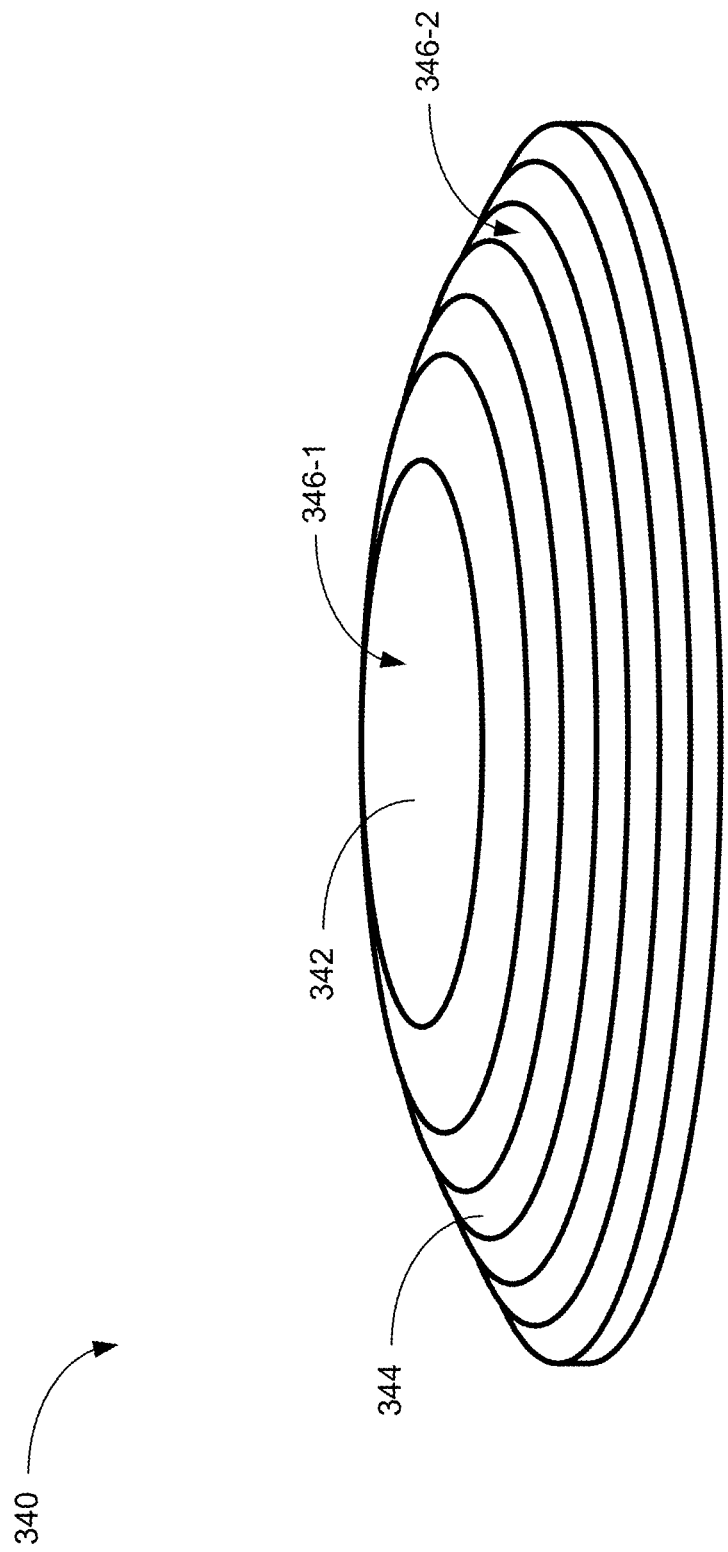
FIG. 3B is an isometric view of a lens from a first direction in accordance with some embodiments.

FIG. 3B is an isometric view of lens 340 from a first direction (e.g., a direction from which first lens surface 346 of lens 340 is visible) in accordance with some embodiments. Lens 340 includes first portion 342 (e.g., a central portion) and second portion 344 (e.g., an annular portion) around first portion 342. First portion 342 of lens 340 includes portion 346-1 of first lens surface 346. In some embodiments, portion 346-1 of first lens surface 346 is a flat surface. In some embodiments, portion 346-1 of first lens surface 346 is a Fresnel surface (e.g., Fresnel structures arranged on a flat surface). Second portion 344 of lens 340 includes portion 346-2 of first lens surface 346. In some embodiments, portion 346-2 of first lens surface 346 is a convex surface. In some embodiments, portion 346-2 of first lens surface 346 is a Fresnel surface (e.g., Fresnel structures arranged on a convex surface).

In some embodiments, Fresnel structures have a constant pitch (e.g., 50 μm, 60 μm, 70 μm, 80 μm, 90 μm, 100 μm, 150 μm, 200 μm, 250 μm, 300 μm, 350 μm, 400 μm, 450 μm, 500 μm, 550 μm, 600 μm, 700 μm, 800 μm, 900 μm, 1 mm, 1.1 mm, 1.2 mm, 1.3 mm, 1.4 mm, 1.5 mm, 2 mm, 3 mm, etc.).

The lens shown in FIG. 3B is axisymmetric (e.g., rotationally symmetric about a center of the lens). Although the lens shown in FIG. 3B is a circular lens, in some embodiments, a portion of the circular lens is cut out (e.g., a rectangular portion of the lens, as shown in FIG. 3A, is used).

Figure 3C:
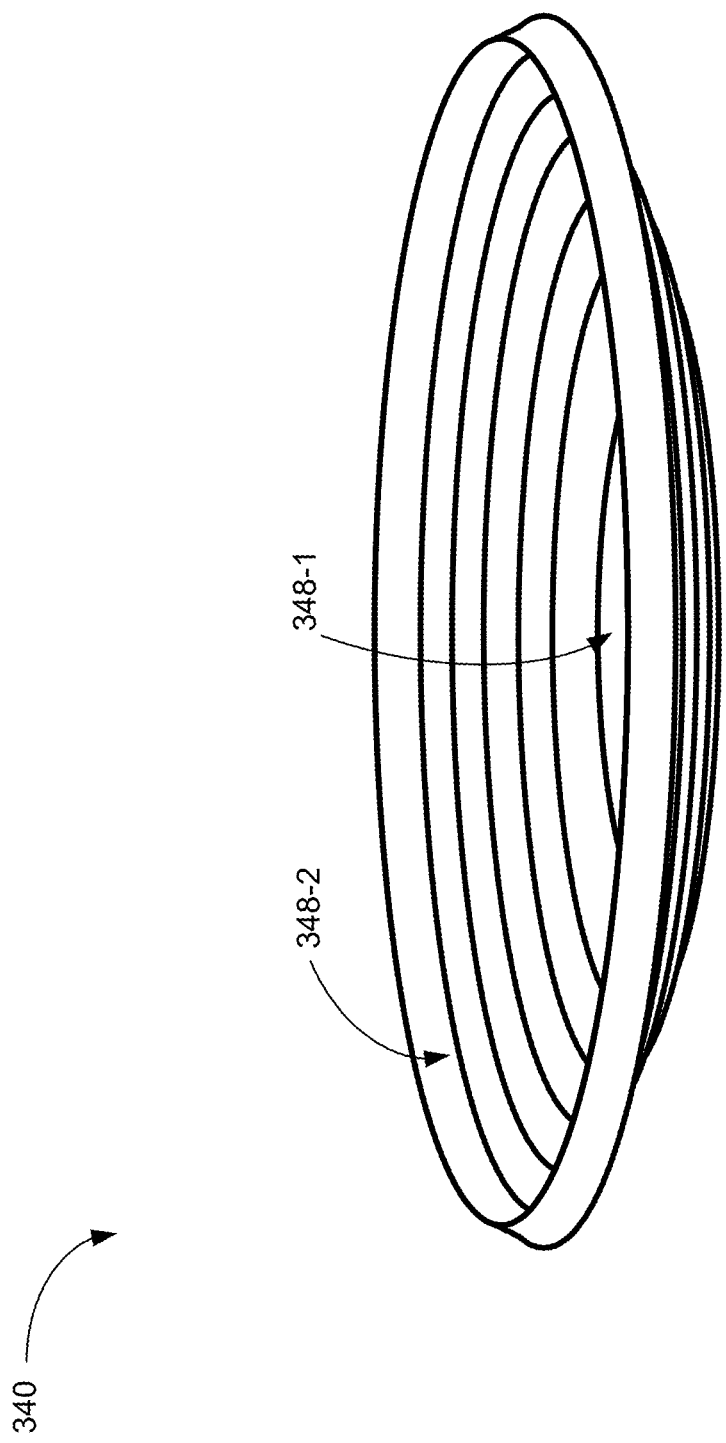
FIG. 3C is an isometric view of the lens shown in FIG. 3B from a second direction in accordance with some embodiments.

FIG. 3C is an isometric view of lens 340 shown in FIG. 3B from a second direction (e.g., a direction from which second lens surface 348 that is opposite to first lens surface 346 shown in FIG. 3B is visible) in accordance with some embodiments. First portion 342 of lens 340 includes portion 348-1 of second lens surface 348. In some embodiments, portion 348-1 of second lens surface 348 is a convex surface. In some embodiments, portion 348-1 of second lens surface 348 does not include Fresnel structures. Second portion 344 of lens includes portion 348-2 of second lens surface 348. In some embodiments, portion 348-2 of second lens surface 348 is a concave surface. In some embodiments, portion 348-2 of second lens surface 348 is a Fresnel surface (e.g., a concave surface with Fresnel structures).

Figure 3D:
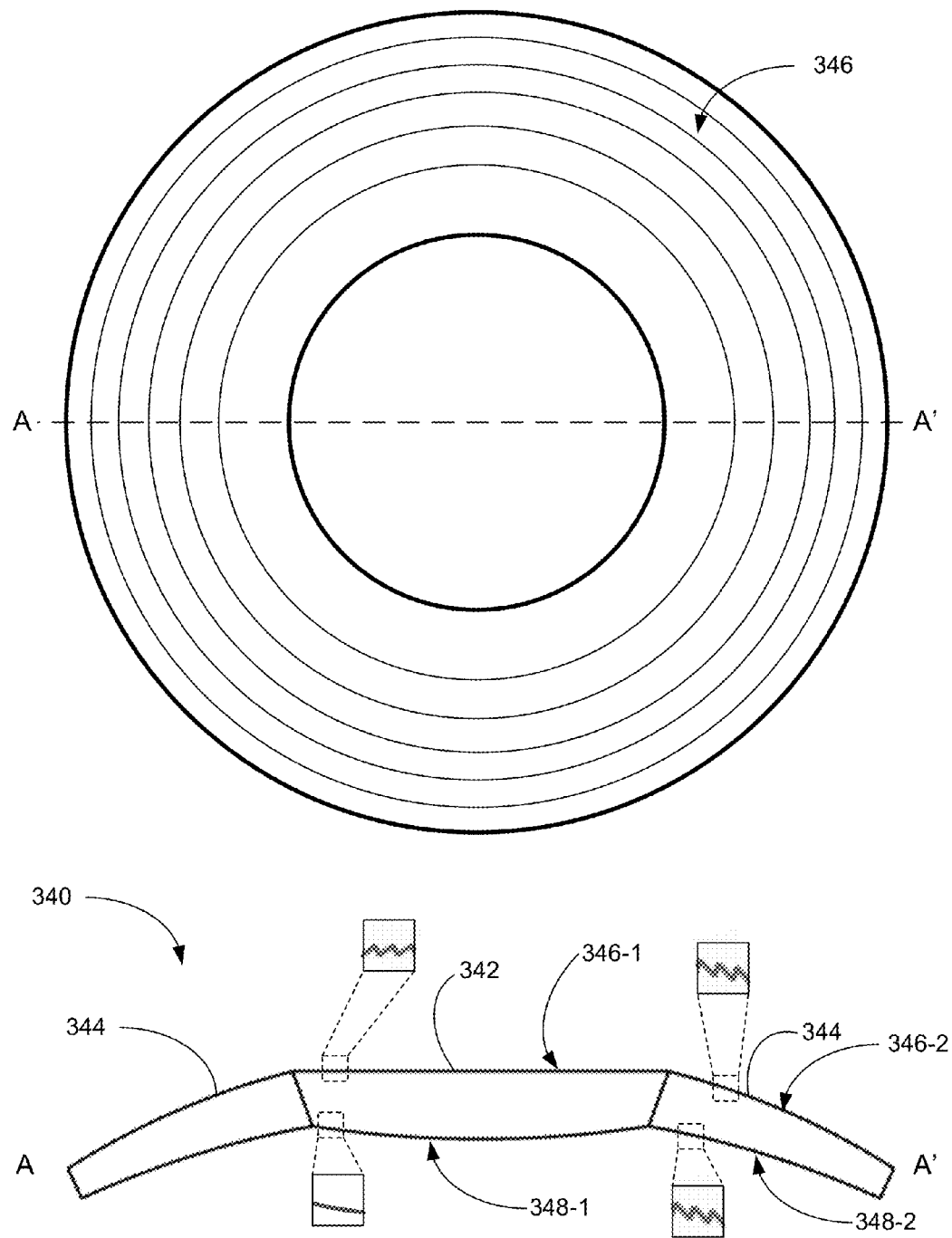
FIG. 3D shows a plan view and a cross-sectional view of the lens shown in FIG. 3B.

FIG. 3D shows a plan view and a cross-sectional view of lens 340 shown in FIG. 3B. As explained above, lens 340 includes first portion 342 and second portion 344 around first portion 342. First portion 342 includes portion 346-1 of first lens surface 346, and portion 348-1 of second lens surface 348 that is opposite to portion 346-1 of first lens surface 346. Second portion 344 includes portion 346-2 of first lens surface 346, and portion 348-2 of second lens surface 348 that is opposite to portion 346-2 of first lens surface 346. Portion 346-1 is defined by a Fresnel surface profile (e.g., a surface profile that includes Fresnel structures, such as Fresnel structures arranged on a flat surface). Portion 348-1 is defined by a smooth surface profile (e.g., a surface profile that does not include Fresnel structures, such as a convex surface without Fresnel structures). Portion 346-2 is defined by a Fresnel surface profile (e.g., a surface profile that includes Fresnel structures, such as Fresnel structures arranged on a convex surface). Portion 348-2 is defined by a Fresnel surface profile (e.g., a surface profile that includes Fresnel structures, such as Fresnel structures arranged on a concave surface). The insets in FIG. 3D show enlarged views of corresponding surfaces.

As described above, the central region of lens 340 corresponding to first portion 342 includes Fresnel structures on only one of the two lens surfaces, first lens surface 346 and second lens surface 348. This reduces optical artifacts in lens 340, compared to a lens having Fresnel structures on both lens surfaces. Because optical artifacts are reduced for the central region, a user viewing an image through lens 340 is less likely to perceive optical artifacts. The annular region of lens 340 corresponding to second portion 344 includes Fresnel structures on both first lens surface 346 and second lens surface 348. This increases refraction of light passing through the annular region of lens 340.

In some embodiments, when lens 340 is used in a display device (e.g., display device 300), lens 340 is positioned so that first lens surface 346 faces light emission device array 310 (and second lens surface 348 faces an eye of a user when the eye of the user is placed adjacent to the display device). In some other embodiments, when lens 340 is used in a display device (e.g., display device 300), lens 340 is positioned so that second lens surface 348 faces light emission device array 310 (and first lens surface 346 faces the eye of the user when the eye of the user is placed adjacent to the display device).

In some embodiments, Fresnel structures on first lens surface 346 have dynamic draft. In some embodiments, Fresnel structures on second lens surface 348 have dynamic draft. In some embodiments, Fresnel structures on first lens surface 346 have dynamic draft, and Fresnel structures on second lens surface 348 have constant draft. In some embodiments, Fresnel structures on second lens surface 348 have dynamic draft, and Fresnel structures on first lens surface 346 have constant draft.

Figure 3E:
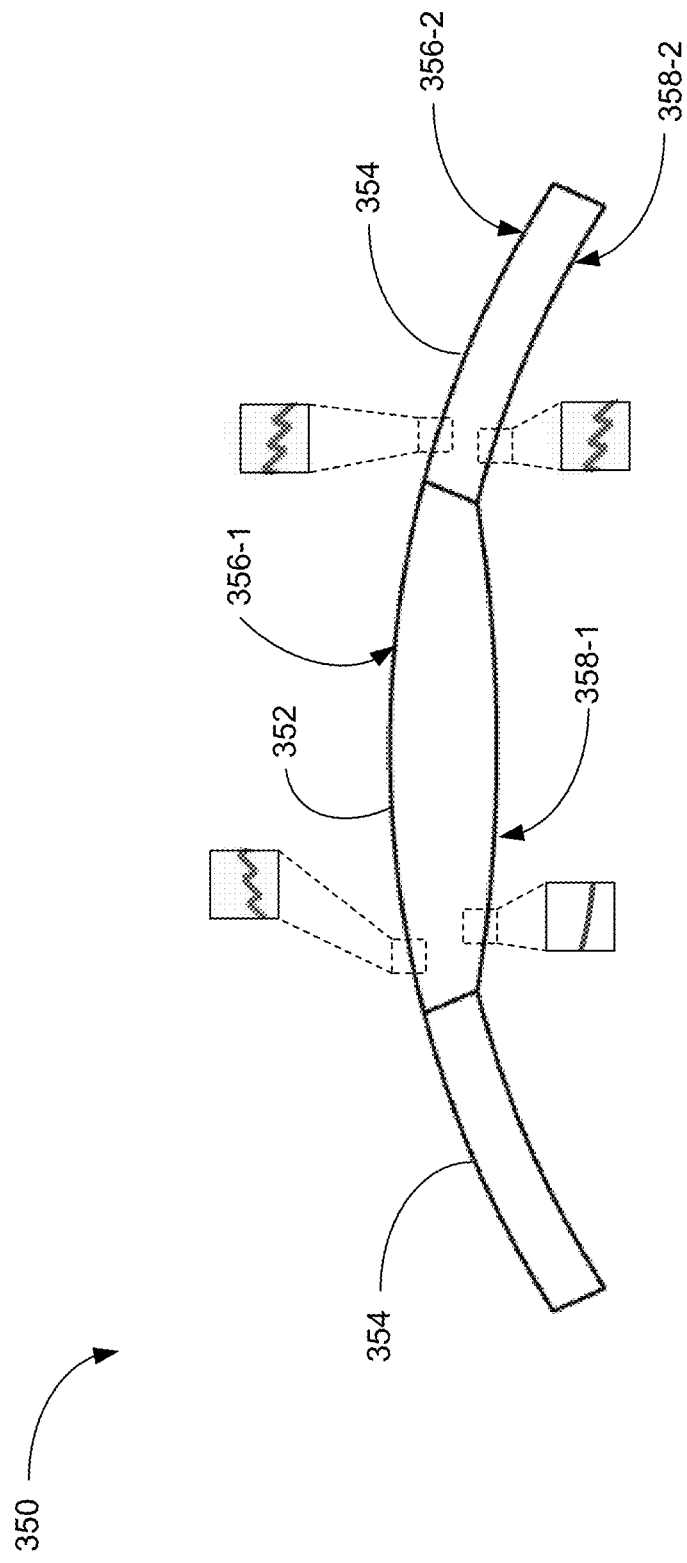
FIG. 3E is a cross-sectional view of a lens in accordance with some embodiments.

FIG. 3E is a cross-sectional view of lens 350 in accordance with some embodiments.

Lens 350 includes first portion 352 and second portion 354 around first portion 352. First portion 352 includes portion 356-1 of first lens surface 356, and portion 358-1 of second lens surface 358 that is opposite to portion 356-1 of first lens surface 356. Second portion 354 includes portion 356-2 of first lens surface 356, and portion 358-2 of second lens surface 358 that is opposite to portion 356-2 of first lens surface 356. Portion 356-1 is defined by a Fresnel surface profile (e.g., a surface profile that includes Fresnel structures, such as Fresnel structures arranged on a convex surface). Portion 358-1 is defined by a smooth surface profile (e.g., a surface profile that does not include Fresnel structures, such as a convex surface without Fresnel structures). Portion 356-2 is defined by a Fresnel surface profile (e.g., a surface profile that includes Fresnel structures, such as Fresnel structures arranged on a convex surface). Portion 358-2 is defined by a Fresnel surface profile (e.g., a surface profile that includes Fresnel structures, such as Fresnel structures arranged on a concave surface). The insets in FIG. 3E show enlarged views of corresponding surfaces.

In lens 350, first lens surface 356 transitions continuously from portion 356-1 to portion 356-2. For example, in some embodiments, a slope of portion 356-1 adjacent to a junction between portion 356-1 and portion 356-2 is the same as a slope of portion 356-2 adjacent to the junction between portion 356-1 and portion 356-2. In some embodiments, a derivative of the slope of portion 356-1 adjacent to a junction between portion 356-1 and portion 356-2 is the same as a derivative of the slope of portion 356-2 adjacent to the junction between portion 356-1 and portion 356-2. In some embodiments, a second derivative of the slope of portion 356-1 adjacent to a junction between portion 356-1 and portion 356-2 is the same as a second derivative of the slope of portion 356-2 adjacent to the junction between portion 356-1 and portion 356-2. This transition reduces optical artifacts and reduces the visibility of the transition.

In some embodiments, when lens 350 is used in a display device (e.g., display device 300), lens 350 is positioned so that first lens surface 356 faces light emission device array 310 (and second lens surface 358 faces an eye of a user when the eye of the user is placed adjacent to the display device). In some other embodiments, when lens 350 is used in a display device (e.g., display device 300), lens 350 is positioned so that second lens surface 358 faces light emission device array 310 (and first lens surface 356 faces the eye of the user when the eye of the user is placed adjacent to the display device).

In some embodiments, Fresnel structures on first lens surface 356 have dynamic draft. In some embodiments, Fresnel structures on second lens surface 358 have dynamic draft. In some embodiments, Fresnel structures on first lens surface 356 have dynamic draft, and Fresnel structures on second lens surface 358 have constant draft. In some embodiments, Fresnel structures on second lens surface 358 have dynamic draft, and Fresnel structures on first lens surface 356 have constant draft.

In some embodiments, lens 350 in FIG. 3E provides a temporal field of view of 70°, 71°, 72°, 73°, 74°, 75°, 76°, 77°, 78°, 79°, 80°, 90°, or 100° (e.g., for an eye relief of 20 mm).

Figure 3F:
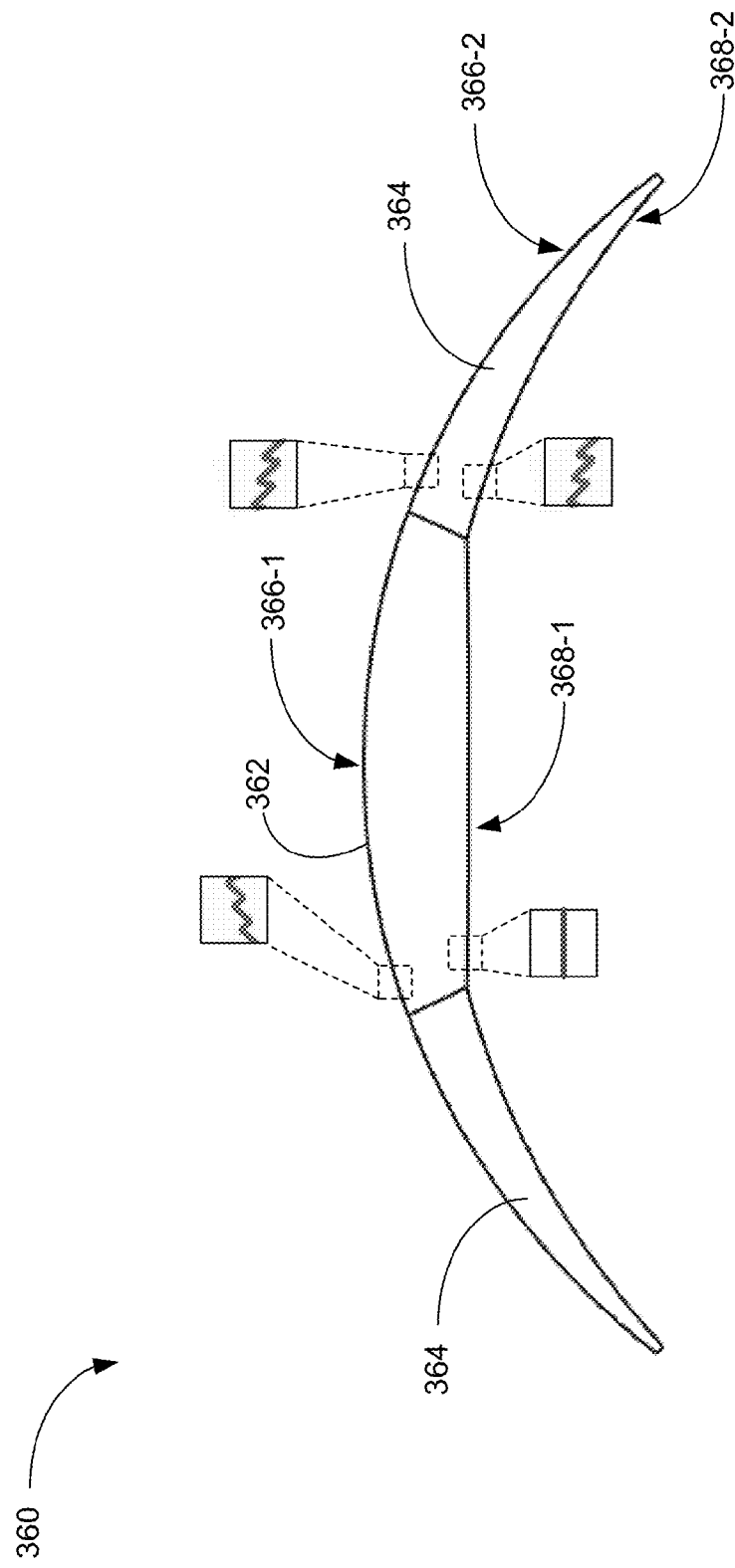
FIG. 3F is a cross-sectional view of a lens in accordance with some embodiments.

FIG. 3F is a cross-sectional view of lens 360 in accordance with some embodiments.

Lens 360 includes first portion 362 and second portion 364 around first portion 362. First portion 362 includes portion 366-1 of first lens surface 366, and portion 368-1 of second lens surface 368 that is opposite to portion 366-1 of first lens surface 366. Second portion 364 includes portion 366-2 of first lens surface 366, and portion 368-2 of second lens surface 368 that is opposite to portion 366-2 of first lens surface 366. Portion 366-1 is defined by a Fresnel surface profile (e.g., a surface profile that includes Fresnel structures, such as Fresnel structures arranged on a convex surface). Portion 368-1 is defined by a smooth surface profile (e.g., a surface profile that does not include Fresnel structures, such as a flat surface without Fresnel structures). Portion 366-2 is defined by a Fresnel surface profile (e.g., a surface profile that includes Fresnel structures, such as Fresnel structures arranged on a convex surface). Portion 368-2 is defined by a Fresnel surface profile (e.g., a surface profile that includes Fresnel structures, such as Fresnel structures arranged on a concave surface). The insets in FIG. 3F show enlarged views of corresponding surfaces.

In lens 360, first lens surface 366 transitions continuously from portion 366-1 to portion 366-2. For example, in some embodiments, a slope of portion 366-1 adjacent to a junction between portion 366-1 and portion 366-2 is the same as a slope of portion 366-2 adjacent to the junction between portion 366-1 and portion 366-2. In some embodiments, a derivative of the slope of portion 366-1 adjacent to a junction between portion 366-1 and portion 366-2 is the same as a derivative of the slope of portion 366-2 adjacent to the junction between portion 366-1 and portion 366-2. In some embodiments, a second derivative of the slope of portion 366-1 adjacent to a junction between portion 366-1 and portion 366-2 is the same as a second derivative of the slope of portion 366-2 adjacent to the junction between portion 366-1 and portion 366-2. This transition reduces optical artifacts and reduces the visibility of the transition.

In some embodiments, second lens surface 368 transitions continuously from portion 368-1 to portion 368-2. For example, in some embodiments, a slope of portion 368-1 adjacent to a junction between portion 368-1 and portion 368-2 is the same as a slope of portion 368-2 adjacent to the junction between portion 368-1 and portion 368-2. This transition further reduces optical artifacts and reduces the visibility of the transition.

In some embodiments, Fresnel structures on first lens surface 366 have dynamic draft. In some embodiments, Fresnel structures on second lens surface 368 have dynamic draft. In some embodiments, Fresnel structures on first lens surface 366 have dynamic draft, and Fresnel structures on second lens surface 368 have constant draft. In some embodiments, Fresnel structures on second lens surface 368 have dynamic draft, and Fresnel structures on first lens surface 366 have constant draft.

In some embodiments, lens 360 in FIG. 3F provides a temporal field of view that is larger than the temporal field of view provided by lens 350 in FIG. 3E. In some embodiments, lens 360 in FIG. 3F provides a temporal field of view of 80°, 81°, 82°, 83°, 84°, 85°, 86°, 87°, 88°, 89°, 90°, or 100° (e.g., for an eye relief of 20 mm).

Figure 3G:
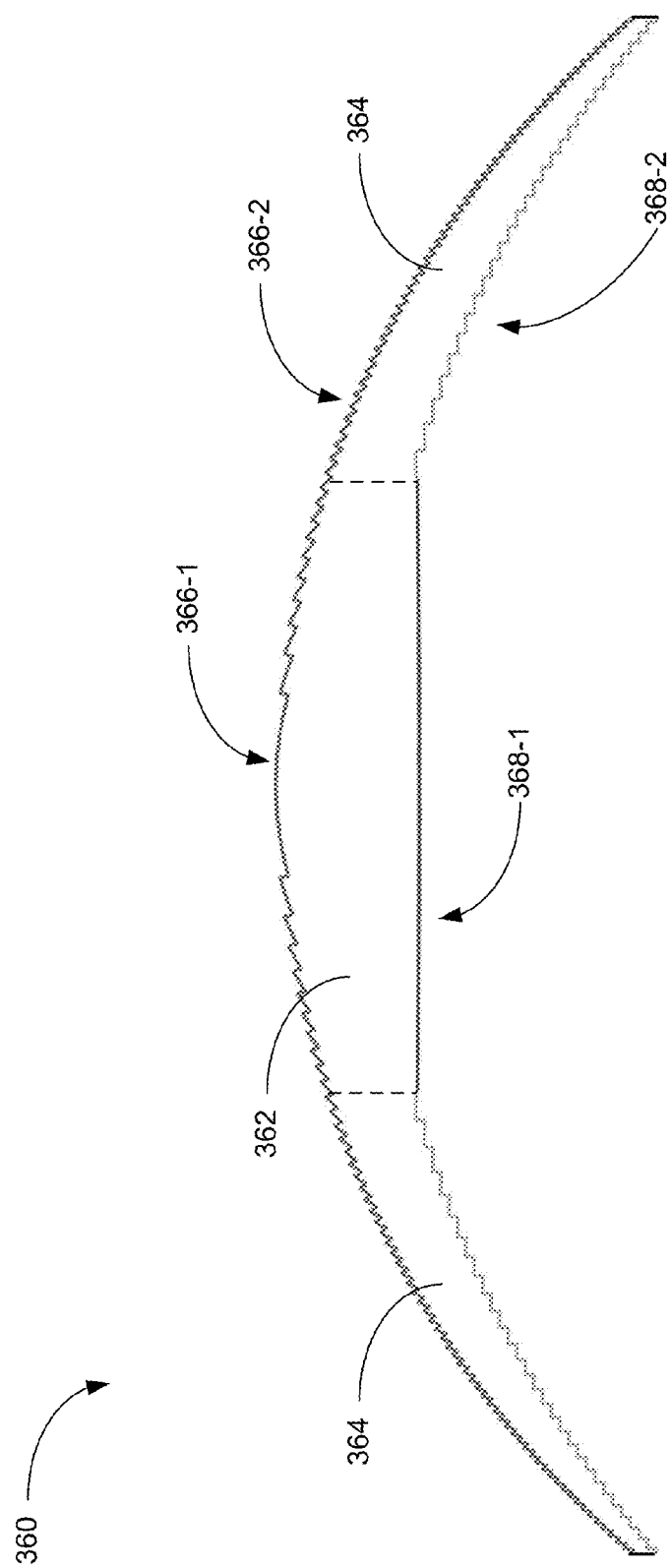
FIG. 3G shows Fresnel structures of the lens shown in FIG. 3F in accordance with some embodiments.

FIG. 3G shows Fresnel structures of lens 360 shown in FIG. 3F in accordance with some embodiments. In some embodiments, lens 360 includes Fresnel structures smaller than the Fresnel structures illustrated in FIG. 3G. In some embodiments, lens 360 includes Fresnel structures larger than the Fresnel structures illustrated in FIG. 3G.

As explained above, portion 366-1 is defined by a Fresnel surface profile (e.g., a surface profile that includes Fresnel structures, such as Fresnel structures arranged on a convex surface). Portion 368-1 is defined by a smooth surface profile (e.g., a surface profile that does not include Fresnel structures, such as a flat surface without Fresnel structures). Portion 366-2 is defined by a Fresnel surface profile (e.g., a surface profile that includes Fresnel structures, such as Fresnel structures arranged on a convex surface). Portion 368-2 is defined by a Fresnel surface profile (e.g., a surface profile that includes Fresnel structures, such as Fresnel structures arranged on a concave surface).

In some embodiments, when lens 360 is used in a display device (e.g., display device 300), lens 360 is positioned so that first lens surface 366 faces light emission device array 310 (and second lens surface 368 faces an eye of a user when the eye of the user is placed adjacent to the display device). In some other embodiments, when lens 360 is used in a display device (e.g., display device 300), lens 360 is positioned so that second lens surface 368 faces light emission device array 310 (and first lens surface 366 faces the eye of the user when the eye of the user is placed adjacent to the display device).

Figure 3H:
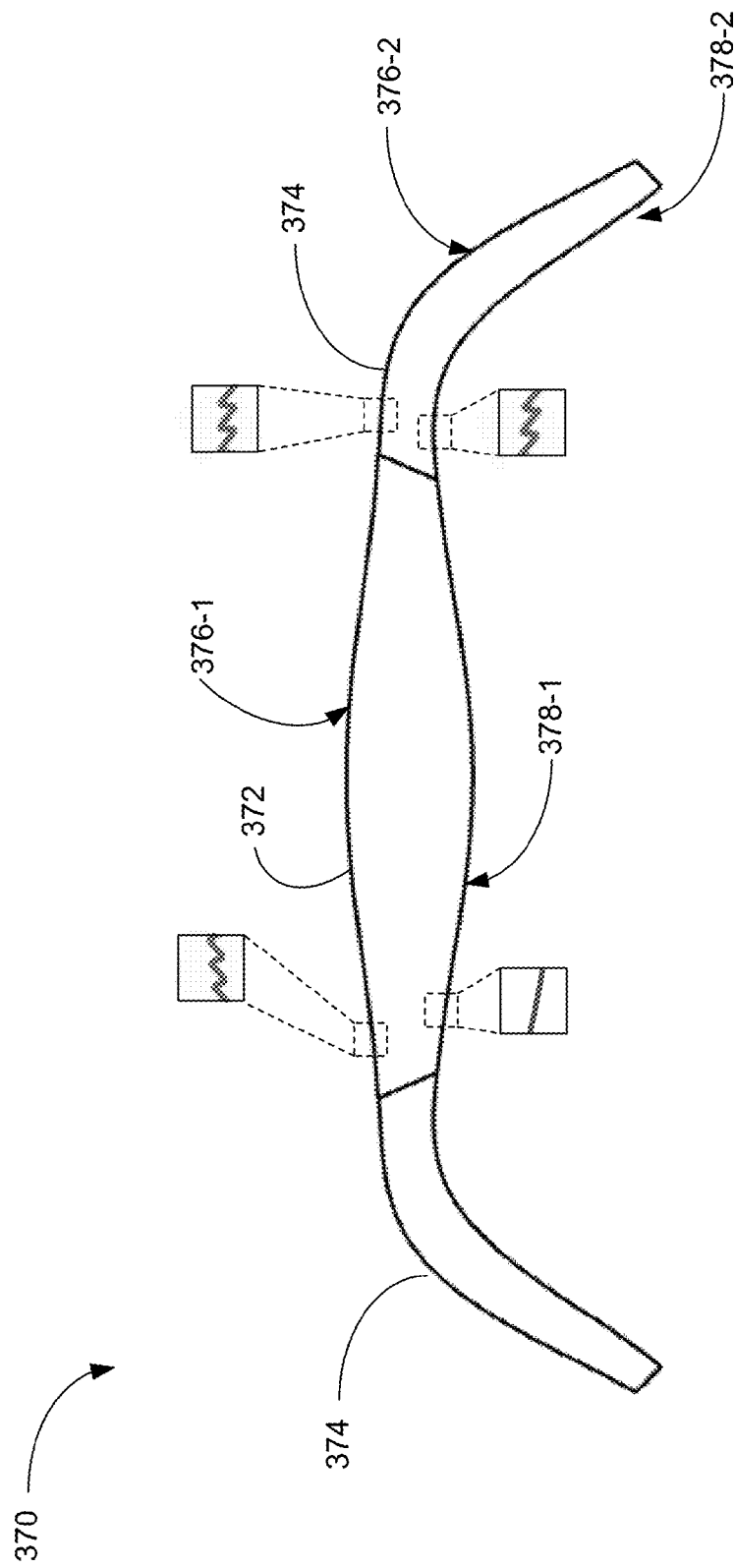
FIG. 3H is a cross-sectional view of a lens in accordance with some embodiments.

FIG. 3H is a cross-sectional view of lens 370 in accordance with some embodiments.

Lens 370 includes first portion 372 and second portion 374 around first portion 372. First portion 372 includes portion 376-1 of first lens surface 376, and portion 378-1 of second lens surface 378 that is opposite to portion 376-1 of first lens surface 376. Second portion 374 includes portion 376-2 of first lens surface 376, and portion 378-2 of second lens surface 378 that is opposite to portion 376-2 of first lens surface 376. Portion 376-1 is defined by a Fresnel surface profile (e.g., a surface profile that includes Fresnel structures, such as Fresnel structures arranged on a convex surface). Portion 378-1 is defined by a smooth surface profile (e.g., a surface profile that does not include Fresnel structures, such as a convex surface without Fresnel structures). Portion 376-2 is defined by a Fresnel surface profile (e.g., a surface profile that includes Fresnel structures, such as Fresnel structures arranged on a convex surface). Portion 378-2 is defined by a Fresnel surface profile (e.g., a surface profile that includes Fresnel structures, such as Fresnel structures arranged on a concave surface). The insets in FIG. 3H show enlarged views of corresponding surfaces. In some embodiments, second lens surface 378 (including both portions 378-1 and 378-2) is described by a high-order polynomial such that second lens surface 378 includes a convex surface in portion 378-1 and transitions, after an inflection point, to a concave surface in portion 378-2. For example, second lens surface 378 is defined by a fourth-order polynomial, such as $z_1(r)=a_1+b_1 \times r^2+c_1 \times r^4$, where r is a radial position from a center of the lens, $z_1$ is a height of second lens surface 378 at the radial position r, and $a_1$, $b_1$, and $c_1$ are coefficients. In some cases, second lens surface 378 is defined by a higher order polynomial (e.g., a sixth-order polynomial, an eight-order polynomial, a tenth-order polynomial, etc.) In some embodiments, Fresnel facets are gradually tapered into portion 378-2 near this inflection point. In some embodiments, first lens surface 376 (including both portions 376-1 and 376-2) is described by a high-order polynomial such that first lens surface 376 includes a convex surface in portion 376-1, and transitions to a less-steep surface near a junction between portion 376-1 and 376-2 (e.g., the slope decreases near the junction between portion 376-1 and 376-2) and to another convex surface in portion 376-2. For example, first lens surface 376 is defined by a sixth-order polynomial, such as $z_2(r)=a_2+b_2 \times r^2+c \times r^4+d \times r^6$, where $Z_2$ is a height of first lens surface 376 at the radial position r, and $a_2$, $b_2$, $c_2$, and d are coefficients. In some cases, first lens surface 376 is defined by a higher order polynomial (e.g., an eight-order polynomial, a tenth-order polynomial, a twelfth-order polynomial, etc.).

In lens 370, first lens surface 376 transitions continuously from portion 376-1 to portion 376-2. For example, in some embodiments, a slope of portion 376-1 adjacent to a junction between portion 376-1 and portion 376-2 is the same as a slope of portion 376-2 adjacent to the junction between portion 376-1 and portion 376-2. In some embodiments, a derivative of the slope of portion 376-1 adjacent to a junction between portion 376-1 and portion 376-2 is the same as a derivative of the slope of portion 376-2 adjacent to the junction between portion 376-1 and portion 376-2. In some embodiments, a second derivative of the slope of portion 376-1 adjacent to a junction between portion 376-1 and portion 376-2 is the same as a second derivative of the slope of portion 376-2 adjacent to the junction between portion 376-1 and portion 376-2. This transition reduces optical artifacts and reduces the visibility of the transition.

In some embodiments, second lens surface 378 transitions continuously from portion 378-1 to portion 378-2. For example, in some embodiments, a slope of portion 378-1 adjacent to a junction between portion 378-1 and portion 378-2 is the same as a slope of portion 378-2 adjacent to the junction between portion 378-1 and portion 378-2. In some embodiments, a derivative of the slope of portion 378-1 adjacent to a junction between portion 378-1 and portion 378-2 is the same as a derivative of the slope of portion 378-2 adjacent to the junction between portion 378-1 and portion 378-2. In some embodiments, a second derivative of the slope of portion 378-1 adjacent to a junction between portion 378-1 and portion 378-2 is the same as a second derivative of the slope of portion 378-2 adjacent to the junction between portion 378-1 and portion 378-2. This transition further reduces optical artifacts and reduces the visibility of the transition.

In some embodiments, when lens 370 is used in a display device (e.g., display device 300), lens 370 is positioned so that first lens surface 376 faces light emission device array 310 (and second lens surface 378 faces an eye of a user when the eye of the user is placed adjacent to the display device). In some other embodiments, when lens 370 is used in a display device (e.g., display device 300), lens 370 is positioned so that second lens surface 378 faces light emission device array 310 (and first lens surface 376 faces the eye of the user when the eye of the user is placed adjacent to the display device).

In some embodiments, Fresnel structures on first lens surface 376 have dynamic draft. In some embodiments, Fresnel structures on second lens surface 378 have dynamic draft. In some embodiments, Fresnel structures on first lens surface 376 have dynamic draft, and Fresnel structures on second lens surface 378 have constant draft. In some embodiments, Fresnel structures on second lens surface 378 have dynamic draft, and Fresnel structures on first lens surface 376 have constant draft.

In some embodiments, lens 370 in FIG. 3H provides a temporal field of view of 70°, 71°, 72°, 73°, 74°, 75°, 76°, 77°, 78°, 79°, 80°, 90°, or 100° (e.g., for an eye relief of 20 mm).

Figure 3I:
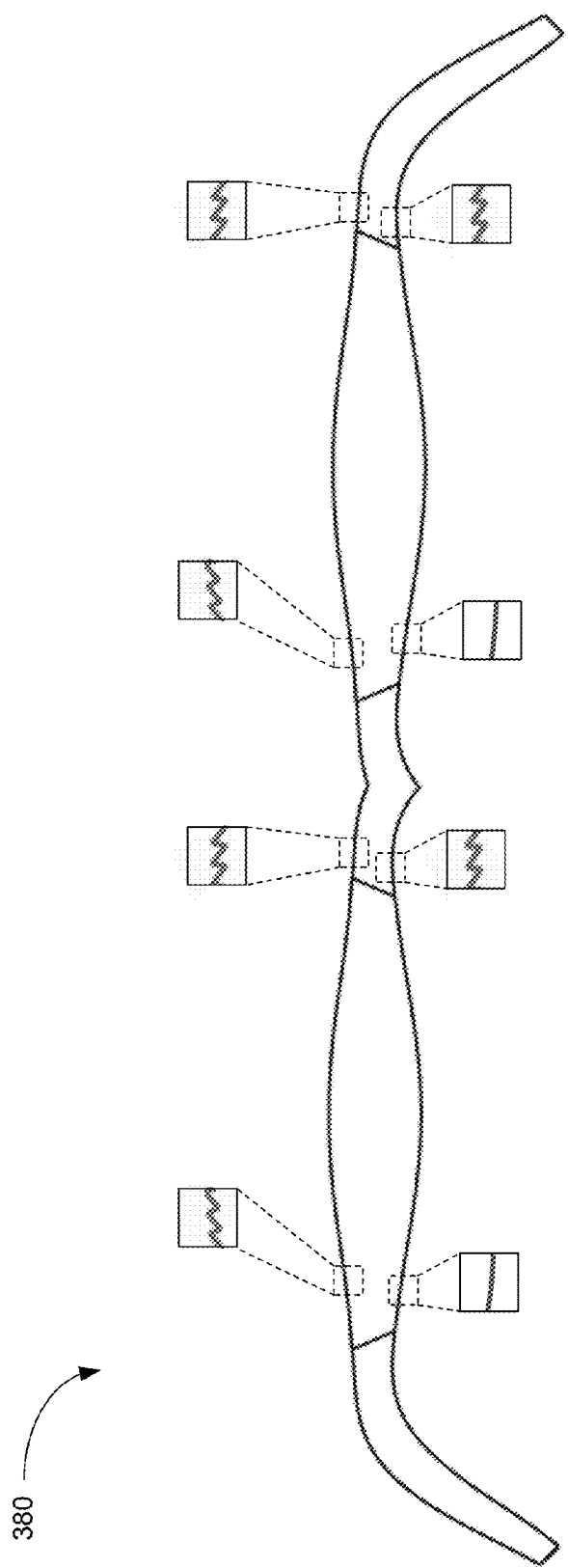
FIG. 3I is a cross-sectional view of a lens in accordance with some embodiments.

FIG. 3I is a cross-sectional view of lens 380 in accordance with some embodiments. Lens 380 is a combination of two component lenses, each component lens corresponding to a portion of lens 370 shown in FIG. 3H. The insets in FIG. 3I show enlarged views of corresponding surfaces. In some embodiments, a first component lens is used for projecting an image toward one eye (e.g., a left eye) and a second component lens is used for projecting an image toward the other eye (e.g., a right eye). In some embodiments, the two component lenses are fused together, as shown in FIG. 3I. In some embodiments, the two component lenses are separate from each other (e.g., the first component lens is separate from the second component lens).

Figure 3J:
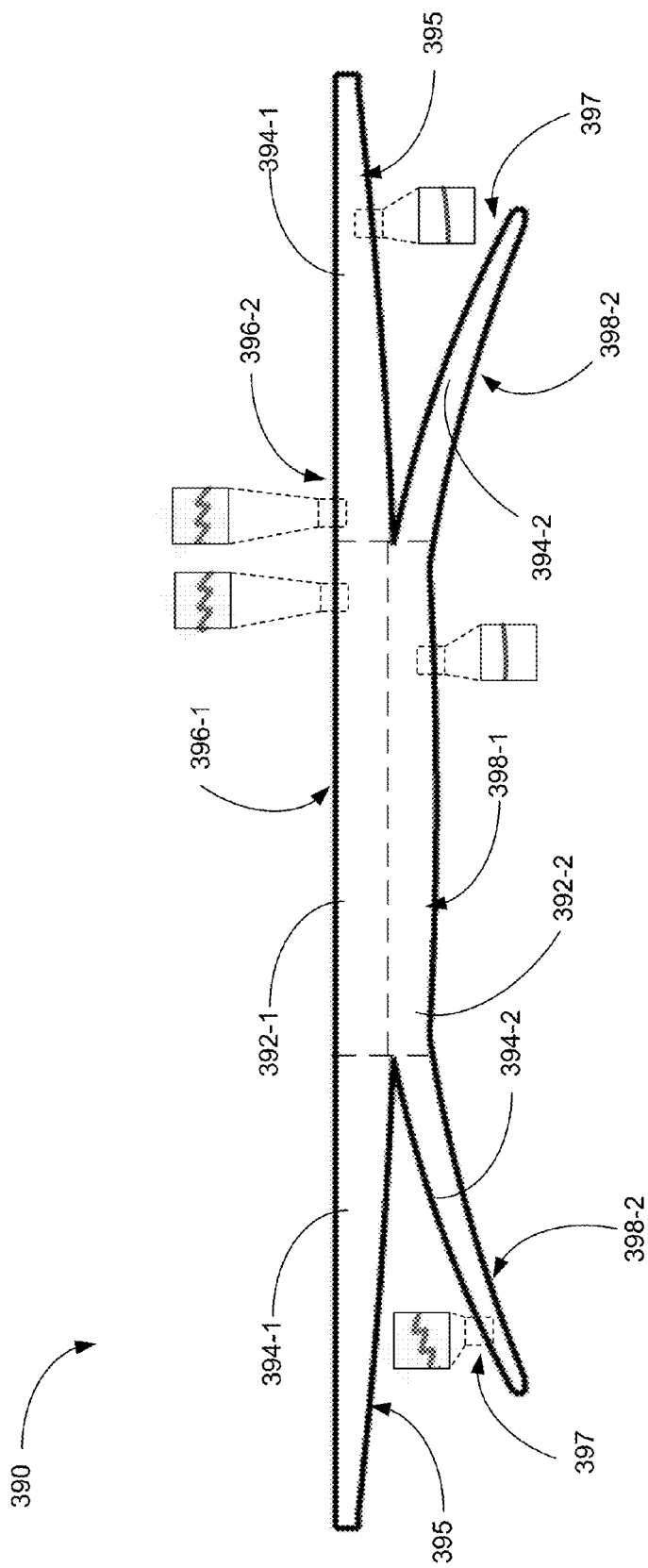
FIG. 3J is a cross-sectional view of a lens in accordance with some embodiments.

FIG. 3J is a cross-sectional view of lens 390 in accordance with some embodiments.

Lens 390 is defined by a first lens surface (e.g., surface 396) and a second lens surface (e.g., surface 398) opposite to the first lens surface. The lens includes a first portion (e.g., a combination of 392-1 and 394-1) and a second portion (e.g., a combination of 392-2 and 394-2) that is distinct from the first portion and is coupled with the first portion. The first portion of the lens (e.g., the combination of 392-1 and 394-1) includes a first sub-portion (e.g., 392-1) of the first portion of the lens and a second sub-portion (e.g., 394-1), of the first portion of the lens, located around the first sub-portion of the first portion of the lens. The first sub-portion (e.g., 392-1) of the first portion of the lens includes a first surface portion (e.g., surface portion 396-1) of the first lens surface. The second sub-portion (e.g., 394-1) of the first portion of the lens is defined by a second surface portion (e.g., surface portion 396-2) of the first lens surface and a third surface (e.g., surface 395) that is opposite to the second surface portion of the first lens surface. The second portion of the lens (e.g., the combination of 392-2 and 394-2) includes a first sub-portion (e.g., 392-2) of the second portion of the lens and a second sub-portion (e.g., 394-2), of the second portion of the lens, located around the first sub-portion of the second portion of the lens. The first sub-portion (e.g., 392-2) of the second portion of the lens includes a first surface portion (e.g., surface portion 398-1) of the second lens surface. The second sub-portion (e.g., 394-2) of the second portion of the lens is defined by a second surface portion (e.g., surface portion 398-2) of the second lens surface and a fourth surface (e.g., surface 397) that is opposite to the second surface portion of the second lens surface. The second sub-portion (e.g., 394-1) of the first portion of the lens is separate from the second sub-portion (e.g., 394-2) of the second portion of the lens. The third surface is distinct from the fourth surface. The first lens surface (e.g., surface 396) is defined by a Fresnel surface profile over the first surface portion and the second surface portion of the first lens surface (e.g., Fresnel structures are arranged on a flat surface over the first surface portion and the second surface portion of the first lens surface). The second lens surface (e.g., surface 398) is defined by a smooth surface profile over the first surface portion and the second surface portion of the second lens surface (e.g., a concave lens surface). In some embodiments, the third lens surface (e.g., surface 395) is defined by a smooth lens surface (e.g., a convex lens surface). In some embodiments, the fourth lens surface (e.g., surface 397) is defined by a Fresnel surface profile (e.g., Fresnel structures arranged on a convex surface). The insets in FIG. 3J show enlarged views of corresponding surfaces.

In some embodiments, Fresnel structures on lens surface 396 have dynamic draft. In some embodiments, Fresnel structures on lens surface 397 have dynamic draft. In some embodiments, Fresnel structures on lens surface 396 have dynamic draft, and Fresnel structures on lens surface 397 have constant draft. In some embodiments, Fresnel structures on lens surface 397 have dynamic draft, and Fresnel structures on lens surface 396 have constant draft.

In some embodiments, lens 390 in FIG. 3J provides a temporal field of view of 70°, 71°, 72°, 73°, 74°, 75°, 76°, 77°, 78°, 79°, 80°, 90°, or 100° (e.g., for an eye relief of 20 mm).

Figure 4A:
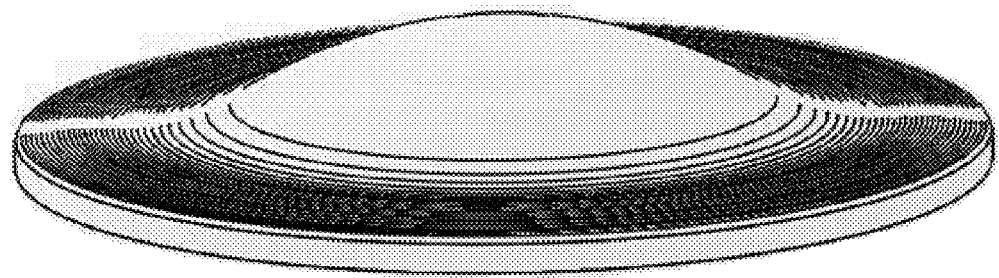
FIG. 4A shows an isometric view of a lens in accordance with some embodiments.

FIG. 4A shows an isometric view of a lens in accordance with some embodiments. The lens shown in FIG. 4A is axisymmetric (e.g., rotationally symmetric about a center of the lens). Although the lens shown in FIG. 4A is a circular lens, in some embodiments, a portion of the circular lens is cut out (e.g., a rectangular portion of the lens, as shown in FIG. 3A, is used).

Figure 4B:
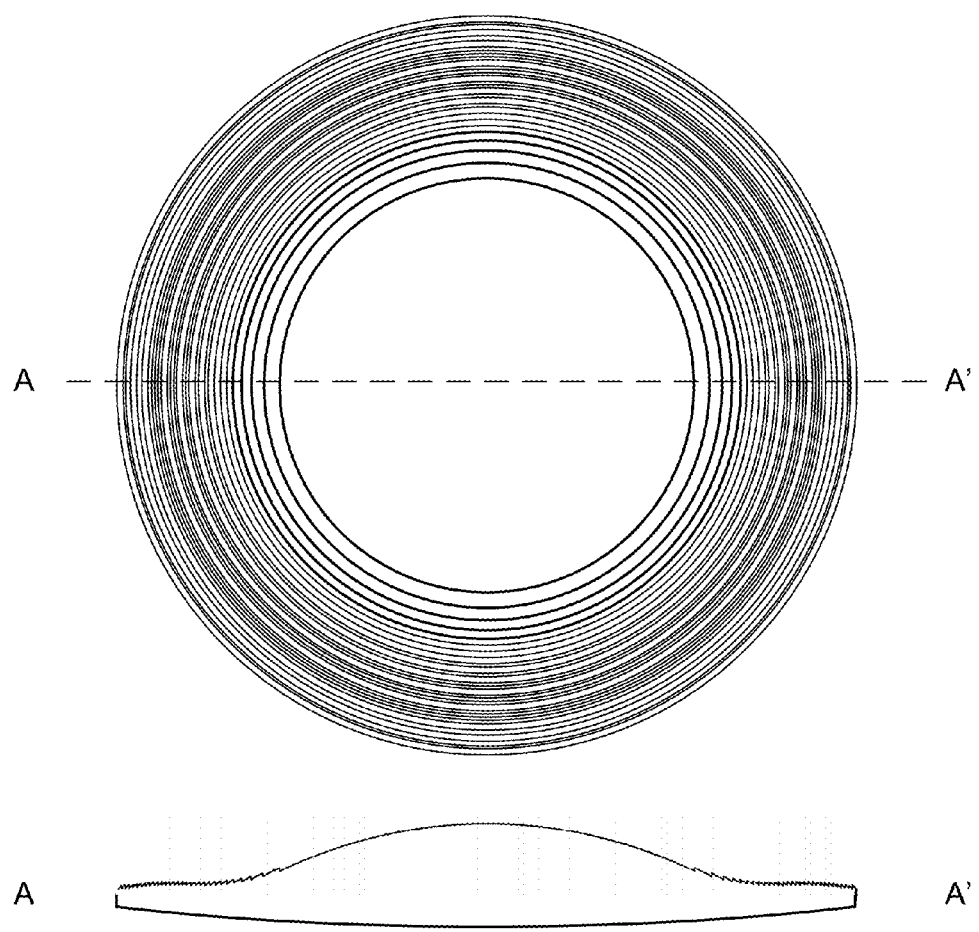
FIG. 4B shows a plan view and a cross-sectional view of the lens shown in FIG. 4A.

FIG. 4B shows a plan view and a cross-sectional view of the lens shown in FIG. 4A. Line AA' on the plan view represents a plane upon which the cross-sectional view is taken. The cross-sectional view of the lens is illustrated in detail in FIG. 4C.

Figure 4C:
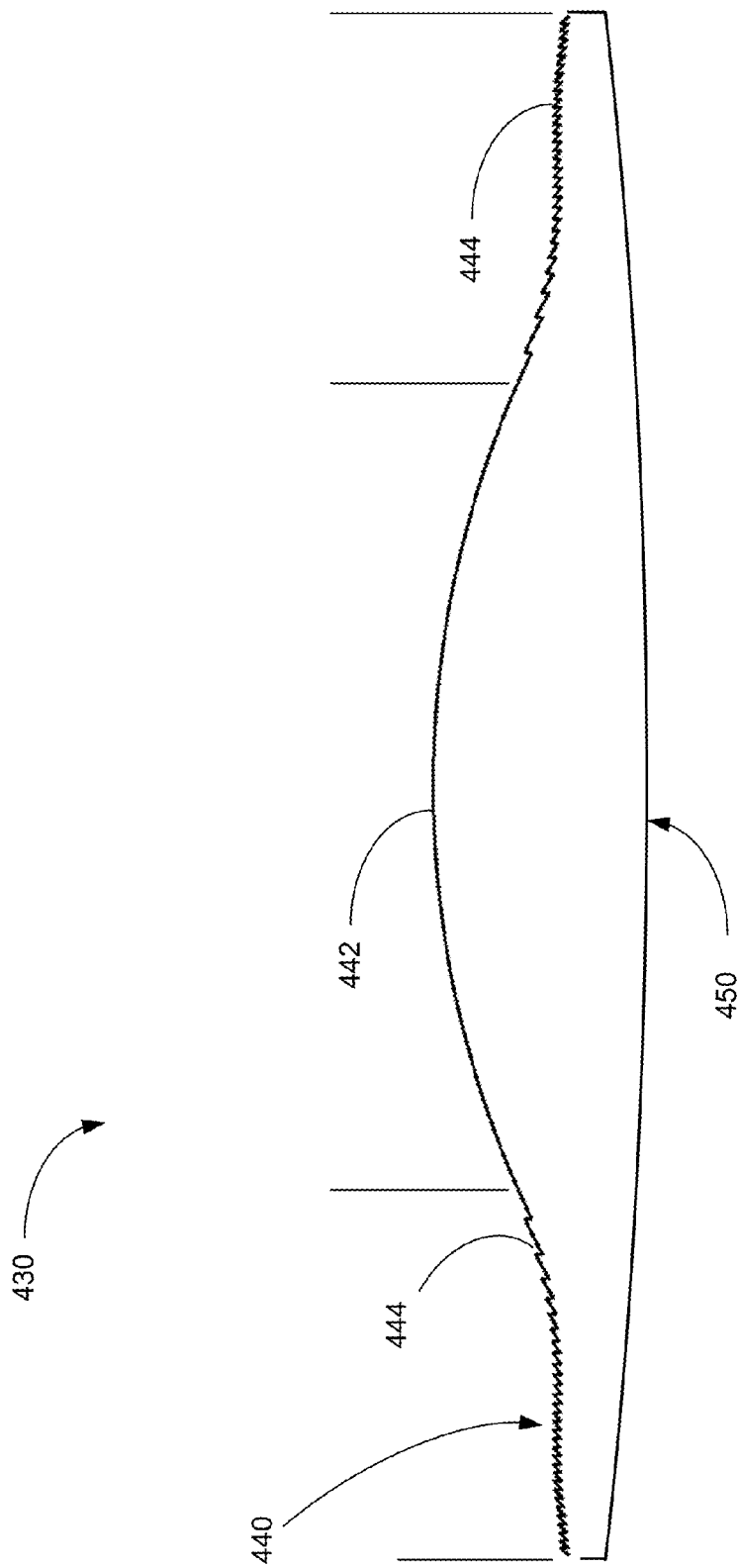
FIG. 4C shows a cross-sectional view of the lens shown in FIG. 4A.

FIG. 4C shows a cross-sectional view of the lens shown in FIG. 4A.

The lens is defined by first lens surface 440 and second lens surface 450 opposite to the first lens surface. First portion 442 of first lens surface 440 is defined by a smooth surface profile function. Second portion 444 of first lens surface 440 is defined by a Fresnel surface profile function. Second portion 444 of first lens surface 440 is around first portion 442 of first lens surface 440 (e.g., second portion 444 of first lens surface 440 corresponds to concentric annular sections, of the lens, that are offset from one another).

In some embodiments, a width (e.g., a diameter) of first portion 442 of first lens surface 440 is at least 10% of a width (e.g., a diameter) of the lens. In some embodiments, the width (e.g., the diameter) of first portion 442 of first lens surface 440 is at least 20% of the width (e.g., the diameter) of the lens. In some embodiments, the width (e.g., the diameter) of first portion 442 of first lens surface 440 is at least 30% of the width (e.g., the diameter) of the lens. In some embodiments, the width (e.g., the diameter) of first portion 442 of first lens surface 440 is at least 40% of the width (e.g., the diameter) of the lens. In some embodiments, the width (e.g., the diameter) of first portion 442 of first lens surface 440 is at least 50% of the width (e.g., the diameter) of the lens. In some embodiments, the width (e.g., the diameter) of first portion 442 of first lens surface 440 is at least 60% of the width (e.g., the diameter) of the lens. In some embodiments, the width (e.g., the diameter) of first portion 442 of first lens surface 440 is at least 70% of the width (e.g., the diameter) of the lens. In some embodiments, the width (e.g., the diameter) of first portion 442 of first lens surface 440 is at least 80% of the width (e.g., the diameter) of the lens.

As used herein, a smooth surface profile function refers to a surface profile function whose derivative is continuous (e.g., when a surface profile is defined as a function of a radial position a, such as F(a), the derivative of F(a), such as F'(a), is continuous). In some embodiments, a Fresnel surface profile function is characterized by discontinuities in a derivative of the Fresnel surface profile function (e.g., when a surface profile is defined as a function of a radial position a, such as F(a), the derivative of F(a), such as F'(a), has discontinuities). In some embodiments, a smooth surface profile function is characterized by a derivative of the smooth surface profile function having zero and either positive or negative values from a center of the lens to one end of the lens (e.g., the derivative of the smooth surface profile function has zero and negative values only from the center of the lens to one end of the lens), and a Fresnel surface profile function is characterized by a derivative of the Fresnel surface profile function having both positive and negative values from the center of the lens to one end of the lens.

In some embodiments, the Fresnel surface profile function defines grooves of a same height. In some embodiments, the Fresnel surface profile function defines grooves of a same width.

In some embodiments, a height of first portion 442 (e.g., a difference between a center thickness of lens 430 and a thickness of lens 430 at a junction between first portion 442 and second portion 444) is greater than any groove height (e.g., a vertical distance, parallel to an axis of lens 430, between a peak and a valley of a groove defined in second portion 444). In some embodiments, the height of first portion 442 is at least twice any groove height. In some embodiments, the height of first portion 442 is at least three times any groove height. In some embodiments, the height of first portion 442 is at least five times any groove height. In some embodiments, the height of first portion 442 is at least ten times any groove height.

Figure 4D:
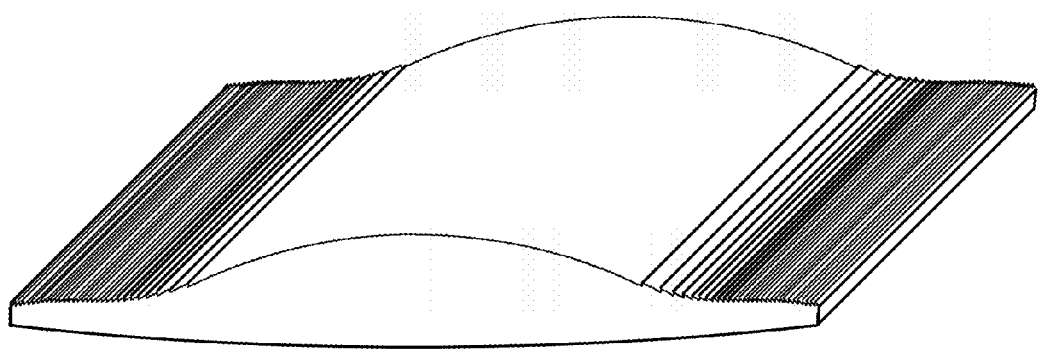
FIG. 4D shows an isometric view of a cylindrical lens in accordance with some embodiments.

FIG. 4D shows an isometric view of a cylindrical lens in accordance with some embodiments. The lens in FIG. 4D has a cross-section that corresponds to the cross-section shown in FIG. 4C in only one direction.

The lens in FIG. 4D focuses light along a first direction, but does not focus light along a second direction that is perpendicular to the first direction. Thus, the lens in FIG. 4C performs like a cylindrical lens.

In some embodiments, Fresnel structures in the lens shown in FIG. 4D have dynamic draft.

Figure 5A:
FIG. 5A illustrates an exemplary surface profile in accordance with some embodiments.

FIG. 5A illustrates an exemplary surface profile in accordance with some embodiments.

In FIG. 5A, the smooth lens surface transitions into the Fresnel lens surface in a way so that the smooth lens surface and the Fresnel lens surface are continuous and their slopes also match at a junction of the smooth lens surface and the Fresnel lens surface. It has been found that when the slope of the smooth lens surface and the slope of the Fresnel lens surface match at the junction, the transition becomes optically seamless. This reduces or eliminates artifacts at the transition. Those skilled in the art will recognize that maintaining higher-order continuities (e.g. continuities in $2^{nd}$ and/or $3^{rd}$ derivatives) further reduces artifacts (e.g. ripples in the distortion) at the transition. Thus, in some embodiments, a second derivative of the smooth lens surface and a second derivative of the Fresnel lens surface match at the junction. In some embodiments, a third derivative of the smooth lens surface and a third derivative of the Fresnel lens surface match at the junction.

Figure 5B:
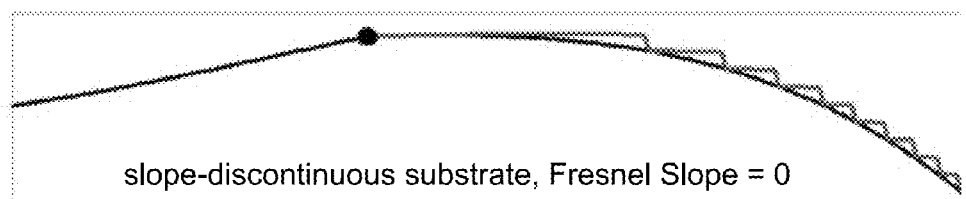
FIG. 5B illustrates an exemplary surface profile in accordance with some embodiments.
Figure 5C:
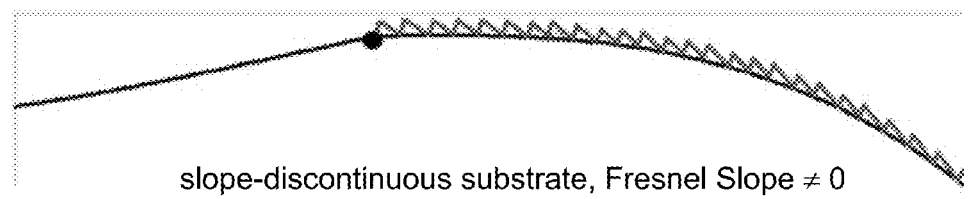
FIG. 5C illustrates an exemplary surface profile in accordance with some embodiments.
Figure 5D:
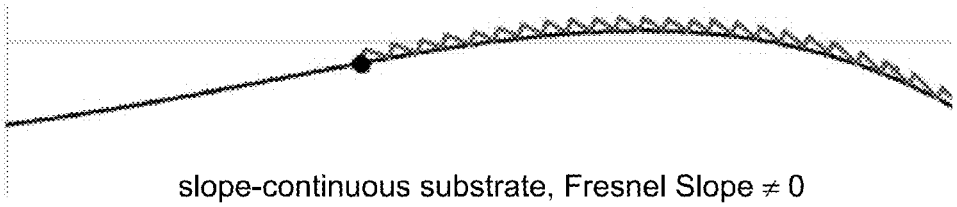
FIG. 5D illustrates an exemplary surface profile in accordance with some embodiments.

FIGS. 5B-5D illustrate exemplary surface profiles in accordance with some embodiments. In FIGS. 5B-5D, the smooth lens surface transitions into the Fresnel lens surface in a way so that the smooth lens surface and the Fresnel lens surface are continuous but their slopes do not match at the junction of the smooth lens surface and the Fresnel lens surface. In these lenses, the abrupt change in the slope causes an imaging artifact. Ray bundles that straddle this discontinuity split to different portions of the display, which increases the visibility of the transition.

In light of these principles, we now turn to certain embodiments.

In accordance with some embodiments, a lens includes an optically transparent substrate (e.g., a substrate made of glass, such as N-BK7, N-SF11, or F2; barium borate; barium fluoride; magnesium fluoride; sapphire; calcium fluoride; fused silica; calcite; a plastic, such as polymethyl methacrylate (PMMA) or polycarbonate; etc.) having a first lens surface and a second lens surface opposite to the first lens surface (e.g., lens 430 in FIG. 4C has first lens surface 440 and second lens surface 450). The first lens surface includes a plurality of Fresnel structures (e.g., first lens surface 440 includes Fresnel structures in portion 444). A respective Fresnel structure of the plurality of Fresnel structures includes a slope facet and a draft facet (e.g., Fresnel structure 272 in FIG. 2A has a slope facet and a draft facet). The draft facet is characterized by a draft angle. The draft angle of the respective Fresnel structure is based on a distance of the respective Fresnel structure from a center of the lens.

In some embodiments, the second lens surface does not include any Fresnel structures (e.g., lens 430 in FIG. 4C). In some embodiments, the second lens surface includes a plurality of Fresnel structures (e.g., lens 340 in FIG. 3D). In some embodiments, the draft angle of a respective Fresnel structure on the second lens surface is based on a distance of the respective Fresnel structure from the center of the lens.

In some embodiments, the plurality of Fresnel structures includes a first Fresnel structure and a second Fresnel structure (e.g., Fresnel structure 272 and Fresnel structure 274 in FIG. 2B). The draft facet of the first Fresnel structure has a first draft angle (e.g., Fresnel structure 272 has a small draft angle). The draft facet of the second Fresnel structure has a second draft angle that is distinct from the first draft angle (e.g., Fresnel structure 274 has a large draft angle).

In some embodiments, the lens is configured to focus light impinging on the first lens surface (e.g., the lens is a converging lens, as shown in FIG. 2G).

In some embodiments, the draft angle of the respective Fresnel structure is selected, based on the distance of the respective Fresnel structure from the center of the lens, to reduce interaction of light impinging on the first lens surface and the draft facet of the respective Fresnel structure (e.g., as shown in FIG. 2C, the draft angle changes as a function of the distance of the respective Fresnel structure from the center of the lens).

In some embodiments, the lens includes a first portion (e.g., 362 in FIG. 3G); and a second portion that is distinct from the first portion and is located around the first portion (e.g., 364 in FIG. 3G). The first lens surface for the first portion of the lens (e.g., 366-1) is defined by a Fresnel surface profile. The second lens surface for the first portion of the lens (e.g., 368-1) is defined by a smooth surface profile function. The first lens surface for a second portion of the lens (e.g., 366-2) is defined by a Fresnel surface profile. The second lens surface for the second portion of the lens (e.g., 368-2) is defined by a Fresnel surface profile.

In some embodiments, the first lens surface for the second portion of the lens extends from the first lens surface for the first portion of the lens, and the second lens surface for the second portion of the lens extends from the second lens surface for the first portion of the lens. For example, in FIG. 3G, portion 366-2 of first lens surface 366 extends from portion 366-1 of first lens surface 366 and portion 368-2 of second lens surface 368 extends from portion 368-1 of second lens surface 368.

In some embodiments, the second portion of the lens corresponds to one or more portions of a convex-concave lens. For example, in FIG. 3H, second portion 374 is defined by convex surface 376-2 and concave surface 378-2.

In some embodiments, the first portion of the lens corresponds to one or more portions of a plano-convex lens. For example, in FIG. 3F, first portion 362 is defined by convex surface 366-1 and flat surface 368-1. In another example, in FIG. 3D, first portion 342 is defined by flat surface 346-1 and convex surface 348-1.

In some embodiments, the second portion of the lens corresponds to one or more portions of a convex-concave lens. A convex surface of the second portion of the lens extends from a planar surface of the first portion of the lens. For example, in FIG. 3D, second portion 344 is defined by concave surface 348-2 and convex surface 346-2 that extends from flat surface 346-1.

In some embodiments, the second portion of the lens corresponds to one or more portions of a convex-concave lens. A concave surface of the second portion of the lens extends from a planar surface of the first portion of the lens. For example, in FIG. 3F, second portion 364 is defined by convex surface 366-2 and concave surface 368-2 that extends from flat surface 368-1.

In some embodiments, the first portion of the lens corresponds to one or more portions of a convex-convex lens. For example, in FIG. 3E, first portion 352 is defined by convex surface 356-1 and convex surface 358-1.

In some embodiments, the second lens surface is defined by a polynomial that includes a convex surface for the first portion of the lens and a concave surface for the second portion of the lens (e.g., second lens surface 378, in FIG. 3H, that includes a convex surface in first portion 378-1 and a concave surface in second portion 378-2). In some embodiments, the first lens surface is defined by a polynomial that includes a convex surface for the first portion of the lens and a convex surface for the second portion of the lens (e.g., first lens surface 376-1, in FIG. 3H, that includes a convex surface in first portion 376-1 and a convex surface in second portion 376-2).

In some embodiments, a first portion of the first lens surface (e.g., portion 442 in FIG. 4C) is defined by a smooth surface profile function. A second portion of the first lens surface (e.g., portion 444 in FIG. 4C) is defined by a Fresnel surface profile function. The second portion of the first lens surface is around the first portion of the first lens surface. For example, the first portion of the first lens surface does not include any Fresnel structure, and the second portion of the first lens surface includes a plurality of Fresnel structures.

In some embodiments, the second lens surface includes a plurality of Fresnel structures. In some embodiments, the second lens surface does not include any Fresnel structure.

In some embodiments, the first portion and the second portion of the first lens surface are defined by a sum of two surface profile functions. A first surface profile function of the two surface profile functions defines a smooth surface profile across the first portion and the second portion of the first lens surface. A second surface profile function of the two surface profile functions defines: a smooth surface profile across a first portion of the first lens surface; and a Fresnel surface profile across a second portion of the first lens surface.

In some embodiments, a derivative (e.g., a first derivative) of the first surface profile function is continuous across of the first portion and the second portion of the first lens surface. A derivative (e.g., a first derivative) of the second surface profile function is continuous across the first portion of the first lens surface.

In some embodiments, a second derivative of the first surface profile function is continuous across the first portion and the second portion of the first lens surface, and a second derivative of the second surface profile function is continuous across the first portion of the first lens surface.

In some embodiments, the smooth surface profile, of the second surface profile function, across the first portion of the first lens surface is flat.

In some embodiments, a derivative of the second surface profile function has discontinuities across the second portion of the first lens surface (e.g., the second portion has Fresnel structures).

In accordance with some embodiments, a display device (e.g., display device 300 in FIG. 3A) includes the lens discussed above (e.g., lens 320 in FIG. 3A). The display device also includes an array of light emitting devices (e.g., an array of light emitting devices 310 in FIG. 3A) coupled with the lens for outputting light through the lens.

In some embodiments, the display device is a head-mounted display device (e.g., display device 100 in FIG. 1A).

In some embodiments, the array of light emitting devices is configured to output light and transmit the light through the lens toward an eye of a user (e.g., eye 330 in FIG. 3A) when the display device is worn on a head of the user.

Figure 6A:
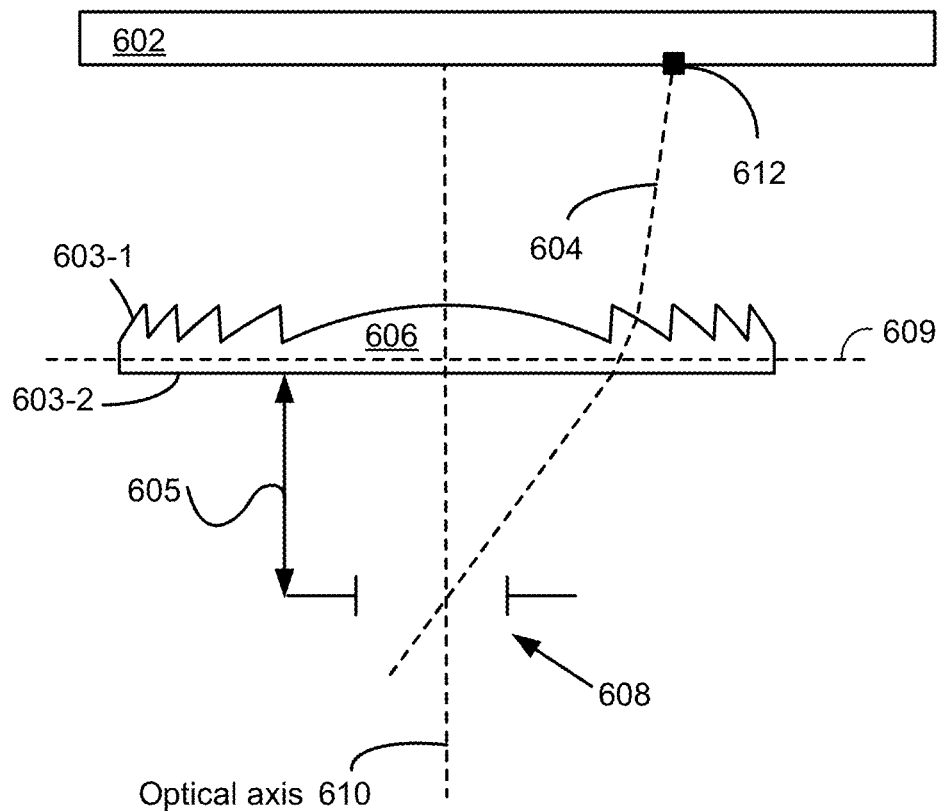
FIG. 6A illustrates a cross-sectional view of a display transmitting a ray from an off-axis position through a Fresnel lens toward a reference pupil in accordance with some embodiments.

FIG. 6A illustrates a cross-sectional view of display 602 transmitting ray 604 from off-axis position 612 through Fresnel lens 606 toward reference pupil 608 in accordance with some embodiments. Fresnel lens 606 has first surface 603-1 and second surface 603-2 (e.g., a surface that is opposite to first surface 603-1). First surface 603-1 has Fresnel structures, and the draft angles of the respective Fresnel structures are based on distances of the respective Fresnel structures from a reference axis of the lens (e.g., the draft angle of a respective Fresnel structure changes as a function of a distance of the respective Fresnel structure from the reference axis). In some embodiments, the reference axis is optical axis 610 of Fresnel lens 606. In some embodiments, the reference axis extends from a center of Fresnel lens 606. In some embodiments, display 602 corresponds to electronic display 215 of display device 205, shown in FIG. 1B. In some embodiments, display 602 includes light emission device array 310 with light emission devices 312, as described above with respect to FIG. 3A, and is configured to emit light. In some embodiments, display 602 transmits ray 604, from off-axis position 612 located on display 602 (e.g., a location on display 602 that is away from the reference axis, such as optical axis 610), through Fresnel lens 606 toward a center of reference pupil 608. In some embodiments, reference off-axis position 612 is located away from optical axis 610. In some embodiments, reference off-axis position 612 is located on a periphery of display 602. In some embodiments, ray 604 is a chief ray (also called a principle ray) of an optical system including display 602 and Fresnel lens 606.

In FIG. 6A, reference off-axis position 612 and reference pupil 608 are located on opposite sides of Fresnel lens 606. Reference off-axis position 612 faces first surface 603-1 of Fresnel lens 606, and reference pupil 608 faces second surface 603-2 of Fresnel lens 606.

In FIG. 6A, Fresnel lens 606 has a generally planar shape (e.g., a thickness of the lens is less than a diameter of the lens). In some embodiments, Fresnel lens 606 defines a reference plane, indicated as plane 609 in FIG. 6A. In some cases, reference off-axis position 612 is located on a first side of plane 609, and reference pupil 608 is located on a second side of plane 609 that is opposite to the first side of plane 609.

Eye relief 605 refers to a distance between reference pupil 608 and Fresnel lens 606 (e.g., a distance between reference pupil 608 and second surface 603-2 of Fresnel lens 606). In some embodiments, Fresnel lens 606 is configured for a predefined eye relief of about 5 mm or more (e.g., about 5 mm, 10 mm, 15 mm, 20 mm, 25 mm, 30 mm, 35 mm, 40 mm, 45 mm, 50 mm, or more).

In some embodiments, reference pupil 608 has a diameter ranging from about 1 mm to about 12 mm (e.g., about 1, 2, 3, 4, 5, 6, 7, 8, 9, 10, 11 or about 12 mm). In some embodiments, the diameter of reference pupil 608 ranges from about 2 to about 8 mm. In some embodiments, reference pupil 608 corresponds to pupil 332 of eye 330 of a user, as described with respect to FIG. 3A. In some embodiments, reference pupil 608 refers to a region that is used for designing Fresnel lens 606.

Figure 6B:
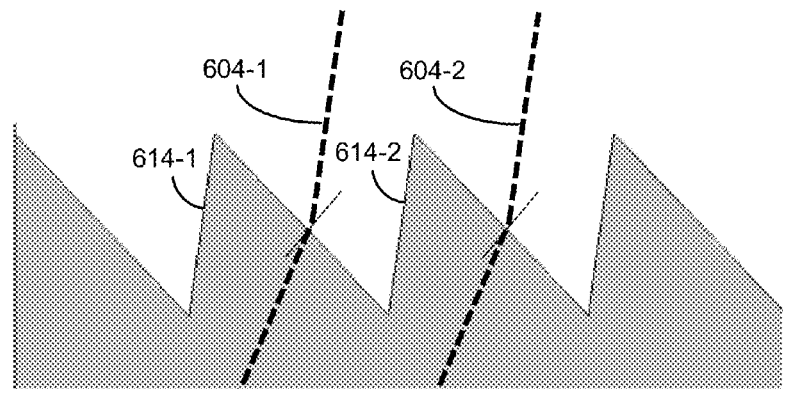
FIG. 6B illustrates Fresnel structures with draft facets parallel to rays in a first medium in accordance with some embodiments.

FIG. 6B illustrates Fresnel structures with draft facets 614 parallel to rays 604 in a first medium in accordance with some embodiments. Draft facets 614-1 and 614-2 shown in FIG. 6B are similar to draft facets shown in FIG. 2F, except that draft angles characterizing draft facets 614-1 and 614-2 are selected differently. In FIG. 6B, the draft angles are selected so that draft facets 614-1 and 614-2 are parallel to respective rays 604-1 and 604-2, in a first medium (e.g., air), transmitted from reference off-axis position 612 through respective dynamic draft Fresnel structures toward reference pupil 608. In comparison, in FIG. 2F the draft angles are selected so that the draft facets are parallel to rays 604-1 and 604-2, in a second medium (e.g., the second medium is a substrate used for making the lens), transmitted from reference off-axis position 612 through respective dynamic draft Fresnel structures toward reference pupil 608. In some embodiments, the second medium is an optically transparent substrate, e.g., a substrate made of glass, such as N-BK7, N-SF11, or F2; barium borate; barium fluoride; magnesium fluoride; sapphire; calcium fluoride; fused silica; calcite; a plastic, such as polymethyl methacrylate or polycarbonate; etc. The direction of ray 604 in different mediums is dependent on optical properties (e.g., refractive indexes) of the mediums. The refractive index of air is approximately one and the refractive indexes of solid substrates are greater than one (e.g., the refractive index of polymethyl methacrylate is approximately 1.49, the refractive index of sapphire is approximately 1.58, and the refractive index of sapphire is approximately 1.77).

Figure 6C:
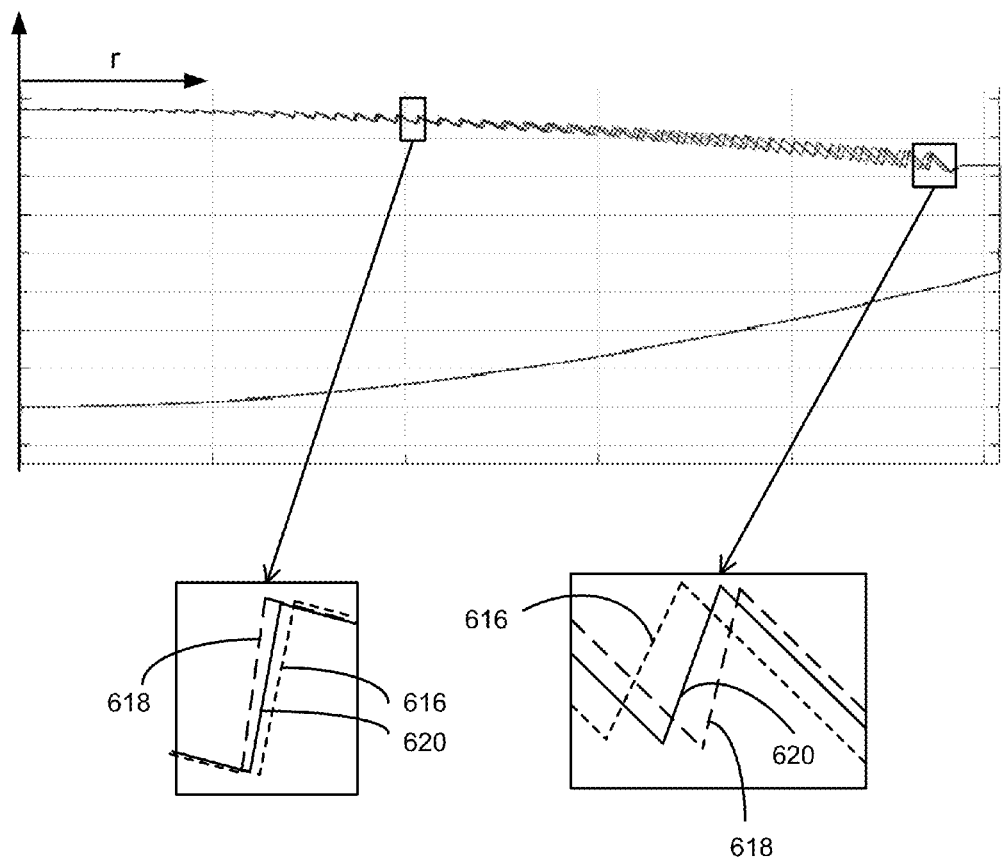
FIG. 6C illustrates of surface profiles of three Fresnel lenses with dynamic draft in accordance with some embodiments.

FIG. 6C illustrates surface profiles of three Fresnel lenses with dynamic draft in accordance with some embodiments. As explained above with respect to FIG. 2C, a Fresnel lens with dynamic draft has a plurality of Fresnel structures with different draft angles, and the draft angle for each Fresnel structure is based on its distance r from a reference axis (e.g., a center of the lens) of the Fresnel lens. As described above with respect to FIG. 2C, the draft angle increases (e.g., the draft facets become less steep) when the distance from the center of the lens increases. Additionally, each Fresnel structure is characterized by a draft angle selected based on the direction of ray 604 transmitted through each respective Fresnel structure. Insets of FIG. 6C demonstrate draft facets from two positions on the lenses. Surface profile 616 has draft angles corresponding to directions of rays 604 in the second medium (e.g., a substrate), which correspond to the Fresnel structures shown in FIG. 2F. Surface profile 618 has draft angles corresponding to directions of rays 604 in the first medium (e.g., air), which correspond to the Fresnel structures shown in FIG. 6B. Surface profile 620 has draft angles which are between the draft angles of surface profile 616 and the draft angles of surface profile 618 (e.g., an average of the draft angles of surface profile 616 and 618). In some embodiments, a Fresnel lens with dynamic draft has draft angles which are weighted averages of the draft angles of surface profiles 616 and 618 (e.g., 30% of a draft angle of surface profile 616 and 70% of a draft angle of surface profile 618, or 40% of a draft angle of surface profile 616 and 60% of a draft angle of surface profile 618).

The effect of draft angles on optical artifacts will be explained with respect to FIGS. 6D-6H. As described above with respect to FIGS. 2D and 2E, interaction (e.g., the interaction including reflection and/or refraction) between an incoming light and a draft facet can lead to at least two types of reflections that increase optical artifacts. FIG. 2D illustrates interactions when a portion of transmitted rays enter through the adjacent slope facet of a Fresnel structure and is reflected from the draft facet internally (e.g., a total internal reflection). FIG. 2E illustrates interactions when a portion of the rays is reflected upon impinging on the draft facet surface (e.g., the ray transmitted through a medium having a first refractive index is reflected upon impinging on the draft facet surface made of a medium having a second refractive index greater than the first refractive index, which is called herein "external reflection" to distinguish from the total internal reflection).

Figure 6D:
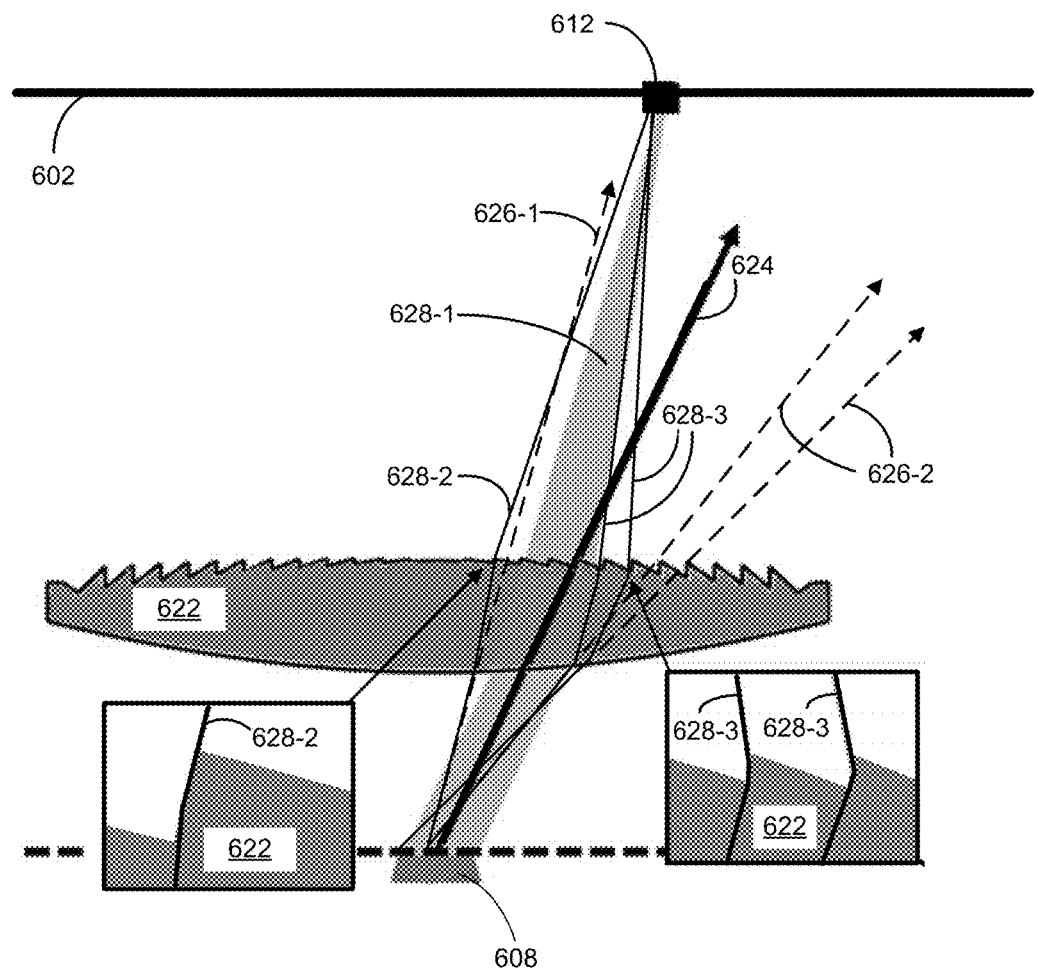
FIG. 6D illustrates optical artifacts caused by interaction between light rays and draft facets of a conventional Fresnel lens in accordance with some embodiments.

FIG. 6D illustrates optical artifacts caused by interaction between light rays 628-2 and 628-3 and draft facets of Fresnel lens 622 (e.g., a conventional Fresnel lens) in accordance with some embodiments. In FIG. 6D, light from reference off-axis position 612 on display 602 is transmitted through Fresnel lens 622. The light is output in a range of directions and rays therefore travel along different paths. A portion of transmitted light travels via paths represented by rays 628-1 in FIG. 6D. Rays 628-1 travel through Fresnel lens 622 and enter through reference pupil 608. In some embodiments, rays 628-1 include a chief ray (e.g., a ray that goes through the center of reference pupil 608). In some cases, rays 628-1 constitute a major portion of the light emitted by display 602 at reference off-axis position 612. Rays 628-1 entering through reference pupil 608 are perceived as originating from a "virtual" position located in the direction indicated by arrow 624.

A portion of the light transmitted from reference off-axis position 612 is emitted in a direction that is distinct from the direction of rays 628-1. Such light is called herein stray light. A portion of the stray light does not enter reference pupil 608, and is therefore not detected. However, a portion of the stray light travels through Fresnel lens 622, and, upon interacting with the draft facets, enters through reference pupil 608. Examples of such stray light entering reference pupil 608 are represented by rays 628-2 and 628-3 in FIG. 6D. Ray 628-2 travels via a path entering Fresnel lens 622 at a location closer to the center of the lens than rays 628-1. Ray 628-2 enters a respective Fresnel structure through an adjacent slope facet and is reflected from the draft facet internally (e.g., by total internal reflection, as shown in the left-hand side inset of FIG. 6D). Ray 628-2 enters through reference pupil 608 and is detected as an optical artifact located in a direction indicated by arrow 626-1. Such artifact caused by the internal reflection is herein referred to as an "inner mode" artifact. Another source of artifacts is presented by rays 628-3 which enter Fresnel lens 622 at locations further away from the center of the lens than rays 628-1. Rays 628-3 are reflected upon impinging on the draft facets of Fresnel lens 622 (e.g., "external reflection" as shown in the right-hand side inset of FIG. 6D) and are then transmitted through the lens towards reference pupil 608. Rays 628-3 enter through reference pupil 608 and are detected as optical artifacts located in directions indicated by arrows 626-2. Such artifacts caused by the external reflection are herein referred to as "outer mode" artifacts.

Figure 6E:
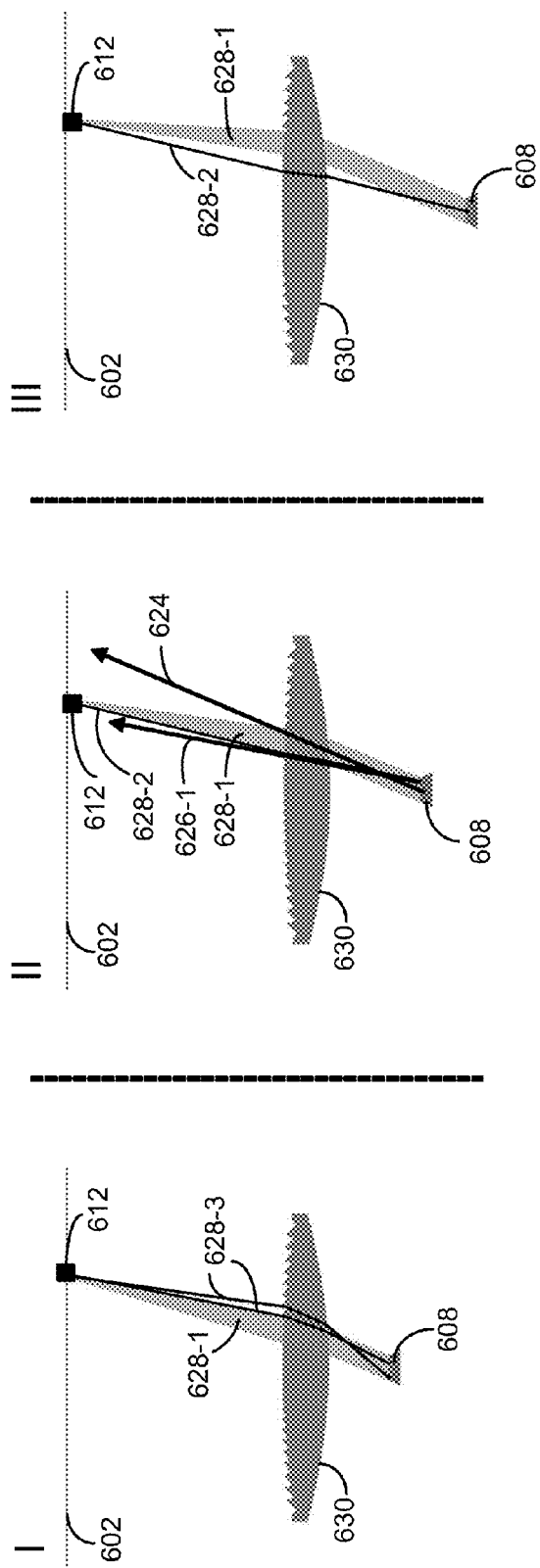
FIG. 6E illustrates a prophetic example of optical artifacts arising from an interaction of stray light with a Fresnel lens with dynamic draft in accordance with some embodiments.

Inner and outer mode optical artifacts are reduced by a Fresnel structure with dynamic draft with careful selection of draft angles. In some cases, the inner and/or outer mode artifacts become more significant when a pupil is located away from a predefined eye relief for which a Fresnel lens is designed. Draft angles, selected as described below, reduces inner and outer mode optical artifacts even when the pupil is located away from the predefined eye relief FIG. 6E illustrates prophetic examples of optical artifacts caused by draft facets of Fresnel lens 630 in accordance with some embodiments. In FIG. 6E, draft facets of Fresnel lens 630 are parallel to rays 604 in the substrate (e.g., surface profile 616 of FIG. 6C). Though the dynamic draft of Fresnel lens 630 reduces optical artifacts (e.g., FIGS. 2H and 2I), some optical artifacts remain, especially when a pupil is located away from the preselected eye relief for Fresnel lens 630.

Fresnel lens 630 is configured for eye relief of 15 mm. In section II (middle section) of FIG. 6E, reference pupil 608 is positioned at the predefined eye relief (e.g., 15 mm). Rays 628-1 from reference off-axis position 612 enters through reference pupil 608 in the direction indicated by arrow 624. In addition, a portion of rays from reference off-axis position 612 (e.g., ray 628-2) enters through reference pupil 608 in the direction indicated by arrow 626-1, which causes an inner mode optical artifact.

In section I (left-hand section) of FIG. 6E, reference pupil 608 is positioned 5 mm closer to Fresnel lens 630 than the predefined eye relief (e.g., 10 mm from Fresnel lens 630). Section I of FIG. 6E also illustrates that rays 628-3 enter through reference pupil 608, which cause outer mode optical artifacts.

In section III (right-hand section) of FIG. 6E, reference pupil 608 is positioned 8 mm further away from Fresnel lens 630 than the predefined eye relief (e.g., 23 mm from Fresnel lens 630). Section III of FIG. 6E also illustrates that ray 628-2 enters through reference pupil 608, which causes an inner mode optical artifact.

Overall, FIG. 6E illustrates that Fresnel lens 630 with dynamic draft still suffers from inner and/or outer mode optical artifacts depending on the position of the reference pupil.

Figure 6F:
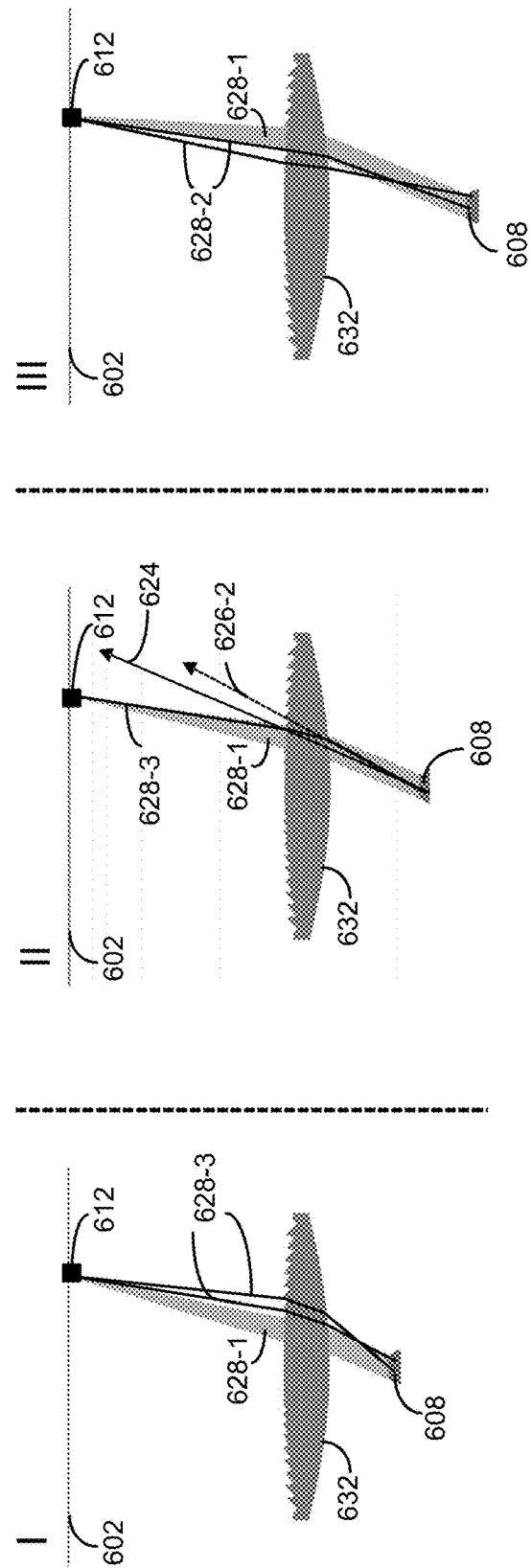
FIG. 6F illustrates a prophetic example of optical artifacts arising from an interaction of stray light with a Fresnel lens with dynamic draft in accordance with some embodiments.

FIG. 6F illustrates prophetic examples of optical artifacts caused by draft facets of Fresnel lens 632 in accordance with some embodiments. In FIG. 6F, draft facets of Fresnel lens 632 are parallel to rays 604 in air (e.g., surface profile 618 of FIG. 6C).

Fresnel lens 632 is configured for eye relief of 15 mm. In section II (middle section) of FIG. 6F, reference pupil 608 is positioned at the predefined eye relief (e.g., 15 mm). Rays 628-1 from reference off-axis position 612 enters through reference pupil 608 in the direction indicated by arrow 624. In addition, a portion of rays from reference off-axis position 612 (e.g., ray 628-3) enters through reference pupil 608 in the direction indicated by arrow 626-2, which causes an outer mode optical artifact.

In section I (left-hand section) of FIG. 6F, reference pupil 608 is positioned 5 mm closer to Fresnel lens 632 than the predefined eye relief (e.g., 10 mm from Fresnel lens 632).

Section I of FIG. 6F also illustrates that rays 628-3 enter through reference pupil 608, which cause outer mode optical artifacts.

In section III (right-hand section) of FIG. 6F, reference pupil 608 is positioned 8 mm further away from Fresnel lens 632 than the predefined eye relief (e.g., 23 mm from Fresnel lens 630). Section III of FIG. 6F also illustrates that rays 628-2 enters through reference pupil 608, which causes an inner mode optical artifact.

Overall, FIG. 6F illustrates that Fresnel lens 632 with dynamic draft still suffers from inner and outer mode optical artifacts depending on the position of the reference pupil.

Figure 6G:
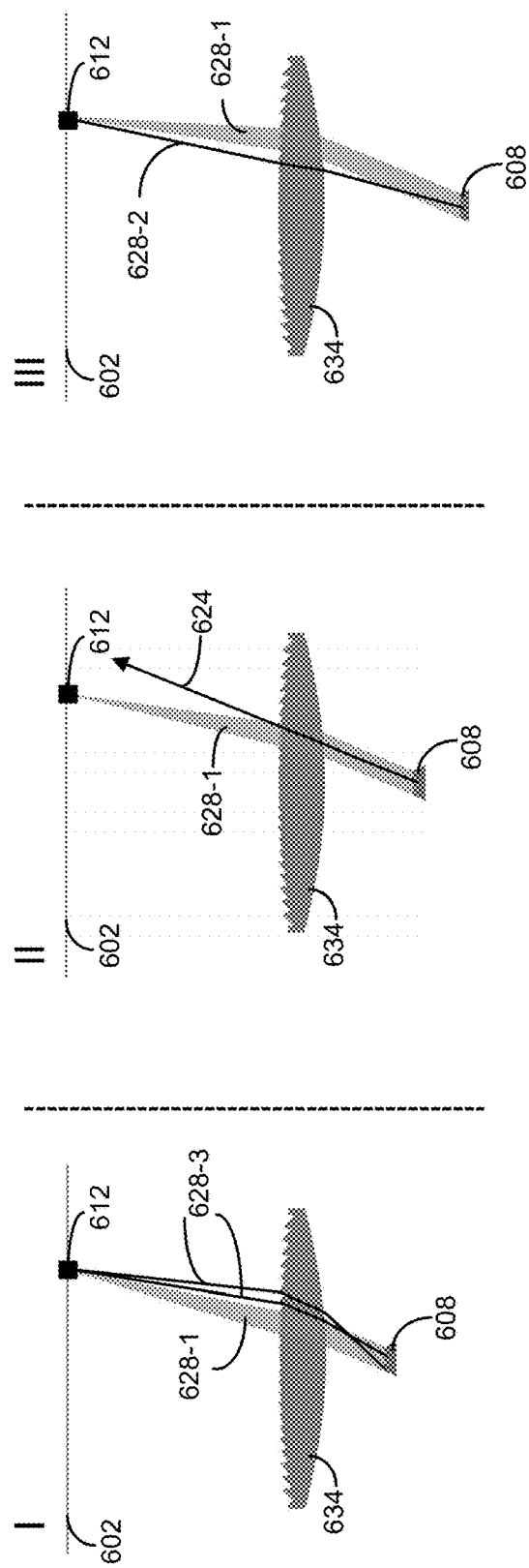
FIG. 6G illustrates a prophetic example of optical artifacts arising from an interaction of stray light with a Fresnel lens with dynamic draft in accordance with some embodiments.

FIG. 6G illustrates prophetic examples of optical artifacts caused by draft facets of Fresnel lens 630 in accordance with some embodiments. In FIG. 6G, draft facets of Fresnel lens 634 have draft angles, which are averages of draft angles of surface profiles 616 and 618.

Fresnel lens 634 is configured for eye relief of 15 mm. In section II (middle section) of FIG. 6G, reference pupil 608 is positioned at the predefined eye relief (e.g., 15 mm). Rays 628-1 from reference off-axis position 612 enters through reference pupil 608 in the direction indicated by arrow 624. In section II, no stray light enters reference pupil 608, and inner and outer mode optical artifacts are reduced or eliminated.

In section I (left-hand section) of FIG. 6G, reference pupil 608 is positioned 5 mm closer to Fresnel lens 634 than the predefined eye relief (e.g., 10 mm from Fresnel lens 634). Section I of FIG. 6G also illustrates that rays 628-3 enter through reference pupil 608, which causes outer mode optical artifacts.

In section III (right-hand section) of FIG. 6G, reference pupil 608 is positioned 8 mm further away from Fresnel lens 634 than the predefined eye relief (e.g., 23 mm from Fresnel lens 634). Section III of FIG. 6G also illustrates that ray 628-2 enters through reference pupil 608, which causes an inner mode optical artifact. However, the inner mode optical artifact shown in section III of FIG. 6G is less than the inner mode optical artifact shown in section III of FIG. 6F.

Overall, FIG. 6G illustrates that inner and/or outer mode optical artifacts are reduced for Fresnel lens 634, compared to Fresnel lens 630 or 632.

Figure 6H:
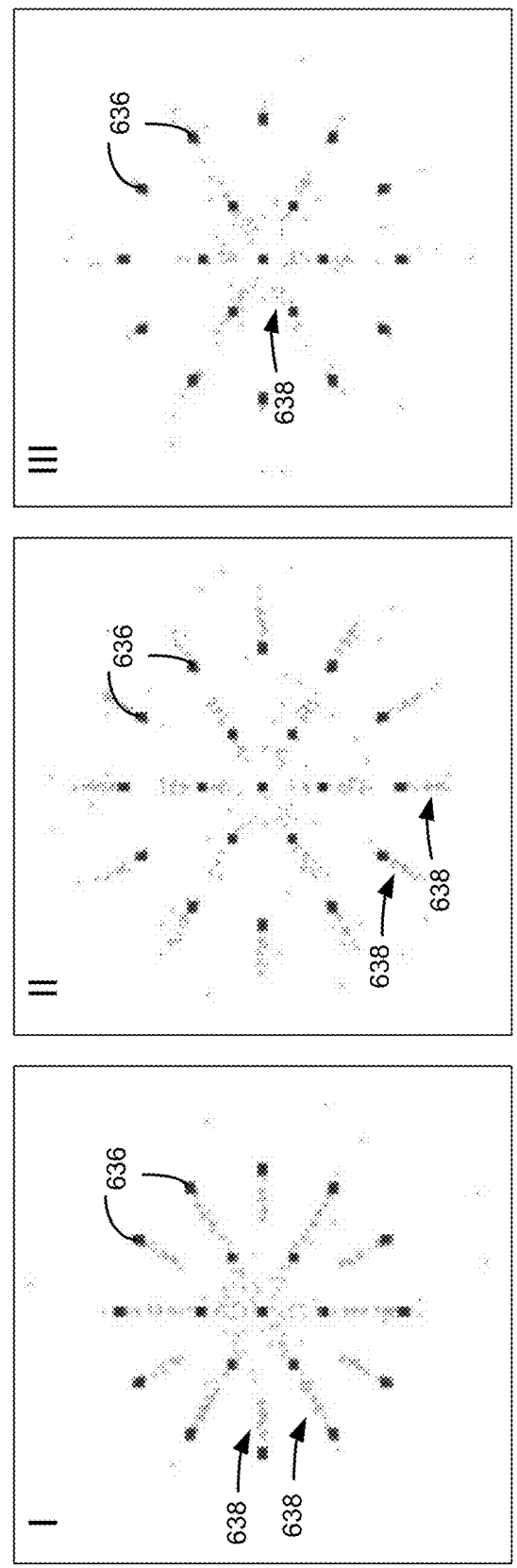
FIG. 6H illustrates a prophetic example of reduction of optical artifacts based on computer simulations in accordance with some embodiments.

FIG. 6H illustrates reduction of optical artifacts in accordance with some embodiments. Each of images I, II, and III of FIG. 6H corresponds to an image displayed by a display device (e.g., display device 602) and projected through a Fresnel lens and a pupil located at the predefined eye relief (e.g., 15 mm from the Fresnel lens). Each image shows nineteen features 636 (e.g., dots) and optical artifacts 638 around the displayed features.

Image I of FIG. 6H corresponds to an image obtained with Fresnel lens 630 with draft facets parallel to rays 604 in the substrate. Image I of FIG. 6H shows inner mode optical artifacts 638 around features 636 (e.g., section II of FIG. 6E).

Image II of FIG. 6H corresponds to an image obtained with Fresnel lens 632 with draft facets parallel to rays 604 in air. Image II of FIG. 6H shows outer mode optical artifacts 638 around features 636 (e.g., section II of FIG. 6F).

Image III of FIG. 6H corresponds to an image obtained with Fresnel lens 634 with draft facets having draft angles that are averages of the draft angles of draft facets parallel to rays 604 in the substrate and the draft angles of draft facets parallel to rays 604 in air (e.g., section II of FIG. 6G). Image III of FIG. 6H shows a significant reduction of the optical artifacts, compared to image I and image II of FIG. 6H. In some embodiments, the reduction in inner and/or outer mode optical artifacts allows an increased range of eye relief (e.g., the reference pupil can be positioned further away from the predefined eye relief without suffering from significant optical artifacts).

In light of these principles, we now turn to certain embodiments.

In accordance with some embodiments, a lens configured for transmitting light in a first medium (e.g., air) includes an optically transparent substrate having a first lens surface and a second lens surface opposite to the first lens surface (e.g., Fresnel lens 606 with dynamic draft in FIG. 6A has first lens surface 603-1 and second lens surface 603-2). The first lens surface includes a plurality of Fresnel structures (e.g., first lens surface 603-1 includes multiple Fresnel structures). A respective Fresnel structure of the plurality of Fresnel structures includes a slope facet and a draft facet (e.g., FIG. 2A), and the draft facet is characterized by a draft angle. The draft angle of the respective Fresnel structure is based on a distance of the respective Fresnel structure from a reference axis of the lens. In some embodiments, the reference axis is an optical axis of the lens (e.g., the reference axis is optical axis 610 of Fresnel lens 606 with dynamic draft in FIG. 6A). In some embodiments, the reference axis extends from a center of the lens. The lens is associated with a respective optical axis (e.g., Fresnel lens 606 with dynamic draft is associated with optical axis 610 in FIG. 6A). The draft angle of the respective Fresnel structure is between a first angle and a second angle, the first angle corresponding to a direction of a ray, in the first medium, transmitted from a reference off-axis position through the respective Fresnel structure toward a reference pupil (e.g., an angle of ray 604, in the first medium, transmitted from reference off-axis position 612 toward reference pupil 608 in FIG. 6A, before entering Fresnel lens 606, such as an angle of a portion of ray 604 from reference off-axis position 612 to the respective Fresnel structure), and the second angle corresponding to a direction of the ray, in the optically transparent substrate, transmitted from the reference off-axis position through the respective Fresnel structure toward the reference pupil (e.g., an angle of ray 604 in the optically transparent substrate, transmitted from reference off-axis position 612 toward reference pupil 608 in FIG. 6A, such as an angle of a portion of ray 604 within Fresnel lens 606). For example, in FIG. 6C, surface profile 618 has draft angles corresponding to directions of rays 604 in the first medium (e.g., air) and surface profile 616 has draft angles corresponding to directions of rays 604 in the optically transparent substrate. Surface profile 620 has Fresnel structures with draft angles which are averages of the draft angles of surface profiles 616 and 618. The reference off-axis position is located away from the respective optical axis of the lens (e.g., reference off-axis position 612 is located away from optical axis 610 in FIG. 6A).

In some embodiments, reference pupil 608 has a diameter ranging from 1 mm to 12 mm (e.g., 1, 2, 3, 4, 5, 6, 7, 8, 9, 10, 11 or 12 mm). In some embodiments, the diameter of reference pupil 608 ranges from 2 to 8 mm. In some embodiments, reference pupil 608 corresponds to pupil 332 of eye 330 of a user, as shown in FIG. 3A.

In some embodiments, the first medium is air.

In some embodiments, the first angle corresponds to a direction of a ray, in the first medium, transmitted from the reference off-axis position through the respective Fresnel structure toward a center of the reference pupil (e.g., center of reference pupil 608 in FIG. 6A), and the second angle corresponds to a direction of the ray, in the optically transparent substrate, transmitted from the reference off-axis position through the respective Fresnel structure toward the center of the reference pupil.

In some embodiments, the reference off-axis position and the reference pupil are located on opposite sides of a lens (e.g., reference off-axis position 612 and reference pupil 608 are located on opposite sides of Fresnel lens 606 in FIG. 6A). For example, the reference off-axis position is located on a first side of the lens and the reference pupil is located on a second side of the lens that is opposite to the first side of the lens (e.g., in FIG. 6A, reference off-axis position 612 is located on a first side of Fresnel lens 606 and reference pupil 608 is located on a second side of Fresnel lens 606, that is opposite to the first side). In some cases, the lens is located between the reference off-axis position and the reference pupil. In some embodiments, the lens defines a respective plane (e.g., plane 609 is defined by Fresnel lens 606 in FIG. 6A). For example, the lens has a generally planar shape (e.g., a thickness of the lens is less than a diameter of the lens, and sometimes less than half the diameter of the lens). In some cases, the reference off-axis position is located on a first side of the respective plane and the reference pupil is located on a second side of the respective plane that is opposite to the first side of the plane (e.g., reference off-axis position 612 is located on a first side of plane 609 and reference pupil 608 is located on a second side of plane 609 that is opposite to the first side in FIG. 6A).

In some embodiments, the draft angle of the respective Fresnel structure is an average of the first angle and the second angle. For example, surface profile 620 shows Fresnel structures with draft angles that are averages of the draft angles of surface profiles 616 and 618 in FIG. 6C.

In some embodiments, the draft angle of the respective Fresnel structure is distinct from the second angle (e.g., the draft angles of surface profile 620 are distinct from the draft angles of surface profile 616). In some embodiments, the draft angle of the respective Fresnel structure is distinct from the first angle (e.g., the draft angles of surface profile 620 are distinct from the draft angles of surface profile 618). In some embodiments, the draft angle of the respective Fresnel structure is a weighted average of the first angle and the second angle (e.g., a weighted average based on unequal weights, such as 60:40, 70:30, 80:20, etc.).

In some embodiments, the lens is configured to focus light impinging on the first lens surface (e.g., Fresnel lens 606 with dynamic draft is a converging lens, as shown in FIG. 6A).

In some embodiments, the draft angle of the respective Fresnel structure is selected to reduce light impinging on the first lens surface and interacting (e.g., reflecting and/or refracting) with the draft facet of the respective Fresnel structure and entering through the reference pupil (e.g., reduction of light interacting with the draft facet of Fresnel lens 634 with dynamic draft and entering through the reference pupil 608 is shown in FIG. 6G and image III of FIG. 6H).

In some embodiments, the draft angle of the respective Fresnel structure is selected to reduce light reflected from the draft facet of the respective Fresnel structure and entering through the reference pupil (e.g., reduction of outer mode optical artifacts is shown in FIG. 6G and image III of FIG. 6H).

In some embodiments, the draft angle of the respective Fresnel structure is selected to reduce light reflected from the draft facet of the respective Fresnel structure by total internal reflection from entering through the reference pupil (e.g., reduction of inner mode optical artifacts is shown in FIG. 6G and image III of FIG. 6H). In some embodiments, at least a portion of the light reflected upon impinging on the draft facet from the first medium and entering through the reference pupil is reduced.

In some embodiments, the plurality of Fresnel structures includes a first Fresnel structure and a second Fresnel structure (e.g., Fresnel structure 272 and Fresnel structure 274 in FIG. 2B). The draft facet of the first Fresnel structure has a first draft angle (e.g., Fresnel structure 272 has a small draft angle). The draft facet of the second Fresnel structure has a second draft angle that is distinct from the first draft angle (e.g., Fresnel structure 274 has a large draft angle; also see FIG. 6C).

In some embodiments, the optically transparent substrate includes a second medium that is distinct from the first medium. For example, a refractive index of the first medium (e.g., air) is distinct from a refractive index of the second medium. In some embodiments, the second medium is glass, such as N-BK7, N-SF11, and F2; barium borate; barium fluoride; magnesium fluoride; sapphire; calcium fluoride; fused silica; calcite; etc. The refractive index of glass is distinct from the refractive index of air. In some embodiments, the second medium is a transparent plastic, such as polymethyl methacrylate.

In accordance with some embodiments, a display device includes the lens discussed above (e.g., Fresnel lens 634 with dynamic draft in FIG. 6G), and an electronic display (e.g., display device 602, such as light emission device array 310 in FIG. 3A) coupled with the lens for outputting light through the lens.

In some embodiments, the display device is a head-mounted display device (e.g., display device 100 of FIG. 1A).

In some embodiments, the electronic display includes an array of light emitting devices configured to output a plurality of light rays (e.g., light emission device array 310 in FIG. 3A) and transmit the plurality of light rays through the lens toward a reference pupil of an eye of a user when the display device is worn on a head of the user.

In some embodiments, the array of light emitting devices is configured to output at least a portion of the plurality of output light rays from a reference off-axis position toward the reference pupil of the eye of the user when the display device is worn on the head of the user (e.g., rays 628-1 are output by reference off-axis position 612 toward reference pupil 608 in FIG. 6D).

In some embodiments, the array of light emitting devices includes an array of liquid crystal based pixels. In some embodiments, the electronic display is a Liquid Crystal Display (LCD).

In some embodiments, the reference off-axis position is located on the electronic display (e.g., reference off-axis position 612 is located on display 602 in FIG. 6D).

In some embodiments, the reference off-axis position is located on a periphery of the electronic display (e.g., reference off-axis position 612 on a periphery of display 602 in FIG. 6D).

In accordance with some embodiments, a method for reducing optical artifacts includes transmitting light from a display device (e.g., display 602 in FIG. 6D) through a first medium toward a lens (e.g., Fresnel lens 634 with dynamic draft in FIG. 6G). The lens includes an optically transparent substrate having a first lens surface and a second lens surface opposite to the first lens surface (e.g., FIG. 6A). The first lens surface includes a plurality of Fresnel structures (e.g., FIG. 6A). A respective a respective Fresnel structure of the plurality of Fresnel structures includes a slope facet and a draft facet, and the draft facet is characterized by a draft angle (e.g., FIG. 2A). The draft angle of the respective Fresnel structure is based on a distance of the respective Fresnel structure from a reference axis of the lens (e.g., FIG. 6C). The lens is associated with a respective optical axis (e.g., FIG. 6A). The draft angle of the respective Fresnel structure is between a first angle and a second angle, the first angle corresponding to a direction of a ray, in the first medium, transmitted from a reference off-axis position through the respective Fresnel structure toward a reference pupil and the second angle corresponding to a direction of the ray, in the optically transparent substrate, transmitted from the reference off-axis position through the respective Fresnel structure toward the reference pupil (e.g., FIG. 6C). The reference off-axis position is located away from the respective optical axis of the lens (e.g., FIG. 6A).

In accordance with some embodiments, a lens includes an optically transparent substrate (e.g., a substrate made of plastic, such as polymethyl methacrylate, and glass, such as N-BK7, N-SF11, and F2; barium borate; barium fluoride; magnesium fluoride; sapphire; calcium fluoride; fused silica; calcite; etc.) having a first lens surface and a second lens surface opposite to the first lens surface (e.g., FIG. 6A). The first lens surface includes a plurality of Fresnel structures (e.g., FIG. 6A). A respective a respective Fresnel structure of the plurality of Fresnel structures includes a slope facet and a draft facet (e.g., FIG. 2A), and the draft facet is characterized by a draft angle. The draft angle of the respective Fresnel structure is based on a distance of the respective Fresnel structure from a reference axis of the lens. In some embodiments, the reference axis is an optical axis of the lens (e.g., FIG. 6A). The draft angle of the respective Fresnel structure is selected so that a ray impinging on the respective Fresnel structure of the plurality of Fresnel structures from a reference off-axis position does not impinge on the draft facet subsequent to entering the respective Fresnel structure (e.g., the draft angles of Fresnel lens 634 are selected to reduce total internal reflection as illustrated in FIG. 6G and image III of FIG. 6H).

Figure 7A:
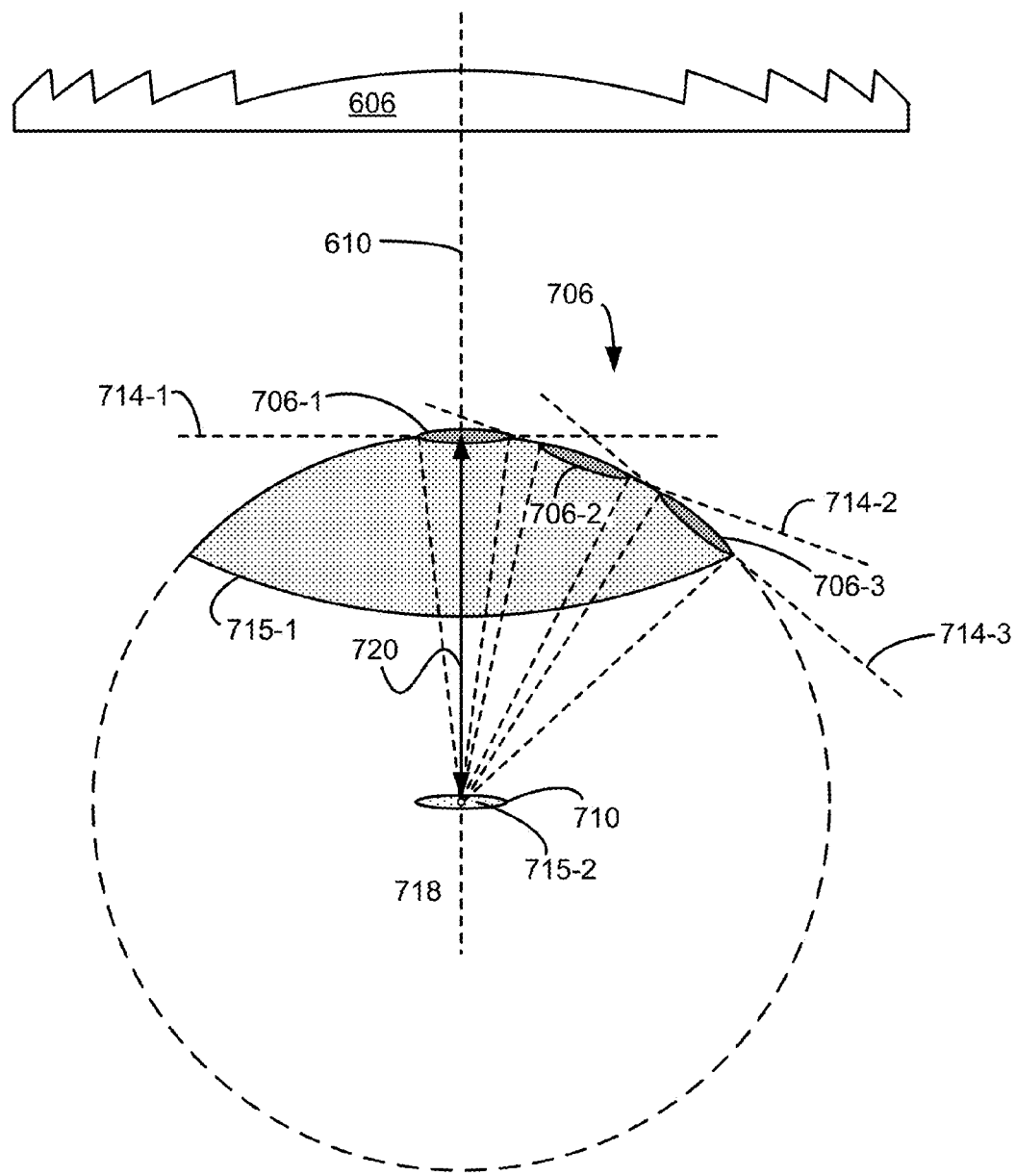
FIG. 7A illustrates a reference pupil and its rotational movement in accordance with some embodiments.
Figure 7B:
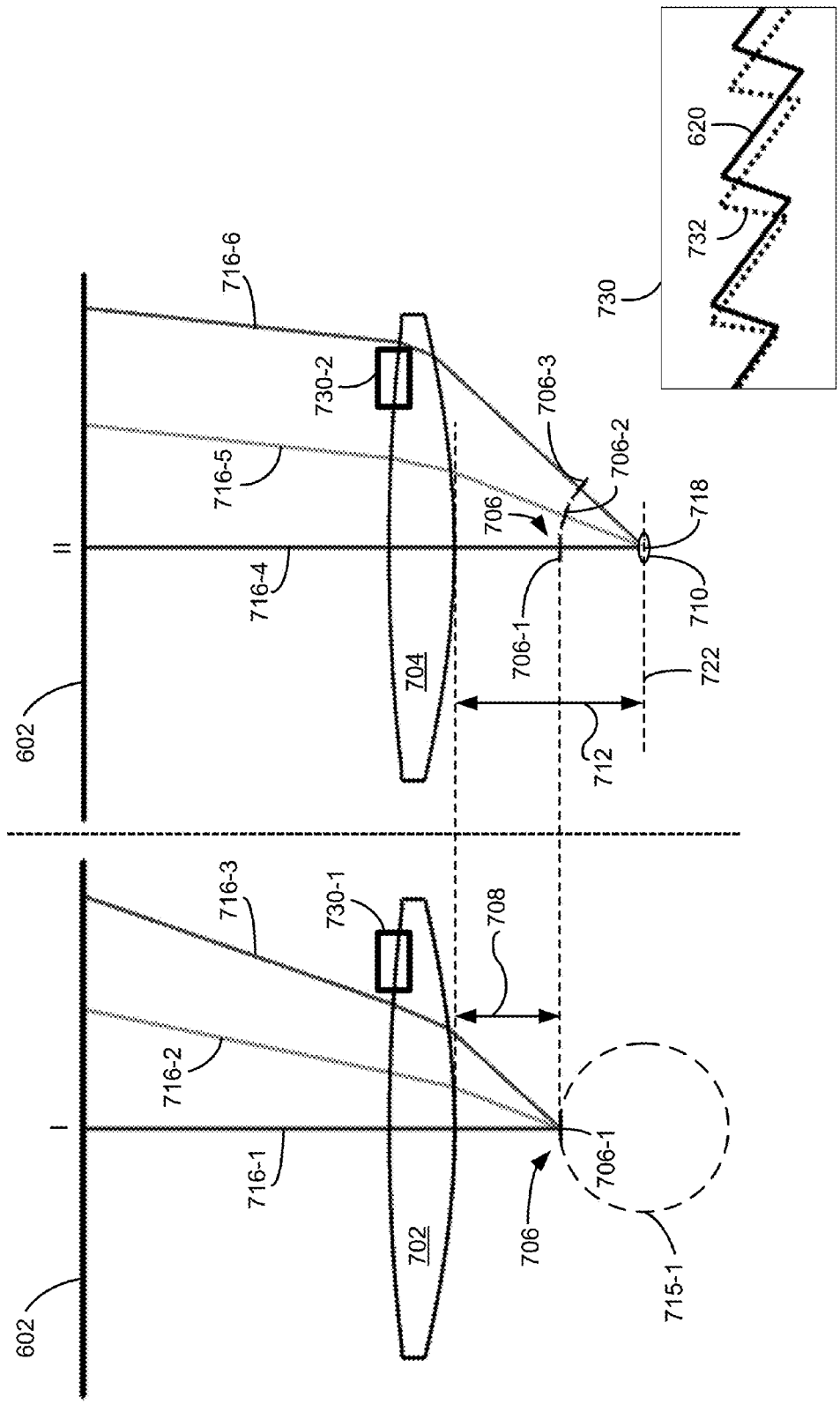
FIG. 7B illustrates operations of a Fresnel lens that is designed for a variable gaze and a Fresnel lens that is not designed for a variable gaze in accordance with some embodiments.
Figure 7C:
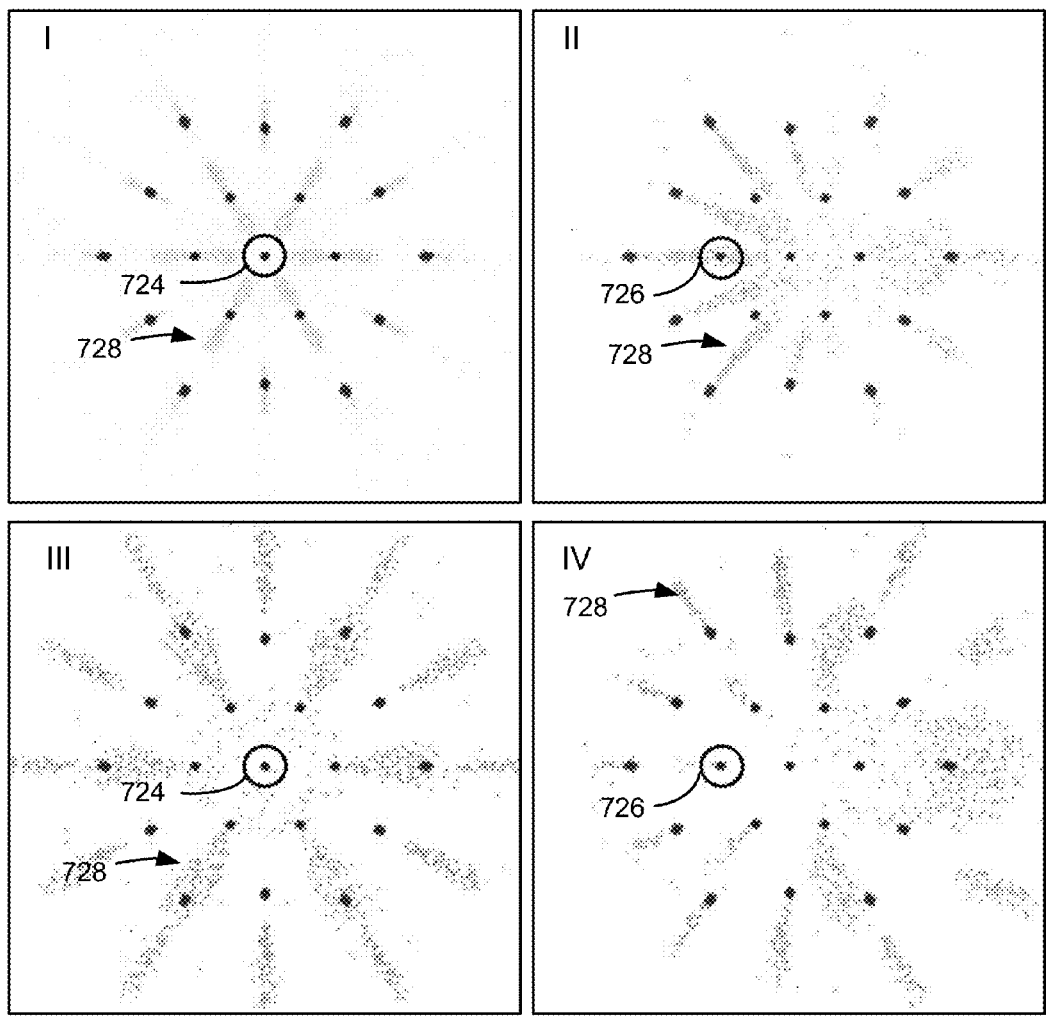
FIG. 7C illustrates a prophetic example comparing optical artifacts associated with a Fresnel lens that is designed for a variable gaze and a Fresnel lens that is not designed for a variable gaze in accordance with some embodiments.

In some embodiments, Fresnel lenses are also configured to reduce optical artifacts associated with various gaze directions, as described herein with respect to FIGS. 7A-7C.

FIG. 7A illustrates first reference pupil 706 and its rotational movement in accordance with some embodiments. First reference pupil 706 corresponds to reference pupil 608 described above with respect to FIG. 6A. Reference pupil 706 is rotatable about reference center of rotation 718 (e.g., a pupil of an eye can rotate about a center of the eye). Distance 720 between first reference pupil 706 and reference center of rotation 718 is 8 mm or more (e.g., 8 mm, 10 mm, 12 mm, 14 mm, etc.). In some embodiments, distance 720 is 12 mm.

In FIG. 7A, rotation of first reference pupil 706 is illustrated with three positions 706-1, 706-2 and 706-3. Position 706-1 corresponds to a position in which first reference pupil 706 is directly facing Fresnel lens 606. When first reference pupil 706 is at position 706-1, first reference pupil 706 is located along optical axis 610 of Fresnel lens 606. Positions 706-2 and 706-3 are located away from optical axis 610. In FIG. 7A, position 706-2 is rotated 20 degrees from position 706-1 (and optical axis 610), and position 706-3 has rotated 40 degrees from position 706-1 (and optical axis 610).

FIG. 7A also illustrates that first reference pupil 706 defines reference plane 714 (e.g., first reference pupil 706 is on reference plane 714). For example, first reference pupil 706, at position 706-1, defines reference plane 714-1, first reference pupil 706, at position 706-2, defines reference plane 714-2, and first reference pupil 706, in position 706-3, defines reference plane 714-3.

In some embodiments, the rotation of first reference pupil 706 is characterized by surface area 715-1 (e.g., an area covered by the rotation of first reference pupil 706). FIG. 7A also illustrates second reference pupil 710 characterized by surface area 715-2 (e.g., second reference pupil 710 defines a circular opening, and the area of the circular opening has area 715-2). As shown in FIG. 7A, surface area 715-1 is greater than surface area 715-2. The significance of second reference pupil 710 is described below with respect to FIG. 7B.

FIG. 7B illustrates operations of Fresnel lens 704 that is designed for a variable gaze and Fresnel lens 702 that is not designed for a variable gaze in accordance with some embodiments.

In section I (left-hand side) of FIG. 7B, display 602 transmits rays 716-1, 716-2 and 716-3 through Fresnel lens 702 toward reference pupil 706 located at position 706-1. In some embodiments, Fresnel lens 702 corresponds to Fresnel lens 634 described above with respect to FIG. 6G. In section I of FIG. 7B, the draft facets of Fresnel lens 702 are configured so that the draft facet of a respective Fresnel structure is between a first angle and a second angle. The first angle corresponds to a direction of a ray, in the first medium (e.g., air), transmitted from a reference off-axis position through the respective Fresnel structure toward first reference pupil 706 and the second angle corresponds to a direction of the ray, in the optically transparent substrate, transmitted from the reference off-axis position through the respective Fresnel structure toward first reference pupil 706. As explained above with respect to FIG. 6H, Fresnel lens 702 is configured to reduce optical artifacts while reference pupil 706 is located at position 706-1.

In section II (right-hand side) of FIG. 7B, display 602 transmits rays 716-4, 716-5 and 716-6 through Fresnel lens 704. In section II of FIG. 7B, the draft facets of Fresnel lens 704 are configured so that the draft facet of a respective Fresnel structure is between a third angle and a fourth angle. The third angle corresponds to a direction of a ray, in the first medium (e.g., air), transmitted from a reference off-axis position through the respective Fresnel structure toward second reference pupil 710 and the fourth angle corresponds to a direction of the ray, in the optically transparent substrate, transmitted from the reference off-axis position through the respective Fresnel structure toward second reference pupil 710. Second reference pupil 710 is located further away from Fresnel lens 704 than first reference pupil 706. Fresnel lens 704 is configured to reduce optical artifacts when reference pupil 706 is located away from an optical axis of Fresnel lens 704 (e.g., position 706-2 or position 706-3). In some embodiments, second reference pupil 710 is located on plane 722 that includes center of rotation 718 of first reference pupil 706.

FIG. 7B also shows surface profiles of portion 730-1 of Fresnel lens 702 and portion 730-2 of Fresnel lens 704 in inset 730. In inset 730, Fresnel lens 702 (shown with a solid line) has surface profile 620 of FIG. 6C (e.g., the draft angle of each Fresnel structure of Fresnel lens 702 is between a first angle and a second angle, the first angle corresponding to a direction of a ray, in the first medium, transmitted from a reference off-axis position through the respective Fresnel structure toward first reference pupil 706 and the second angle corresponding to a direction of the ray, in the optically transparent substrate, transmitted from the reference off-axis position through the respective Fresnel structure toward first reference pupil 706). Also in inset 730, Fresnel lens 704 (shown with a dotted line) has different surface profile 732, in which the draft angle of each Fresnel structure of Fresnel lens 704 is between a third angle and a fourth angle, the third angle corresponding to a direction of a ray, in the first medium, transmitted from a reference off-axis position through the respective Fresnel structure toward second reference pupil 710 and the fourth angle corresponding to a direction of the ray, in the optically transparent substrate, transmitted from the reference off-axis position through the respective Fresnel structure toward second reference pupil 710. The draft angles of Fresnel lens 704 are selected to reduce optical artifacts when first reference pupil 706 is not facing directly toward Fresnel lens 704 (e.g., first reference pupil 706 is at position 706-2).

FIG. 7C illustrates a prophetic example comparing optical artifacts associated with Fresnel lens 704 that is designed for a variable gaze and Fresnel lens 702 that is not designed for a variable gaze in accordance with some embodiments.

Images I and II show simulation results for Fresnel lens 702 when a reference pupil is located at position 706-1 (image I) and position 706-2 (image II). In image I, displayed feature 724 corresponds to a direction of the gaze (e.g., the eye is facing toward displayed features 724), and optical artifacts 728 around displayed feature 724 are not prominent. In image II, displayed feature 726 corresponds to a direction of the gaze (e.g., the eye is gazing toward displayed feature 726), and optical artifacts 728 are prominently present around displayed feature 726, thereby reducing the user perception of the quality of the displayed image.

Images III and IV show simulation results for Fresnel lens 704 when the reference pupil is located at position 706-1 (image III) and position 706-2 (image IV). In image III, optical artifacts 728 around displayed feature 724 are not prominent. In contrast, in image IV, optical artifacts 728 are not prominent around displayed feature 726. Because the acuity of the eye is higher for the central vision than the peripheral vision, optical artifacts located away from the direction of the gaze appear less prominently to the viewer. Thus, reducing the optical artifacts around a displayed feature corresponding to the direction of the gaze improves the user perception of the quality of the displayed image.

In light of these principles, we now turn to certain embodiments.

In accordance with some embodiments, a lens is configured for transmitting light in a first medium to a first reference pupil. The lens includes an optically transparent substrate (e.g., substrate 606) having a first lens surface (e.g., lens surface 603-1) and a second lens surface (e.g., lens surface 603-2) opposite to the first lens surface. The first lens surface includes a plurality of Fresnel structures (e.g., FIG. 2B). A respective Fresnel structure of the plurality of Fresnel structures includes a slope facet and a draft facet, the draft facet being characterized by a draft angle (e.g., FIG. 2B). The draft angle of the respective Fresnel structure is based on a distance of the respective Fresnel structure from a reference axis of the lens (e.g., the draft angle increases with the distance of the respective Fresnel structure from the reference axis of the lens). The lens is associated with a respective optical axis. The reference off-axis position is located away from the respective optical axis of the lens. The draft angle of the respective Fresnel structure is between a first angle and a second angle, the first angle corresponding to a direction of a ray, in the first medium, transmitted from a reference off-axis position through the respective Fresnel structure toward a second reference pupil (e.g., the direction of ray 716-5 before entering Fresnel lens 704) and the second angle corresponding to a direction of the ray, in the optically transparent substrate, transmitted from the reference off-axis position through the respective Fresnel structure toward the second reference pupil (e.g., the direction of ray 716-5 within Fresnel lens 704). The first reference pupil is located at a first distance from the optically transparent substrate. The second reference pupil is located at a second distance from the optically transparent substrate. The second distance is greater than the first distance (e.g., the distance between Fresnel lens 704 and second reference pupil 710 is greater than the distance between Fresnel lens 704 and first reference pupil 706).

In some embodiments, the first medium is air.

In some embodiments, the first reference pupil is rotatable so that the first reference pupil defines a first reference plane (e.g., first reference plane 714-2) when the first reference pupil is in a first rotation position and the first reference pupil defines a second reference plane (e.g., second reference plane 714-3) when the first reference pupil is in a second rotation position that is distinct from the first rotation position. The first reference plane is not parallel to the second reference plane.

In some embodiments, the first reference pupil is rotatable about a reference center of rotation (e.g., center of rotation 718).

In some embodiments, the second reference pupil defines a third reference plane (e.g., plane 722). The reference center of rotation is located on the third reference plane (e.g., section II of FIG. 7B).

In some embodiments, the rotation of the first reference pupil is characterized by a first surface area (e.g., surface area 715-1). The second reference pupil is characterized by a second surface area (e.g., surface area 715-2). The first surface area is greater than the second surface area.

In some embodiments, the draft angle of the respective Fresnel structure is selected, based on the distance of the respective Fresnel structure from the distance of the respective Fresnel structure form the reference axis of the lens, to reduce light impinging on the first lens surface and interacting with the draft facet of the respective Fresnel structure and entering through the first reference pupil while the first reference pupil is not perpendicular to the reference axis of the lens (e.g., section II of FIG. 7B).

In some embodiments, the second reference pupil and the lens are located on opposite sides of the first reference pupil (e.g., second reference pupil 710 and lens 704 are located on opposite sides of first reference pupil 706).

In some embodiments, the second distance is greater than the first distance by 10 mm or more. In some embodiments, the second distance is greater than the first distance by a radius of an eye, which typically ranges from 8 mm to 12 mm.

In some embodiments, the plurality of Fresnel structures includes a first Fresnel structure and a second Fresnel structure. The draft facet of the first Fresnel structure has a first draft angle. The draft facet of the second Fresnel structure has a second draft angle that is distinct from the first draft angle.

In accordance with some embodiments, a display device includes the lens described herein and an electronic display coupled with the lens for outputting light through the lens (e.g., FIG. 3A).

In some embodiments, the display device is a head-mounted display device (e.g., FIG. 1A).

In some embodiments, the electronic display comprises an array of light emitting devices configured to output a plurality of light rays and transmit the plurality of light rays through the lens toward a reference pupil of an eye of a user when the display device is worn on a head of the user.

In some embodiments, the array of light emitting devices is configured to output at least a portion of the plurality of output light rays from a reference off-axis position toward the reference pupil of the eye of the user when the display device is worn on the head of the user.

In some embodiments, the array of light emitting devices comprises an array of liquid crystal based pixels.

In some embodiments, the reference off-axis position is located on the electronic display. In some embodiments, the reference off-axis position is located on a periphery of the electronic display.

In accordance with some embodiments, a method of making a lens for directing light from a display device toward a first reference pupil through a first medium includes configuring a lens that includes an optically transparent substrate having a first lens surface and a second lens surface opposite to the first lens surface. The first lens surface includes a plurality of Fresnel structures. A respective Fresnel structure of the plurality of Fresnel structures includes a slope facet and a draft facet. The draft facet is characterized by a draft angle. The lens is associated with a respective optical axis. The reference off-axis position is located away from the respective optical axis of the lens. Configuring the lens includes determining the draft angle for the respective Fresnel structure based on the distance of the respective Fresnel structure from a reference axis of the lens so that the draft angle of the respective Fresnel structure is between a first angle and a second angle, the first angle corresponding to a direction of a ray, in the first medium, transmitted from a reference off-axis position through the respective Fresnel structure toward a second reference pupil and the second angle corresponding to a direction of the ray, in the optically transparent substrate, transmitted from the reference off-axis position through the respective Fresnel structure toward the second reference pupil. The first reference pupil is located at a first distance from the optically transparent substrate. The second reference pupil is located at a second distance from the optically transparent substrate. The second distance is greater than the first distance.

In some embodiments, the first reference pupil is rotatable so that the first reference pupil defines a first reference plane when the first reference pupil is in a first rotation position and the first reference pupil defines a second reference plane when the first reference pupil is in a second rotation position that is distinct from the first rotation position. The first reference plane is not parallel to the second reference plane.

In some embodiments, the draft angle of the respective Fresnel structure is an average of the first angle and the second angle.

Figure 8A:
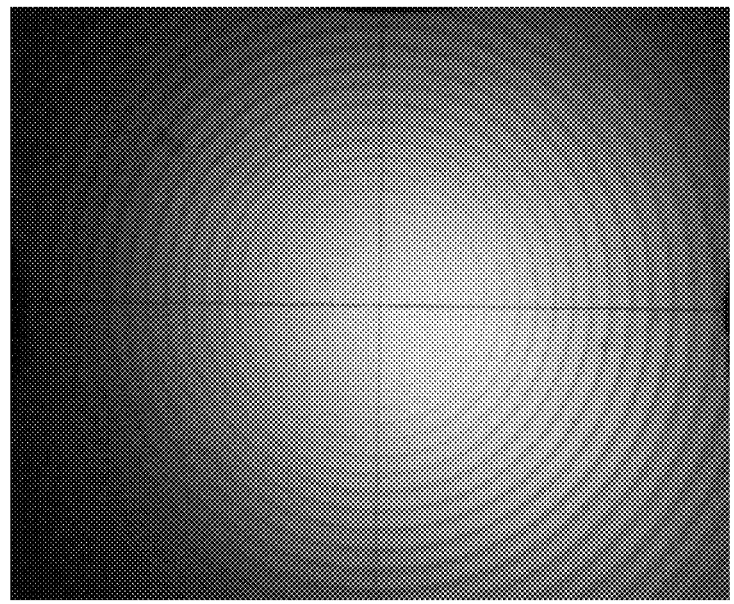
FIG. 8A illustrates an image of a white light projected through a Fresnel lens in accordance with some embodiments.

FIG. 8A illustrates an image of a white light projected through a Fresnel lens (having a 500 µm Fresnel pitch viewed through a 1-mm diameter pupil) in accordance with some embodiments.

When an image is projected by a Fresnel lens, a portion of incoming light is attenuated (e.g., reflected, blocked, and/or scattered) by draft facets of the Fresnel lens, thereby creating dark ring patterns as shown in FIG. 8A. The ring patterns can be easily detected when the displayed image is bright (e.g., the displayed image corresponds to a white screen), the draft facets are large, and/or a pupil size is small. In particular, the ring patterns are more noticeable along the edge of the image, as the projected areas of the draft facets are greater toward the edge of the Fresnel lens than toward the center of the Fresnel lens.

As explained below with respect to FIGS. 8E and 8F, decreasing the pitch of Fresnel structures toward the edge of the Fresnel lens reduces the visibility of the ring patterns, thereby improving the uniformity and quality of the projected image.

Figure 8B:
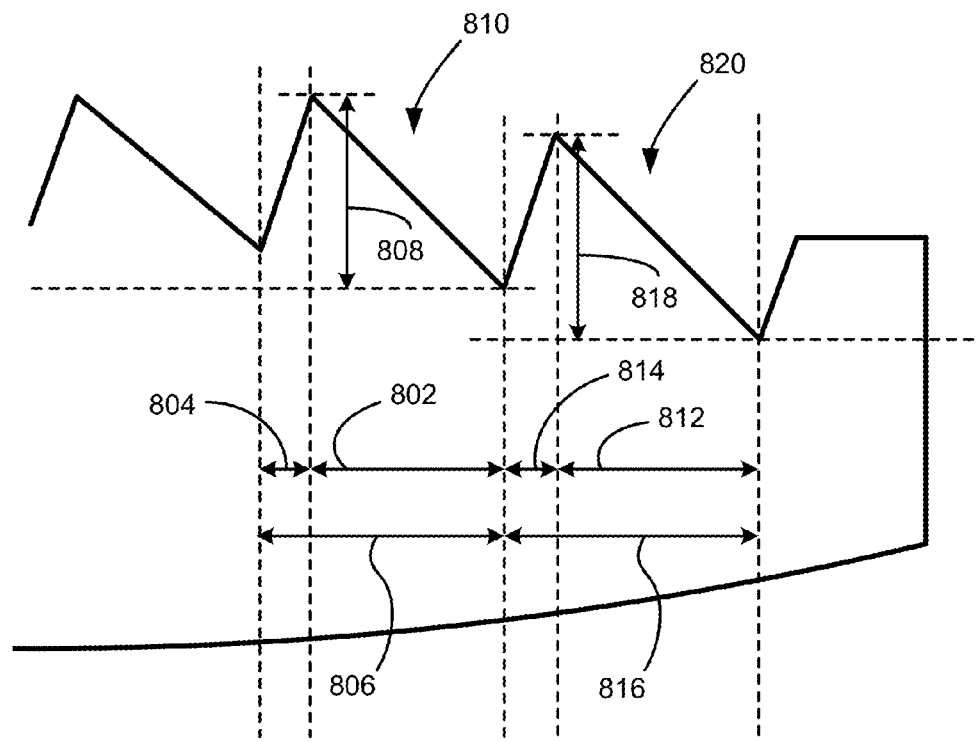
FIG. 8B illustrates a cross-section of a Fresnel lens in accordance with some embodiments.

FIG. 8B illustrates a cross-section of a Fresnel lens in accordance with some embodiments.

The Fresnel lens shown in FIG. 8B has a plurality of Fresnel structures, such as Fresnel structure 810 and Fresnel structure 820. As explained above with respect to FIG. 2B, each Fresnel structure has a slope facet and a draft facet. The slope facet is characterized by a slope angle and the draft facet is characterized by a draft angle.

In some embodiments, the slope facet is characterized by a slope height. For example, Fresnel structure 810 has slope height 808, and Fresnel structure 820 has slope height 818. In some embodiments, a slope height of a slope facet corresponds to (a slope length)×sin($\theta_s$), where $\theta_s$ corresponds to a representative slope angle (e.g., an average slope angle) of the slope facet.

In some embodiments, the slope facet is characterized by a slope base. For example, Fresnel structure 810 has slope base 802, and Fresnel structure 820 has slope base 812. In some embodiments, a slope base of a slope facet corresponds to (a slope length)×cos($\theta_s$), where $\theta_s$ corresponds to a representative slope angle (e.g., an average slope angle) of the slope facet.

In some embodiments, the draft facet is characterized by a draft base. For example, Fresnel structure 810 has draft base 804, and Fresnel structure 820 has draft base 814. In some embodiments, a draft base of a draft facet corresponds to (a draft length)×sin($\theta_d$), where $\theta_d$ corresponds to a draft angle of the draft facet.

In some embodiments, the draft facet is also characterized by a draft height. In some embodiments, a draft height of a draft facet corresponds to (a draft length)×cos($\theta_d$), where $\theta_d$ corresponds to a draft angle of the draft facet.

In some embodiments, a respective Fresnel structure is characterized by a vertex pitch, the slope base, the draft base, and/or a Fresnel structure width, which corresponds to a sum of the slope base and the draft base (e.g., Fresnel structure 810 has Fresnel structure width 806 and Fresnel structure 820 has Fresnel structure width 816).

Figure 8C:
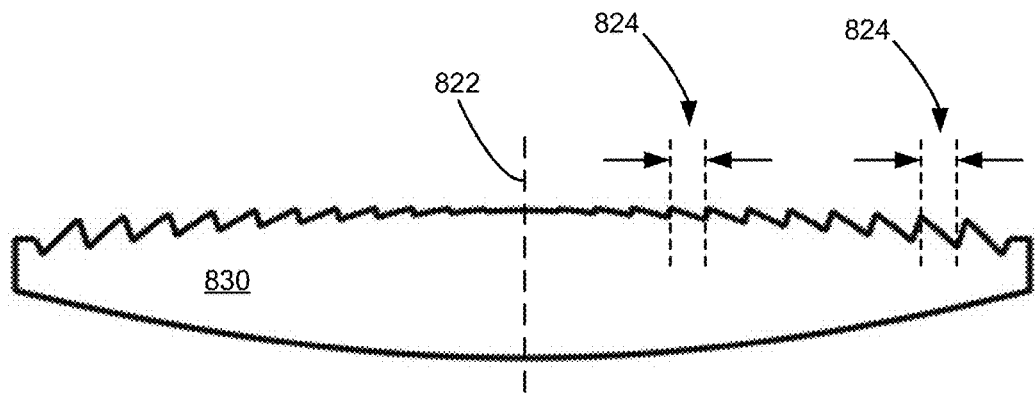
FIGS. 8C and 8D illustrate cross-sections of Fresnel lenses in accordance with some embodiments.
Figure 8D:
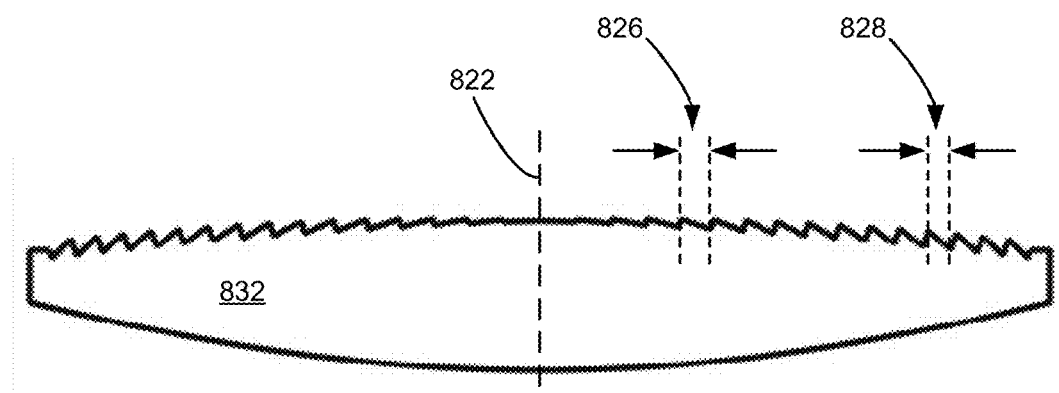

FIGS. 8C and 8D illustrate cross-sections of Fresnel lenses 830 and 832 in accordance with some embodiments. Both Fresnel lens 830 and Fresnel lens 832 have dynamic draft (e.g., in each Fresnel lens, a draft angle of a respective Fresnel structure is determined based on a distance of the respective Fresnel structure from a reference axis of the Fresnel lens). However, Fresnel lens 830 and Fresnel lens 832 have different representative pitches.

FIG. 8C illustrates a cross-section of Fresnel lens 830 having a constant representative pitch (e.g., the slope base remains constant for a plurality of Fresnel structures). For example, a Fresnel structure located closer to reference axis 822 (e.g., an optical axis of Fresnel lens 830) and a Fresnel structure located away from reference axis 822 both have same slope base 824.

FIG. 8D illustrates a cross-section of Fresnel lens 832 having a variable representative pitch (e.g., a plurality of Fresnel structures has different slope bases). For example, a Fresnel structure located closer to reference axis 822 (e.g., an optical axis of Fresnel lens 832) has slope base 826 and a Fresnel structure located away from reference axis 822 has slope base 828 that is different from slope base 826 (e.g., slope base 828 is smaller than slope base 826).

The small representative pitch (e.g., the slope base) of Fresnel structures adjacent to the edge of the Fresnel lens facilitates reducing the visibility of the draft facets, as explained below with respect to FIGS. 8E and 8F.

Figure 8E:
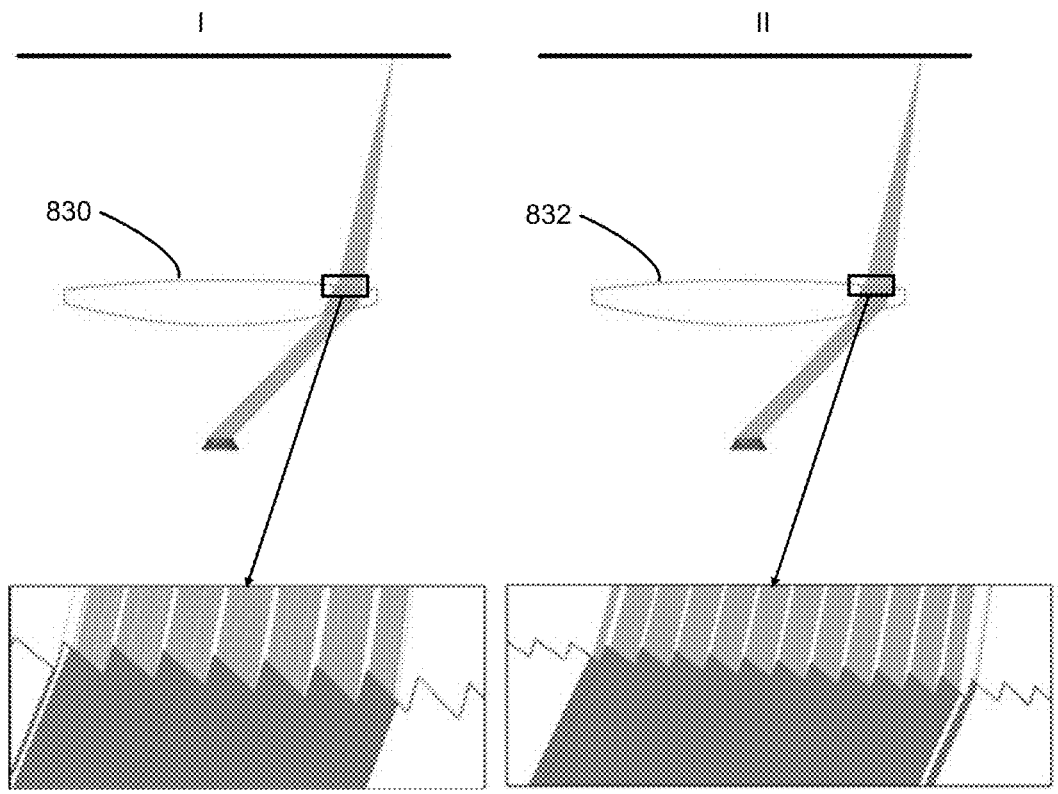
FIG. 8E illustrates transmission of light through Fresnel lenses in accordance with some embodiments.

FIG. 8E illustrates transmission of light through Fresnel lenses in accordance with some embodiments.

Section I (the left-hand side) of FIG. 8E shows transmission of light from an off-axis position (e.g., on an electronic display) through Fresnel lens 830, and section II (the right-hand side) of FIG. 8E shows transmission of light from an off-axis position (e.g., on an electronic display) through Fresnel lens 832. While the Fresnel structures of Fresnel lens 830 have a same slope base, the Fresnel structures of Fresnel lens 832 have reduced slope bases toward the edge of Fresnel lens 832. Thus, as shown in FIG. 8E, the Fresnel structures of Fresnel lens 832 located toward the edge of Fresnel lens 832 (shown in the inset of section I) are smaller than the Fresnel structures of Fresnel lens 830 located toward the edge of Fresnel lens 830 (shown in the inset of section II). As shown in FIG. 8E, the large Fresnel structures located toward the edge of Fresnel lens 830 creates a larger gap between rays transmitted through slope facets than the small Fresnel structures located toward the edge of Fresnel lens 832.

Figure 8F:
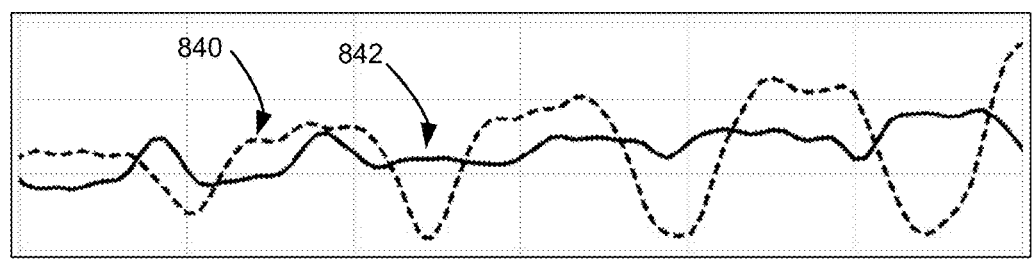
FIG. 8F illustrates variation in display brightness associated with two Fresnel lenses in accordance with some embodiments.

FIG. 8F illustrates variation in the display brightness associated with two Fresnel lenses in accordance with some embodiments.

Display brightness curve 840 represents an intensity of light (e.g., an image of a uniform white screen) transmitted through Fresnel lens 830, and display brightness curve 842 represents an intensity of light transmitted through Fresnel lens 832. The large Fresnel structures of Fresnel lens 830 contribute to a large variation in the intensity of light transmitted through Fresnel lens 830. In contrast, the small Fresnel structures of Fresnel lens 832 provide a reduced variation in the intensity of light transmitted through Fresnel lens 832.

As shown above with respect to FIG. 8A, the attenuation by the draft facets is more significant for the Fresnel structures located toward the edge of the Fresnel lens. Thus, reducing the size of the Fresnel structures located toward the edge of the Fresnel lens facilitates reducing the attenuation by the draft facets. In some embodiments, the size of the Fresnel structures located toward the center of the Fresnel lens is not reduced.

In light of these principles, we now turn to certain embodiments.

In accordance with some embodiments, a lens includes an optically transparent substrate having a first lens surface and a second lens surface opposite to the first lens surface (e.g., Fresnel lens 606). The first lens surface includes a plurality of Fresnel structures. A respective Fresnel structure of the plurality of Fresnel structures includes a slope facet and a draft facet. The respective Fresnel structure of the plurality of Fresnel structures is characterized by a representative pitch. The representative pitch of the respective Fresnel structure is based on a distance of the respective Fresnel structure from a reference axis of the lens (e.g., the optical axis of the lens). For example, representative pitches of Fresnel structures decrease from a center of the lens toward the edge of the lens (e.g., a representative pitch of a Fresnel structure located adjacent to the center of the lens is greater than a representative pitch of a Fresnel structure located toward the edge of the lens). Alternatively, representative pitches of Fresnel structures increase from the center of the lens toward the edge of the lens (e.g., a representative pitch of a Fresnel structure located adjacent to the center of the lens is less than a representative pitch of a Fresnel structure located toward the edge of the lens).

In some embodiments, the representative pitch of the respective Fresnel structure decreases linearly with the distance of the respective Fresnel structure from the reference axis of the lens. In some embodiments, the representative pitch of the respective Fresnel structure decreases nonlinearly with the distance of the respective Fresnel structure from the reference axis of the lens (e.g., the representative pitch of the respective Fresnel structure decreases as an inverse of the distance of the respective Fresnel structure from the reference axis of the lens, or the representative pitch of the respective Fresnel structure decreases based on a logarithmic, exponential, or polynomial function of the distance of the respective Fresnel structure from the reference axis of the lens).

In some embodiments, the draft facet is characterized by a draft angle. The draft angle of the respective Fresnel structure is based on a distance of the respective Fresnel structure from the reference axis of the lens (e.g., the draft angle of a Fresnel structure located adjacent to the center of the lens is less than the draft angle of a Fresnel structure located toward the edge of the lens).

In some embodiments, the lens is configured for directing light from a display device toward a first reference pupil through a first medium. The draft angle is between a first reference angle and a second reference angle. The first reference angle corresponds to a direction of a ray, in the first medium, transmitted from a reference off-axis position of the display device through the respective Fresnel structure toward the first reference pupil. The second reference angle corresponds to a direction of the ray, in the optically transparent substrate, transmitted from the reference off-axis position of the display device through the respective Fresnel structure toward the first reference pupil (e.g., FIG. 6G).

In some embodiments, the first medium is air.

In some embodiments, the lens is configured for directing light from a display device toward a first reference pupil through a first medium. The draft angle is between a third reference angle and a fourth reference angle. The third reference angle corresponds to a direction of a ray, in the first medium, transmitted from a reference off-axis position of the display device through the respective Fresnel structure toward a second reference pupil. The fourth reference angle corresponds to a direction of the ray, in the optically transparent substrate, transmitted from the reference off-axis position of the display device through the respective Fresnel structure toward the second reference pupil. The first reference pupil is located at a first distance from the optically transparent substrate. The second reference pupil is located at a second distance from the optically transparent substrate. The second distance is greater than the first distance (e.g., section II of FIG. 7B).

In some embodiments, the first reference pupil is rotatable about a reference center of rotation. The second reference pupil defines a reference plane that includes the reference center of rotation (e.g., FIG. 7B).

In some embodiments, the plurality of Fresnel structures includes a first Fresnel structure and a second Fresnel structure. The first Fresnel structure is characterized by a first representative pitch. The second Fresnel structure is characterized by a second representative pitch, distinct from the first representative pitch (e.g., FIG. 8D).

In some embodiments, the second Fresnel structure is positioned further away from the reference axis of the lens than the first Fresnel structure. The second representative pitch is smaller than the first representative pitch (e.g., as shown in FIG. 8D, a Fresnel structure located further away from optical axis 822 of Fresnel lens 832 has slope base 828 that is less than slope base 826 of a Fresnel structure located closer to optical axis 822 of Fresnel lens 832).

In some embodiments, the first Fresnel structure is characterized by a first depth. The second Fresnel structure is characterized by a second depth, distinct from the first depth. For example, the first Fresnel structure has a slope height that is distinct from a slope height of the second Fresnel structure. In some embodiments, the second Fresnel structure is positioned further away from the reference axis of the lens than the first Fresnel structure. The second depth is greater than the first depth (e.g., the slope height of the second Fresnel structure located further away from the reference axis is greater than the slope height of the first Fresnel structure located adjacent to the reference axis). Alternatively, in some embodiments, the first depth and the second depth are identical (e.g., the slope height of the first Fresnel structure is identical to the slope height of the second Fresnel structure).

In some embodiments, the first Fresnel structure is characterized by a first draft angle. The second Fresnel structure is characterized by a second draft angle, distinct from the first draft angle. In some embodiments, the second Fresnel structure is positioned further away from the reference axis of the lens than the first Fresnel structure. The second draft angle is greater than the first draft angle (e.g., the draft angle of the second Fresnel structure located further away from the reference axis is greater than the draft angle of the first Fresnel structure located adjacent to the reference axis).

In some embodiments, the representative pitch is determined based on a lateral distance from a peak of the slope facet of the respective Fresnel structure to a valley of the slope facet of the respective Fresnel structure (e.g., slope base 802 of Fresnel structure 810, as illustrated in FIG. 8B). In some embodiments, the representative pitch corresponds to a slope base of the respective Fresnel structure.

In some embodiments, the representative pitch is determined based on a lateral distance from a peak of the draft facet of the respective Fresnel structure to a valley of the draft facet of the respective Fresnel structure (e.g., draft base 804 of Fresnel structure 810, as illustrated in FIG. 8B). In some embodiments, the representative pitch corresponds to a draft base of the respective Fresnel structure.

In some embodiments, the representative pitch is determined based on a lateral distance from a valley of the draft facet of the respective Fresnel structure to a valley of the slope facet of the respective Fresnel structure (e.g., Fresnel structure width 806 of Fresnel structure 810, as illustrated in FIG. 8B). In some embodiments, the representative pitch corresponds to a Fresnel structure width of the respective Fresnel structure.

In some embodiments, the lens is configured to focus light impinging on the first lens surface (e.g., FIG. 8E).

In some embodiments, the representative pitch of the respective Fresnel structure is selected to reduce light interacting with the draft facet of the respective Fresnel area and entering a reference pupil for the lens. In some embodiments, the representative pitch of the respective Fresnel structure is selected to reduce light originating from an off-axis position, interacting with the draft facet of the respective Fresnel area, and entering a reference pupil for the lens.

In accordance with some embodiments, a display device includes a lens described herein, and an electronic display coupled with the lens for outputting light through the lens.

In some embodiments, the display device is a head-mounted display device.

In accordance with some embodiments, a method includes transmitting light from a display device toward a lens comprising an optically transparent substrate having a first lens surface and a second lens surface opposite to the first lens surface. The first lens surface includes a plurality of Fresnel structures. A respective Fresnel structure of the plurality of Fresnel structures includes a slope facet and a draft facet. The respective Fresnel structure of the plurality of Fresnel structures is characterized by a representative pitch. The representative pitch of the respective Fresnel structure is based on a distance of the respective Fresnel structure from a reference axis of the lens (e.g., section II of FIG. 8E).

The foregoing description, for purpose of explanation, has been described with reference to specific embodiments. However, the illustrative discussions above are not intended to be exhaustive or to limit the scope of the claims to the precise forms disclosed.

For example, the features described above with respect to FIG. 2F can be combined with the features described above with respect to FIG. 7B, and/or the features described above with respect to FIG. 8D. In some embodiments, the features described above with respect to FIGS. 6C and 6G can be combined with the features described above with respect to FIG. 7B, and/or the features described above with respect to FIG. 8D. In some embodiments, the features described above with respect to FIG. 7B can be combined with the features described above with respect to FIG. 2F, the features described above with respect to FIGS. 6C and 6G, and/or the features described above with respect to FIG. 8D. In some embodiments, the features described above with respect to FIG. 8D can be combined with the features described above with respect to FIG. 2F, the features described above with respect to FIGS. 6C and 6G, and/or the features described above with respect to FIG. 7B. For brevity, these details are omitted herein.

Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A lens for directing light from an electronic display toward a first reference pupil through a first medium, the lens comprising:
    an optically transparent substrate having a first lens surface and a second lens surface opposite to the first lens surface, wherein:
        the first lens surface includes a plurality of Fresnel structures, wherein a respective Fresnel structure of the plurality of Fresnel structures is characterized by a representative pitch;
        the representative pitch of the respective Fresnel structure is based on a distance of the respective Fresnel structure from a reference axis of the lens;
        the respective Fresnel structure of the plurality of Fresnel structures includes a slope facet and a draft facet;
        the draft facet is characterized by a draft angle, relative to an optical axis of the lens, that is between a first angle for the respective Fresnel structure and a second angle for the respective Fresnel structure,
            the first angle for the respective Fresnel structure corresponding to an angle between the optical axis of the lens and a direction of a chief ray, in the first medium, incident upon the slope facet of the respective Fresnel structure, wherein the chief ray:
                is transmitted from a reference off-axis position on the electronic display, located away from the optical axis of the lens, and
                is transmitted through the slope facet of the respective Fresnel structure and propagates toward a center of the first reference pupil;
            the second angle for the respective Fresnel structure corresponding to an angle between the optical axis of the lens and a direction of the chief ray, in the optically transparent substrate, that is transmitted through the slope facet of the respective Fresnel structure and propagates toward the center of the first reference pupil;
        the draft angle of the respective Fresnel structure is distinct from the first angle and the second angle for the respective Fresnel structure; and
        the draft angle of the respective Fresnel structure is a predefined weighted average of the first angle and the second angle.

2. The lens of claim 1, wherein:
the first medium is air.

3. The lens of claim 1, wherein:
the draft angle is between a third angle and a fourth angle,
    the third angle corresponding to an angle between the optical axis of the lens and a direction of the chief ray, in the first medium, incident upon the slope facet of the respective Fresnel structure, wherein the chief ray:
        is transmitted from a reference off-axis position on the electronic display, located away from an optical axis of the lens, and
        is transmitted through the slope facet of the respective Fresnel structure and propagates toward the center of a second reference pupil;
    the fourth angle corresponding to an angle between the optical axis of the lens and a direction of the chief ray, in the optically transparent substrate, that is transmitted through the slope facet of the respective Fresnel structure and propagates toward the center of the second reference pupil;
the first reference pupil is located at a first distance from the optically transparent substrate;
the second reference pupil is located at a second distance from the optically transparent substrate; and
the second distance is greater than the first distance.

4. The lens of claim 3, wherein:
the first reference pupil is rotatable about a reference center of rotation; and
the second reference pupil defines a reference plane that includes the reference center of rotation.

5. The lens of claim 1, wherein:
the plurality of Fresnel structures includes a first Fresnel structure and a second Fresnel structure;
the first Fresnel structure is characterized by a first representative pitch; and
the second Fresnel structure is characterized by a second representative pitch, distinct from the first representative pitch.

6. The lens of claim 5, wherein:
the second Fresnel structure is positioned further away from the reference axis of the lens than the first Fresnel structure; and
the second representative pitch is smaller than the first representative pitch.

7. The lens of claim 5, wherein:
the first Fresnel structure is characterized by a first depth; and
the second Fresnel structure is characterized by a second depth, distinct from the first depth.

8. The lens of claim 7, wherein:
the second Fresnel structure is positioned further away from the reference axis of the lens than the first Fresnel structure; and
the second depth is greater than the first depth.

9. The lens of claim 5, wherein:
the first Fresnel structure is characterized by a first draft angle; and
the second Fresnel structure is characterized by a second draft angle, distinct from the first draft angle.

10. The lens of claim 9, wherein:
the second Fresnel structure is positioned further away from the reference axis of the lens than the first Fresnel structure; and
the second draft angle is greater than the first draft angle.

11. The lens of claim 1, wherein:
a lateral distance from a peak of the slope facet of the respective Fresnel structure to a valley of the slope facet of the respective Fresnel structure is based on the distance of the respective Fresnel structure from the reference axis of the lens.

12. The lens of claim 1, wherein:
a lateral distance from a peak of the draft facet of the respective Fresnel structure to a valley of the draft facet of the respective Fresnel structure is based on the distance of the respective Fresnel structure from the reference axis of the lens.

13. The lens of claim 1, wherein:
a lateral distance from a valley of the draft facet of the respective Fresnel structure to a valley of the slope facet of the respective Fresnel structure is based on the distance of the respective Fresnel structure from the reference axis of the lens.

14. The lens of claim 1, wherein:
the lens is configured to focus light impinging on the first lens surface.

15. The lens of claim 1, wherein the lens, in which a first Fresnel structure in the plurality of Fresnel structures has a first representative pitch and a second Fresnel structure in the plurality of Fresnel structures has a second representative pitch that is distinct from the first representative pitch, has a lower draft facet visibility than a lens having a plurality of Fresnel structures in which a respective Fresnel structure has a same representative pitch.

16. A display device, comprising:
the lens of claim 1; and
an electronic display coupled with the lens for outputting light through the lens.

17. The display device of claim 16, wherein the display device is a head-mounted display device.

18. A method, comprising:
transmitting light from an electronic display toward a lens comprising an optically transparent substrate having a first lens surface and a second lens surface opposite to the first lens surface, wherein:
the lens is configured for directing the light from the electronic display toward a first reference pupil through a first medium;
the first lens surface includes a plurality of Fresnel structures, wherein a respective Fresnel structure of the plurality of Fresnel structures is characterized by a representative pitch;
the representative pitch of the respective Fresnel structure is based on a distance of the respective Fresnel structure from a reference axis of the lens;
the respective Fresnel structure of the plurality of Fresnel structures includes a slope facet and a draft facet;
the draft facet is characterized by a draft angle, relative to an optical axis of the lens, that is between a first angle for the respective Fresnel structure and a second angle for the respective Fresnel structure,
the first angle for the respective Fresnel structure corresponding to an angle between the optical axis of the lens and a direction of a chief ray, in the first medium, incident upon the slope facet of the respective Fresnel structure, wherein the chief ray:
is transmitted from a reference off-axis position on the electronic display, located away from an optical axis of the lens, and
is transmitted through the slope facet of the respective Fresnel structure and propagates toward the center of the first reference pupil;
the second angle for the respective Fresnel structure corresponding to an angle between the optical axis of the lens and a direction of the chief ray, in the optically transparent substrate, that is transmitted through the respective Fresnel structure and propagates toward the center of the first reference pupil;
the draft angle of the respective Fresnel structure is distinct from the first angle and the second angle for the respective Fresnel structure; and
the draft angle of the respective Fresnel structure is a predefined weighted average of the first angle and the second angle.

* * * * *